United States Patent
Hatanaka

(10) Patent No.: US 9,227,516 B2
(45) Date of Patent: Jan. 5, 2016

(54) ELECTRIC VEHICLE PROPULSION CONTROL DEVICE AND RAILWAY VEHICLE SYSTEM

(75) Inventor: Keita Hatanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 569 days.

(21) Appl. No.: 13/810,799

(22) PCT Filed: Apr. 21, 2011

(86) PCT No.: PCT/JP2011/059848
§ 371 (c)(1),
(2), (4) Date: Jan. 17, 2013

(87) PCT Pub. No.: WO2012/014540
PCT Pub. Date: Feb. 2, 2012

(65) Prior Publication Data
US 2013/0113279 A1    May 9, 2013

(30) Foreign Application Priority Data

Jul. 30, 2010 (WO) .................. PCT/JP2010/062946

(51) Int. Cl.
| | |
|---|---|
| *B60L 7/22* | (2006.01) |
| *B60L 7/04* | (2006.01) |
| *B60L 11/18* | (2006.01) |
| *B60L 9/22* | (2006.01) |
| *B61C 3/02* | (2006.01) |
| *B60L 9/00* | (2006.01) |
| *B61C 1/14* | (2006.01) |

(52) U.S. Cl.
CPC .............. *B60L 11/1801* (2013.01); *B60L 9/00* (2013.01); *B60L 9/22* (2013.01); *B60L 11/1814* (2013.01);
(Continued)

(58) Field of Classification Search
CPC ......... B60L 9/22; B60L 11/1814; B61C 3/02; B61C 3/00

USPC ......................................................... 307/9.1
See application file for complete search history.

(56) References Cited

U.S. PATENT DOCUMENTS 5,650,713 A   7/1997   Takeuchi et al.

FOREIGN PATENT DOCUMENTS

| JP | 58-46203 | 3/1983 |
|---|---|---|
| JP | 8-79914 A | 3/1996 |

(Continued)

OTHER PUBLICATIONS

International Search Report (PCT/ISA/210) issued on Aug. 2, 2011, by the Japanese Patent Office as the International Searching Authority for International Application No. PCT/JP2011/059848.

(Continued)

Primary Examiner — Rexford Barnie
Assistant Examiner — Thai Tran
(74) Attorney, Agent, or Firm — Buchanan Ingersoll & Rooney PC

(57) ABSTRACT

An electric vehicle propulsion control device having a power storage device includes: a first switch configured to perform opening and closing of a circuit between an overhead wire and a power converting unit; a second switch configured to perform opening and closing of a circuit between the power converting unit and a motor; a switching unit configured to select a terminal on a side of the power converting unit to which the first switch is connected or a terminal on a side of the power converting unit to which the second switch is connected and connect the terminal to the power storage device; and a control unit configured to control the power converting unit, the first switch, the second switch, and the switching unit to switch a connection destination of the power converting unit and cause the power converting unit to operate as an inverter or a DC/DC converter.

15 Claims, 44 Drawing Sheets

(52) U.S. Cl.
CPC ............... *B60L 11/1833* (2013.01); *B61C 3/02* (2013.01); *B60L 2200/26* (2013.01); *B60L 2250/16* (2013.01); *Y02T 10/7005* (2013.01); *Y02T 30/12* (2013.01); *Y02T 30/40* (2013.01); *Y02T 90/127* (2013.01); *Y02T 90/14* (2013.01)

(56) References Cited

FOREIGN PATENT DOCUMENTS

| JP | 2000-152408 A | 5/2000 |
|----|---------------|--------|
| JP | 2005-278269 A | 10/2005 |
| JP | 2007-28852 A  | 2/2007 |
| JP | 2008-141877 A | 6/2008 |
| JP | 2008-263741 A | 10/2008 |
| JP | 2009-72003 A  | 4/2009 |

OTHER PUBLICATIONS

Written Opinion (PCT/ISA/237) issued on Aug. 2, 2011, by the Japanese Patent Office as the International Searching Authority for International Application No. PCT/JP2011/059848.

Canadian Office Action dated Mar. 19, 2015 issued in corresponding Canadian Patent Appln. No. 2,806,817 (7 pages).

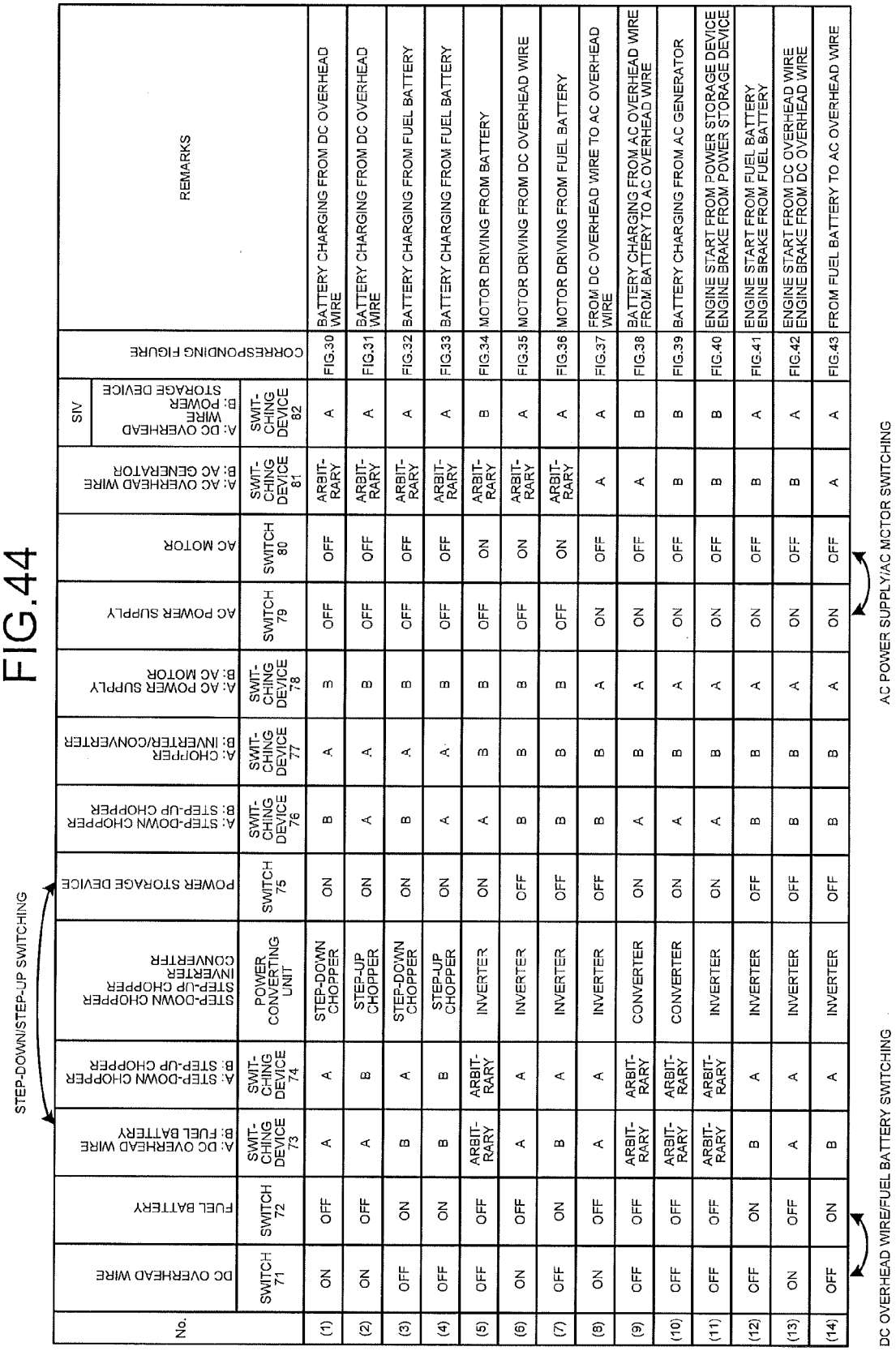

ELECTRIC VEHICLE PROPULSION CONTROL DEVICE AND RAILWAY VEHICLE SYSTEM

FIELD

The present invention relates to an electric vehicle propulsion control device including a power storage device.

BACKGROUND

As an electric vehicle propulsion control device in the past including a power storage device, there is a vehicle driving control device described in Patent Literature 1.

The vehicle driving control device includes an inverter configured to convert a direct-current voltage from any one of an overhead wire and the power storage device or both into an alternating-current voltage and a DC/DC converter for converting the direct-current voltage from the overhead wire or regenerative electric power from a motor and charging the power storage device. The vehicle driving control device carries out control (power supply from the power storage device to the motor and charging and discharging of the power storage device) corresponding to charging depth of the power storage device and states of a vehicle (power running, standing, coasting, and regeneration).

CITATION LIST

Patent Literature

Patent Literature 1: Japanese Patent Application Laid-Open No. 2005-278269

SUMMARY

Technical Problem

The vehicle driving control device in the past is mounted with two power converting devices, i.e., the DC/DC converter that converts the direct-current voltage from the overhead wire into the direct-current voltage of the power storage device and the inverter that converts direct-current power into alternating-current power and drives the motor. Therefore, there is a problem in that costs, weight, and dimensions of the vehicle driving control device are large.

The present invention has been devised in view of the above and it is an object of the present invention to obtain an electric vehicle propulsion control device that can be reduced in costs, size, and weight.

Solution to Problem

In order to solve the above problem and in order to attain the above object, in an electric vehicle propulsion control device including a power storage device, the electric vehicle propulsion control device of the present invention, includes: a first switch configured to perform opening and closing of a circuit between an overhead wire and a power converting unit, which is a supply destination of a direct-current voltage input from the overhead wire; a second switch configured to perform opening and closing of a circuit between the power converting unit and a motor that generates power for an electric vehicle; a switching unit configured to select a terminal on a side of the power converting unit to which the first switch is connected or a terminal on a side of the power converting unit to which the second switch is connected and connect the terminal to the power storage device; and a control unit configured to control the power converting unit, the first switch, the second switch, and the switching unit to switch a connection destination of the power converting unit and cause the power converting unit to operate as an inverter or a DC/DC converter according to an operation form of the electric vehicle.

Advantageous Effects of Invention

According to the present invention, the power converting unit operates as an inverter and a DC/DC converter. Therefore, it is unnecessary to separately provide a DC/DC converter for charging the power storage device. There is an effect that an electric vehicle propulsion control device, a reduction in size and weight and a reduction in costs of which are realized, is obtained.

BRIEF DESCRIPTION OF DRAWINGS

FIG. 44 is a diagram in which the operations shown in FIGS. 30 to 43 are shown as a list in a table format.

DESCRIPTION OF EMBODIMENTS

An electric vehicle propulsion control device (hereinafter simply referred to as "propulsion control device") according to embodiments of the present invention are explained in detail below based on the drawings. The present invention is not limited by the embodiments.

First Embodiment

Figure 1:
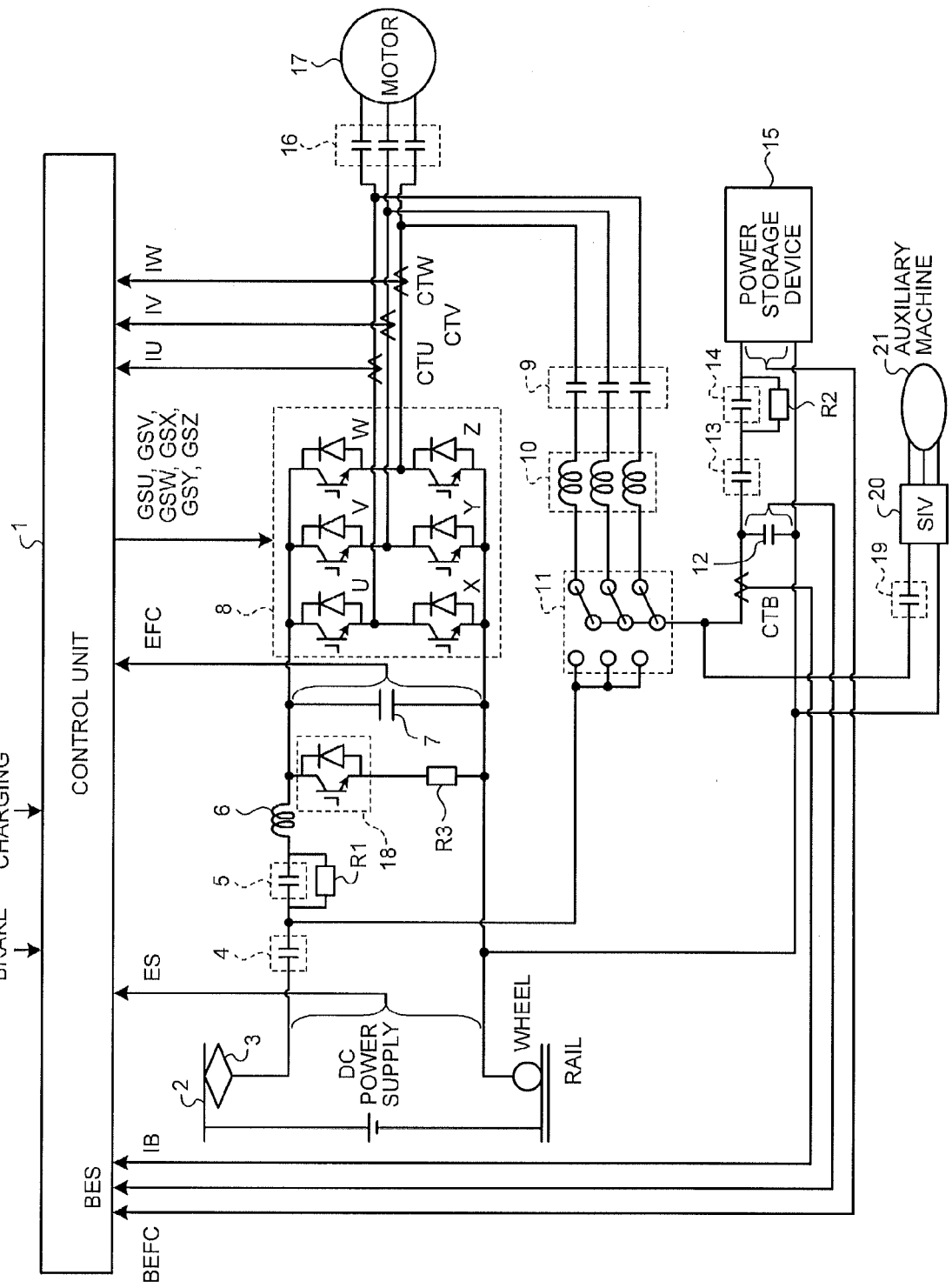
FIG. 1 is a diagram of a configuration example of a first embodiment of an electric vehicle propulsion control device.

FIG. 1 is a diagram of a configuration example of a first embodiment of the propulsion control device according to the present invention. As shown in the figure, the propulsion control device according to this embodiment includes a control unit 1 configured to control units in the propulsion control device, a power collecting device 3 configured to collect electric power from an overhead wire 2 connected to a direct-current power supply such as a transformer substation, switches 4, 5, 9, 13, 14, 16, and 19 for opening and closing a circuit, a filter reactor 6 and a filter capacitor 7 included in an LC filter, a power converting unit 8 including a plurality of switching elements and configured to operate as an inverter and a DC/DC converter, a battery reactor 10 connected to an output side of the power converting unit 8 via the switch 9 and configured to smooth an output voltage from the power converting unit 8, a switching unit 11 connected to an input side (an input side of a direct-current voltage) and an output side (an output side of a three-phase alternating-current voltage and a direct-current voltage subjected to voltage conversion) of the power converting unit 8 and configured to select one of the input side and the output side and connect the selected side to a power storage device explained below, a battery filter capacitor 12, a power storage device 15 including a power storing device such as a secondary battery or an electric double layer capacitor, a motor 17 connected to the output side of the power converting unit 8 via the switch 16, a switch 18 and a discharge resistor R3 for discharging the filter capacitor 7 and adjusting a terminal voltage, charging resistors R1 and R2 respectively used as resistors in charging the filter capacitor 7 and the battery filter capacitor 12, an auxiliary power supply device (SIV) 20 configured to convert a direct-current voltage supplied from the power storage device 15 into a three-phase alternating-current voltage, an auxiliary machine 21 configured to receive power supply from the SIV 20 and operate, current detectors CTU, CTV, and CTW set on the output side of the power converting unit 8 and configured to detect electric currents of phases of U, V, and W, and a current detector CTB configured to detect an electric current flowing into the power storage device 15 and an electric current flowing out from the power storage device 15. The auxiliary machine 21 is, for example, a charging device for power supplies (batteries) for illumination and air conditioning in the vehicle, a control device, and the like. The direct-current power supply can be a direct-current voltage source such as a fuel battery or a solar battery.

As shown in the figure, the switching unit 11 connects the input side or the output side of the power converting unit 8 and the power storage device 15. The switching unit 11 is configured to collectively output electric currents of three phases to the power storage device 15 when selecting the output side.

The control unit 1 monitors a voltage BEFC of the power storage device 15, a voltage BES of the battery filter capacitor 12, a current detection value IB of the current detector CTB, a direct-current voltage ES supplied from the overhead wire 2, a voltage EFC of the filter capacitor 7, and current detection values IU, IV, and IW of the current detectors CTU, CTV, and CTW. The control unit 1 receives information indicating operation content by a driver (hereinafter referred to as operation information). The operation information includes information indicating service operation (power running, braking, coasting, and standing) of the electric vehicle and information indicating power reception starting operation of the power storage device 15. The control unit 1 controls, based on results of the monitoring and the operation information received from the outside, the switches 4, 5, 9, 13, 14, and 16, the switching unit 16, and the power converting unit 8 (more specifically, switching elements included in the power converting unit 8).

The propulsion control device having the configuration explained above is characterized by opening the switch 16 to disconnect the motor 17 from the power converting unit 8 and charging the power storage device 15 using the power converting unit 8 in a state in which it is unnecessary to cause the electric vehicle to perform power running and unnecessary to use a regenerative brake, i.e., a state during standing, coasting, or the like and in a state in which it is unnecessary to charge the power storage device 15. Characteristic operations of the propulsion control device according to this embodiment are explained in detail below.

In the propulsion control device according to this embodiment, the SIV 20 is configured to convert an output voltage from the power storage device 15 and generate a voltage supplied to the auxiliary machine 21. The SIV 20 does not convert an overhead wire voltage (a direct-current voltage supplied from the overhead wire 2) into a supply voltage to the auxiliary machine 21. In the propulsion control device according to this embodiment, when the electric vehicle is caused to perform power running, electric power is supplied to the power converting unit 8 from only the power storage device 15. In other words, the power converting unit 8 does not convert electric power supplied from the overhead wire 2 and generate a three-phase alternating-current voltage for driving the motor 17.

Figure 2:
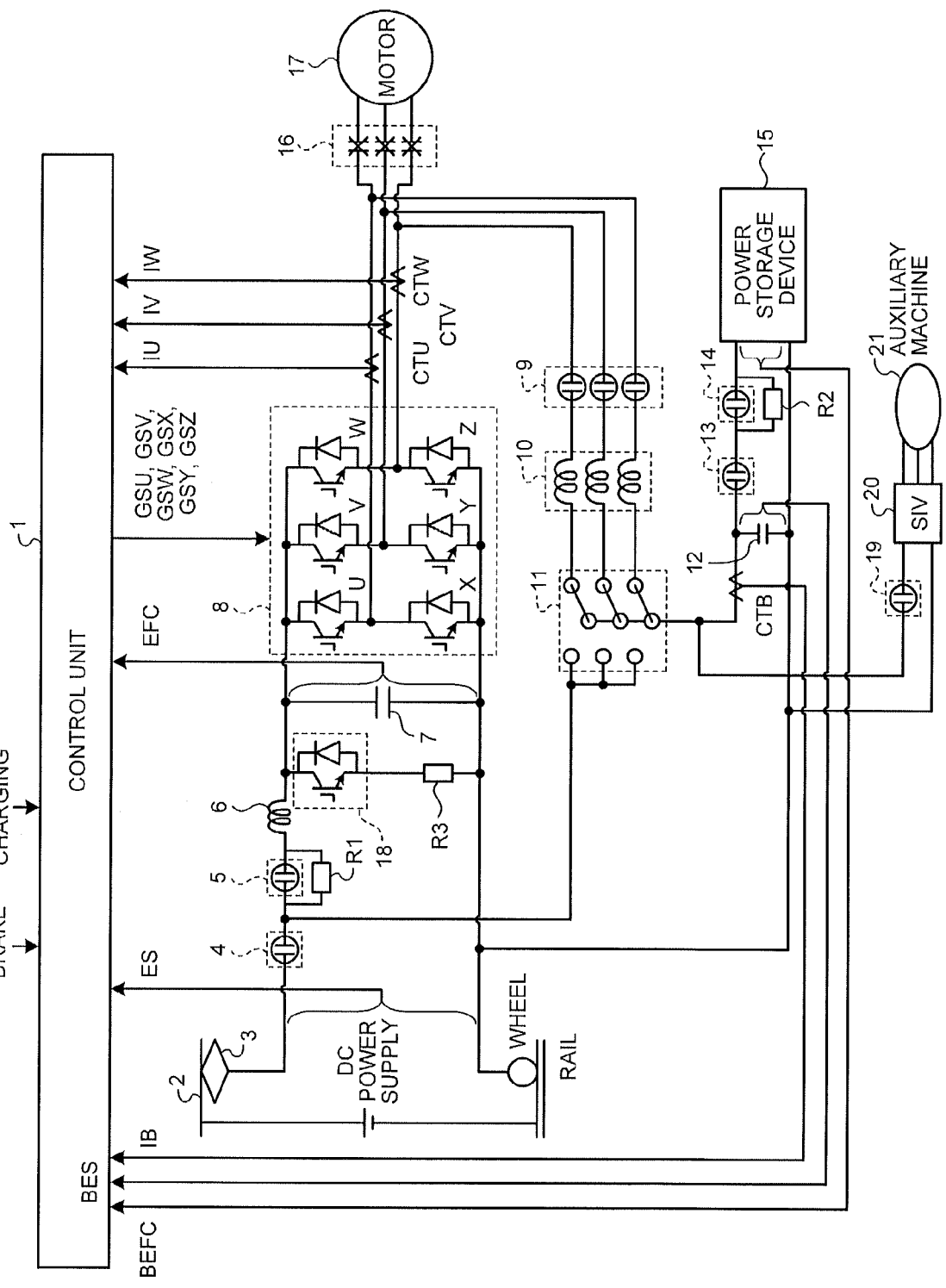
FIG. 2 is a diagram for explaining an operation for charging a power storage device.

FIG. 2 is a diagram for explaining an operation for charging the power storage device 15 in the propulsion control device according to this embodiment. An operation for using the power converting unit 8 as a DC/DC converter is shown. In FIG. 2, O and x indicating states are shown together with the switches 4, 5, 9, 13, 14, 16, and 19. O indicates a closed state and x indicates an open state. The same applies in FIG. 3 and subsequent figures.

The control unit 1 monitors the voltage BEFC of the power storage device 15, the voltage BES of the battery filter capacitor 12, the current detection value IB of the current detector CTB, the direct-current voltage ES supplied from the overhead wire 2, the voltage EFC of the filter capacitor 7, and the current detection values IU, IV, and IW of the current detectors CTU, CTV, and CTW. The control unit 1 receives operation information from the outside.

In a state in which the electric vehicle is standing in a rail yard or a station or a state in which the electric vehicle is performing a coasting operation in an electrified section, when the propulsion control device determines that it is necessary to charge the power storage device 15, as shown in FIG. 2, the propulsion control device converts, in the power converting unit 8, the direct-current voltage supplied from the overhead wire 2, generates direct-current power having a desired voltage, and charges the power storage device 15.

For example, when the control unit 1 determines based on the operation information received from the outside that the electric vehicle is in a state in which a charging operation can be carried out (a state in which the electric vehicle ends power running, braking using the regenerative brake, or the like and is not using the motor 17) and that charging start operation is carried out, the control unit 1 carries out a charging operation for the power storage device 15. The charging start operation could be carried out in a state in which discharge of the power storage device 15 is not in progress (a state in which the power storage device 15 is fully charged). Therefore, when the charging start operation is carried out, first, the control unit 1 can check whether the voltage BEFC of the power storage device 15 is lower than a predetermined threshold and start the charging operation when the voltage BEFC is lower than the predetermined threshold.

Rather than starting the charging operation when the control unit 1 detects that the charging start operation is carried out by the driver, the control unit 1 can start the charging operation according to a state of the power storage device 15. For example, when the control unit 1 receives, from the outside, a notification indicating that the electric vehicle is in the state in which the charging operation can be performed (the state in which the electric vehicle ends power running, braking using the regenerative brake, or the like and is not using the motor 17), the control unit 1 checks whether the voltage BEFC of the power storage device 15 is lower than the predetermined threshold. When the voltage BEFC is lower than the predetermined threshold, the control unit 1 determines that charging is necessary and starts the charging operation for the power storage device 15. In this case, the driver does not need to carry out the charging start operation according to a state of the electric vehicle and a state of the power storage device 15. Therefore, it is possible to reduce an operation load on the driver.

When starting the charging operation, first, the control unit 1 opens the switch 16 (sets the switch 16 to OFF) to disconnect the motor 17. Further, to supply electric power from the direct-current power supply (the overhead wire 2) to the power converting unit 8, first, the control unit 1 closes the switch 4 (sets the switch 4 to ON) and charges the filter capacitor from the direct-current power supply through the overhead wire 2 and the power collecting device 3. When the charging to the filter capacitor 7 proceeds and the voltage EFC reaches a predetermined value, the control unit 1 closes the switch 5 to short-circuit the charging resistor R1. The control unit 1 closes the switch 13 while keeping the switch 14 in the open state and feeds an electric current from the power storage device 15 to charge the battery filter capacitor 12. When the voltage BEFC of the battery filter capacitor 12 reaches a predetermined value, the control unit 1 closes the switch 14 to short-circuit the charging resistor R2. The control unit 1 switches the switching unit 11 to the battery reactor 10 side (the output side of the power converting unit 8) and closes the switch 9.

The control unit 1 controls the switching elements of the power converting unit 8 to cause the power converting unit 8 to operate as a DC/DC converter (adjust voltage values respectively output from output terminals of three phase of the power converting unit 8). Specifically, the control unit 1 generates control signals GSU, GSV, GSW, GSX, GSY, and GSZ of the power converting unit 8 such that the following formula holds when a charging current instruction value (a charging current value of the power storage device 15) determined according to, for example, the voltage BEFC of the power storage device 15 is represented as IBR. IU, IV, and IW represent detection values of the current detectors CTU, CTV, and CTW.

$$IBR=IU+IV+IW$$

In other words, the control unit 1 subjects the switching elements of the phases of the power converting unit 8 to proportional-integral control such that a total value of electric currents of the phases of U, V, and W output from the power converting unit 8 coincides with the charging current instruction value IBR. The control unit 1 outputs a result of the proportional-integral control to the power converting unit 8 as PWM control signals GSU, GSV, GSW, GSX, GSY, and GSZ. For example, the control unit 1 controls the switching elements such that a relation IU=IV=IW=IBR×1/3 holds.

According to such control, the power converting unit 8 can operate as the DC/DC converter and charge the power storage device 15.

After starting the charging operation, when the control unit 1 receives, from the outside, a notification to the effect that the electric vehicle changes to a state in which the charging operation cannot be performed (power running is started or use of a brake is started), the control unit 1 controls the units in the propulsion control device to end the charging operation. In addition to ending the charging operation according to the notification from the outside, the control unit 1 can end the charging operation at a point when the control unit 1 detects that the power storage device 15 is sufficiently charged (reaches a predetermined voltage).

Figure 3:
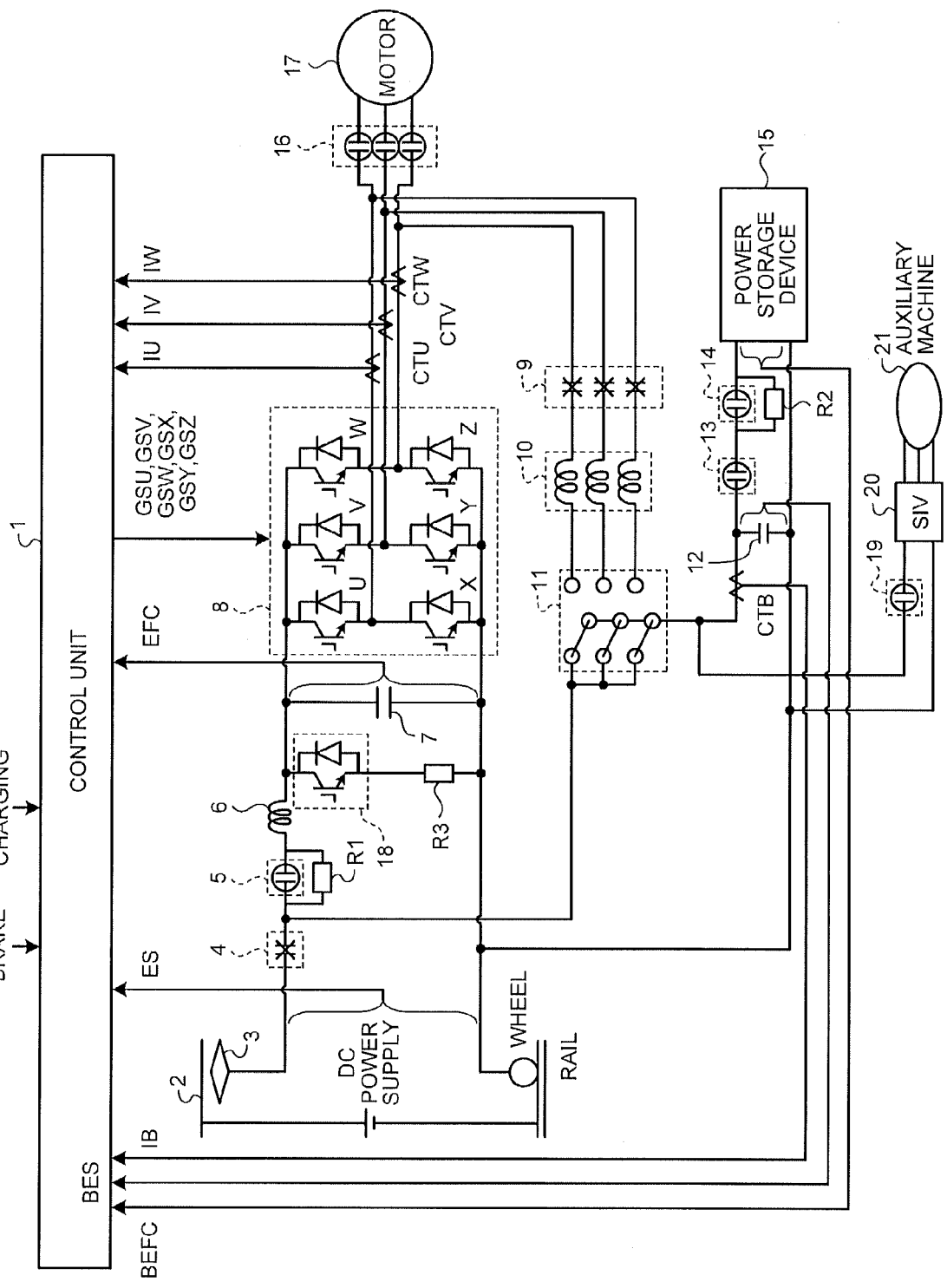
FIG. 3 is a diagram for explaining an operation for driving a motor using the power storage device.

FIG. 3 is a diagram for explaining an operation for driving the motor 17 using the power storage device 15 in the propulsion control device according to this embodiment. An operation for using the power converting unit 8 as an inverter is shown.

As in the operation for using the power converting unit 8 as the DC/DC converter, the control unit 1 monitors BEFC, BES, IB, ES, EFC, IU, IV, and IW. The control unit 1 receives information indicating a state of the electric vehicle from the outside.

When the propulsion control device causes the electric vehicle to perform power running in a state in which the power storage device 15 is sufficiently charged, as shown in FIG. 3, the power storage device 15 supplies electric power to the power converting unit 8. The power converting unit 8 converts a direct-current voltage supplied from the power storage device 15 to generate a three-phase alternating-current voltage for driving the motor 17.

For example, when the control unit 1 receives, from the outside, a notification to the effect that power running is started, the control unit 1 checks whether the voltage BEFC of the power storage device 15 is equal to or higher than a fixed level. When the voltage BEFC is equal to or higher than the fixed level, the control unit 1 determines that the power storage device 15 is sufficiently charged and drives the motor 17 using the power storage device 15.

When the control unit 1 discharges the power storage device 15 to drive the motor 17, first, when causing the power converting unit 8 to operate as the DC/DC converter, the control unit 1 stops the operation, opens the switch 4 to stop the power supply from the overhead wire 2, and lowers a pantograph. Subsequently, the control unit 1 closes the discharge switch 18 to cause the discharge resistor R3 to consume charges accumulated in the filter capacitor 7 and discharges the voltage EFC to be equal to or smaller than the voltage (BEFC) of the power storage device 15. Thereafter, the control unit 1 opens the switch 9 to disconnect the output side of the power converting unit 8 and the battery reactor 10, switches the switching unit 11 to the input side of the power converting unit 8, and closes the switch 16 to connect the power converting unit 8 and the motor 17.

The control unit 1 controls the switching elements of the power converting unit 8 to cause the power converting unit 8 to operate as an inverter and generate a three-phase alternating-current voltage for driving the motor 17. For example, the control unit 1 calculates a torque component current instruction IQR and a magnetic flux component current instruction IDR based on a torque instruction TRQR (not shown in the figure) received from the outside and a frequency of the motor 17. The control unit 1 subjects IU, IV, IW to coordinate conversion respectively using phases obtained by integrating a primary frequency F1, calculates a torque component current IQ and a magnetic flux component current ID, and subjects the power converting unit 8 to PWM control such that a deviation between the torque component current command IQR and the torque component current IQ and a deviation between the magnetic flux component current command IDR and the magnetic flux component current ID decrease to zero.

Consequently, a three-phase alternating-current voltage for driving the motor 17 is generated by the power converting unit 8. The electric vehicle is driven (caused to perform power running) with the electric power of the power storage device 15.

When the control unit 1 detects a current value and a voltage value, the control unit 1 checks whether the detected values are equal to or smaller than determination values for failure detection. When the detected values exceed the determination values, the control unit 1 determines that a failure occurs, stops the control of the power converting unit 8, and reduces an output voltage to zero.

Although not explained in detail, when the control unit 1 causes the motor 17 to perform regenerative operation, the control unit 1 can be configured to charge the power storage device 15. For example, when causing the motor 17 to perform the regenerative operation, the control unit 1 checks the voltage BEFC of the power storage device 15. When a value of the voltage BEFC is equal to or lower than a predetermined level, the control unit 1 opens the switch 4 and switches the switching unit 11 to the switch 4 side (a side where regenerative power is output from the power converting unit 8). The control unit 1 controls the switching elements of the power converting unit 8 such that regenerative power from the motor 17 is converted into a voltage for charging the power storage device 15 and charges the power storage device 15.

As explained above, when it is unnecessary to connect the power converting unit, which converts a direct-current voltage to generate a three-phase alternating-current voltage for driving the motor, and the motor, the propulsion control device according to this embodiment converts a direct-current voltage supplied from the overhead wire to charge the power storage device by causing the power converting unit to operate as the DC/DC converter. Consequently, it is unnecessary to separately provide a DC/DC converter for charging the power storage device. It is possible to realize a reduction in size, a reduction in weight, and a reduction in costs of the propulsion control device.

The propulsion control device can be realized by adding the power storage device and the switching device (the switching unit 11, etc.) to an existing inverter vehicle. Therefore, because remodeling is easy, it is possible to realize the propulsion control device at low costs.

Second Embodiments

Figure 4:
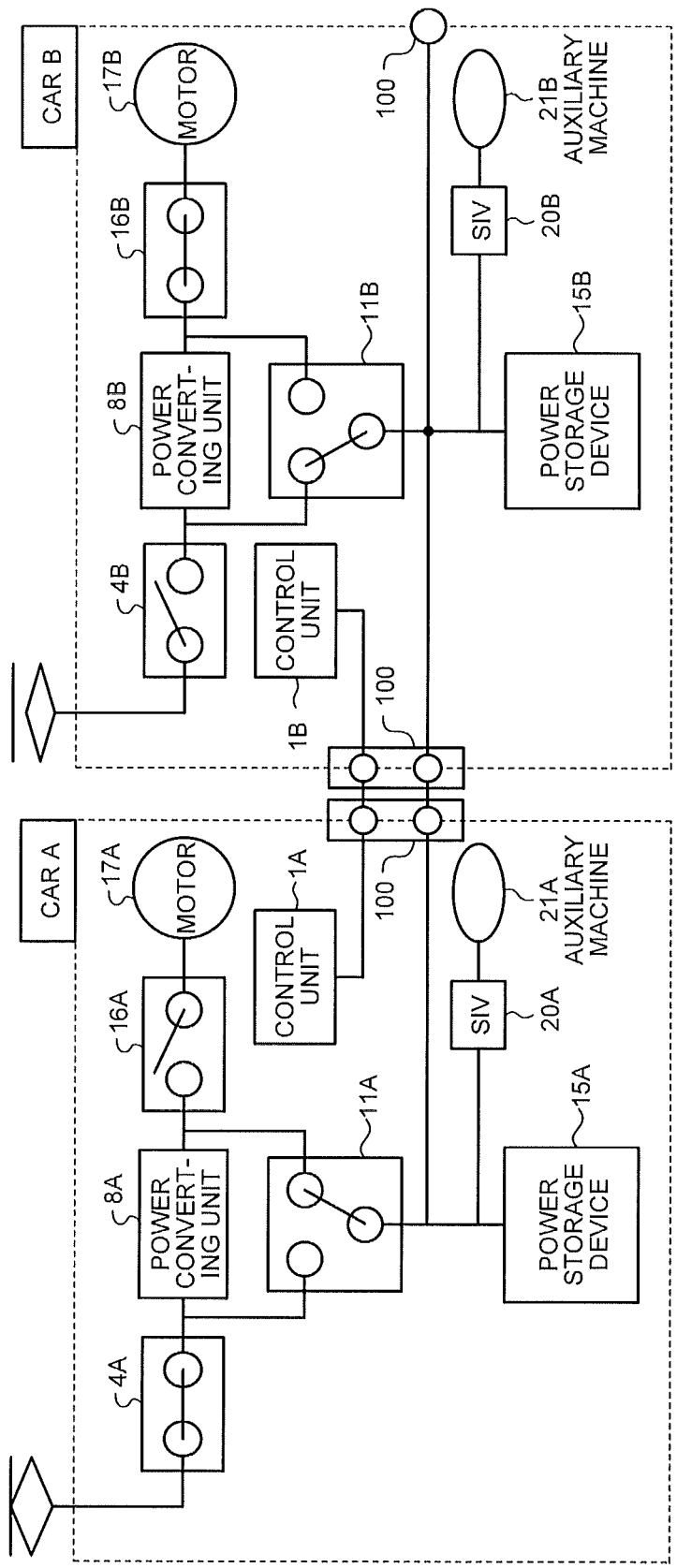
FIG. 4 is a diagram for explaining a configuration example of a hybrid vehicle, which is an electric vehicle according to a second embodiment.

In the first embodiment, the propulsion control device is explained in which, when generating a three-phase alternating-current voltage for driving the motor 17, the power converting unit 8 converts an output voltage from the power storage device 15 into the three-phase alternating-current voltage for driving the motor 17 (the propulsion control device that does not convert a voltage supplied from the overhead wire 2 to directly generate the three-phase alternating-current voltage for driving the motor 17). Therefore, when a formation in which a plurality of cars including the propulsion control devices explained in the first embodiment are coupled is operated, it is advisable to properly use the propulsion control devices in one formation as shown in FIG. 4. FIG. 4 is a diagram of a configuration example of a hybrid vehicle (a railway vehicle system), which is an electric vehicle according to a second embodiment. Cars A and B are the electric vehicles including the same configuration and the propulsion control devices explained in the first embodiment. In FIG. 4, only main units are shown. Power converting units 8A and 8B are equivalent to the power converting unit 8 explained in the first embodiment (see FIG. 1, etc.). Control units 1A and 1B are equivalent to the control unit 1 explained in the first embodiment. Similarly, switches 4A and 4B, switches 16A and 16B, switching units 11A and 11B, power storage devices 15A and 15B, and motors 17A and 17B are respectively equivalent to the switch 4, the switch 16, the switching unit 11, the power storage device 15, and the motor 17 explained in the first embodiment. The propulsion control devices include interfaces (connecting units) 100 for connecting the propulsion control devices to propulsion control devices of other cars. The interfaces 100 connect direct-current voltage units of the propulsion control devices and connect the control units.

As shown in FIG. 4, battery filter capacitors (not shown in the figure, see FIG. 1, etc.) of the cars are connected. In the car A, the power converting unit 8A is caused to operate as a DC/DC converter to convert a direct-current voltage supplied from the overhead wire into a charging voltage for the power storage device (a direct-current voltage equivalent to an output voltage of the poser storage device). On the other hand, in the car B, the power converting unit 8B is caused to operate as an inverter to convert the charging voltage into a three-phase alternating-voltage for driving the motor 17B. To realize this operation, the control units 1A and 1B control the units in the propulsion control devices while performing, for example, exchange of information according to necessity. By applying such an operation method, in an electrified section under the overhead wire, the direct-current voltage generated by the power converting unit 8A of the car A is supplied to the car B side as well. Therefore, the car B can travel without consuming electric power of the power storage device 15B. When the car B travels under the overhead wire, there is no limitation on a traveling distance. Further, because the number of times of charging and discharging of the power storage device 15B decreases, the extension of the life of the power storage device 15B can be realized, leading to a reduction in costs.

The formation including the two cars is explained above. In a formation including three or more cars (three or more electric vehicles including the propulsion control devices explained in the first embodiment are included in one formation), it is sufficient to cause the power converting unit to operate as a DC/DC converter in at least one car and cause the power converting unit to operate as an inverter in at least one car among the remaining cars. An instruction for causing the power converting unit to operate as the inverter or operate as the DC/DC converter is input to the control units (not shown in FIG. 4) of the propulsion control devices from the outside. The control units control the units according to instruction contents of the instruction.

Third Embodiment

Figure 5:
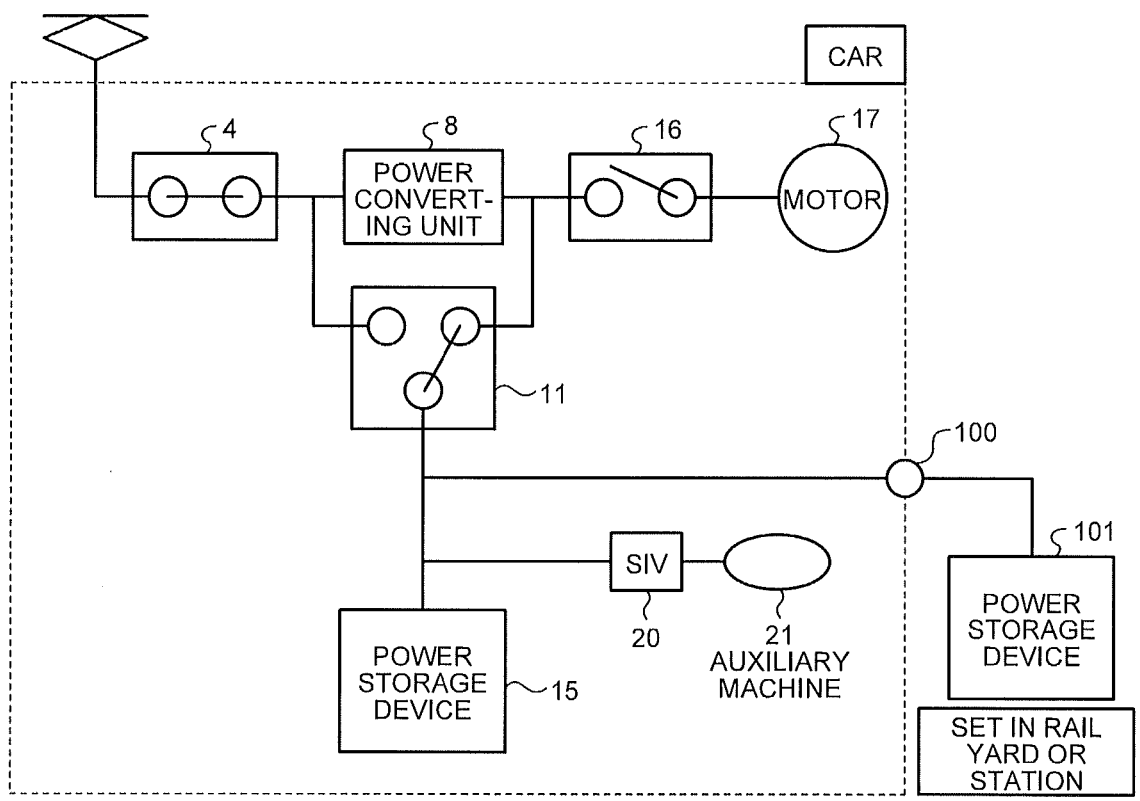
FIG. 5 is a diagram for explaining an operation for using a power storage device according to a third embodiment.

As shown in FIG. 5, when a power storage device 101 is set in a rail yard or a station, while an electric vehicle is standing in the rail yard or the station, the power converting unit 8 can be caused to operate as a DC/DC converter to charge the power storage device 101 on the outside instead of the power storage device 15 included in the electric vehicle.

To realize such use, a propulsion control device (a car including the propulsion control device) according to a third embodiment includes the interface (the connecting unit) 100 for connecting the power storage device 101 on the outside to the power storage device 15 in the car in parallel. When it is detected that the power storage device 101 on the outside is connected, the power storage device 15 on the inside can be disconnected from the power converting unit 8 (the propulsion control device can further include a switch for disconnecting the power storage device 15).

Consequently, it is possible to charge the power storage device 101 at low costs. Further, it is unnecessary to provide a charging facility for the power storage device 101 in the rail yard or the station. If the power storage device 101 is charged in a period of Lime when electricity charges are low such as at night, it is possible to charge the power storage device 101 at lower costs. The car shown in the figure is the electric vehicle including the propulsion control device explained in the first embodiment (the units other than the main units are not shown.

Fourth Embodiment

In the first to third embodiments, the propulsion control device is explained in which the auxiliary power supply device (SIV) 20 converts a voltage from the power storage device 15 and supplies the voltage to the auxiliary machine 21 and the power converting unit 8 generates a driving voltage for the motor 17 from an output voltage of the power storage device 15. However, a configuration shown in FIG. 6 can also be adopted.

Figure 6:
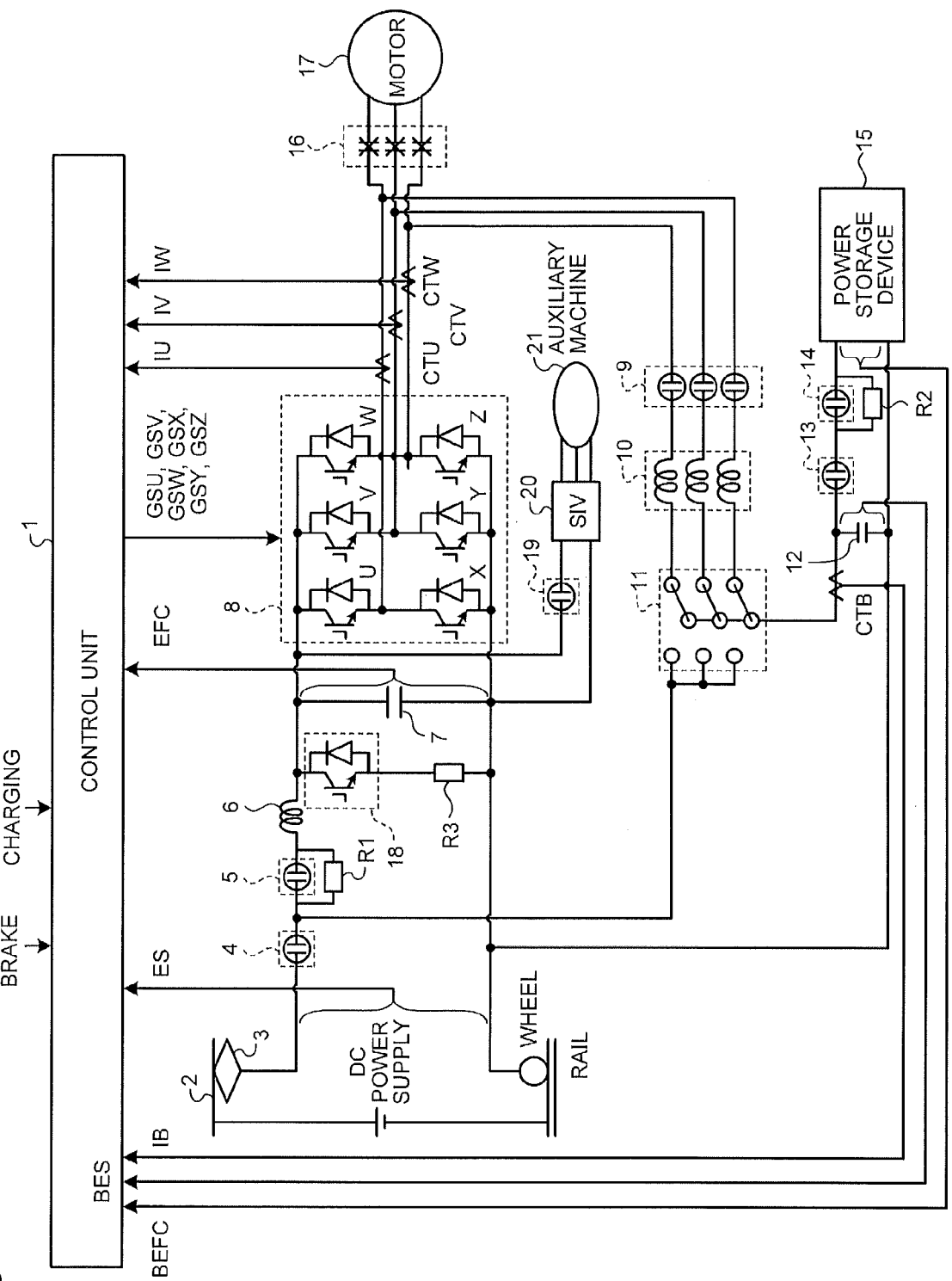
FIG. 6 is a diagram of a configuration example of an electric vehicle propulsion control device according to a fourth embodiment.

FIG. 6 is a diagram of a configuration example of a propulsion control device according to a fourth embodiment. As shown in the figure, in the propulsion control device according to this embodiment, in the configuration diagram shown in FIG. 1, connecting positions of the switch 19, the SIV 20, and the auxiliary machine 21 are changed (the connecting positions are changed to connect the switch 19, the SIV 20, and the auxiliary machine 21 to the input side of the power converting unit 8 in parallel). In FIG. 6, an operation (states of the switches and the switching unit 11) for charging the power storage device 15 using the power converting unit 8 as a DC/DC converter is also shown.

Figure 7:
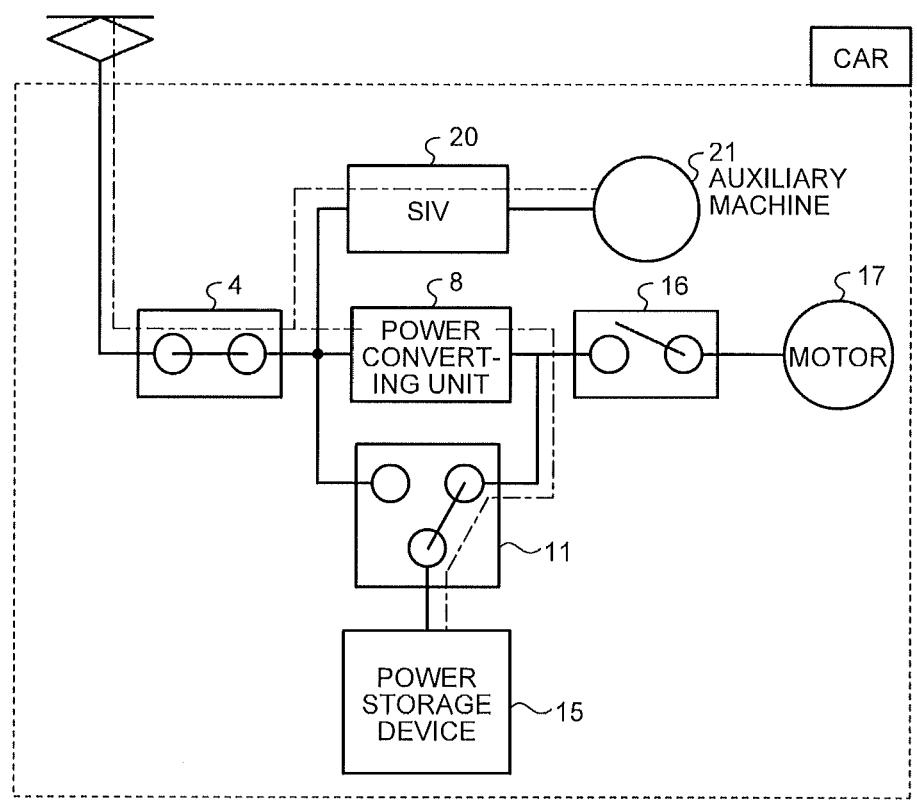
FIG. 7 is a diagram for explaining an operation example of an electric vehicle including the electric vehicle propulsion control device according to the fourth embodiment.
Figure 8:
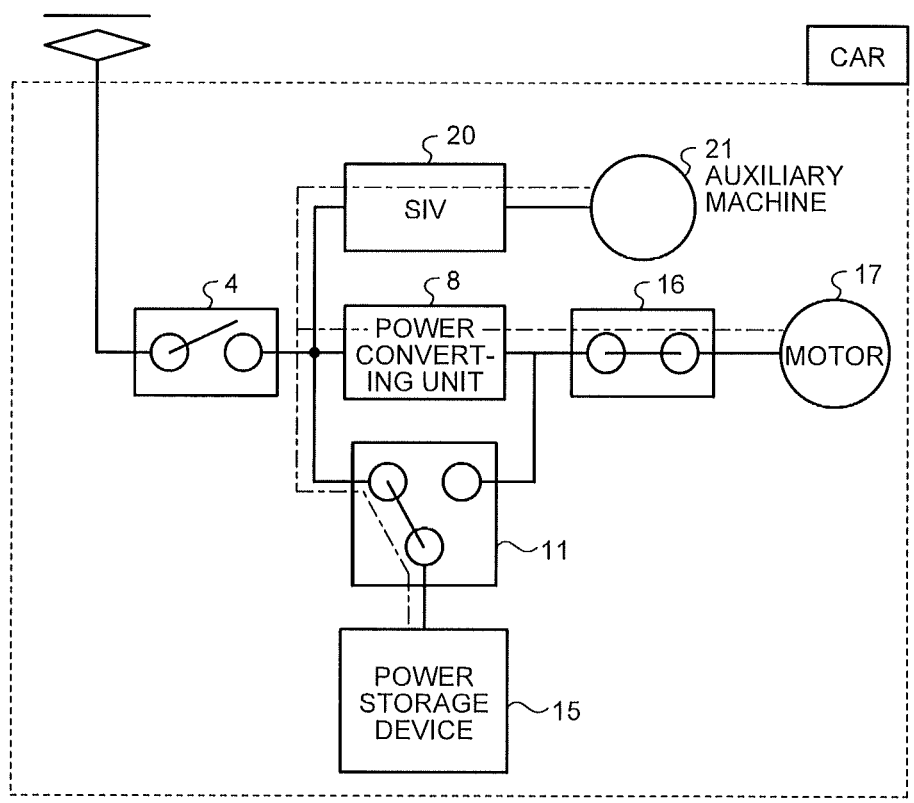
FIG. 8 is a diagram for explaining an operation example of the electric vehicle including the electric vehicle propulsion control device according to the fourth embodiment.
Figure 9:
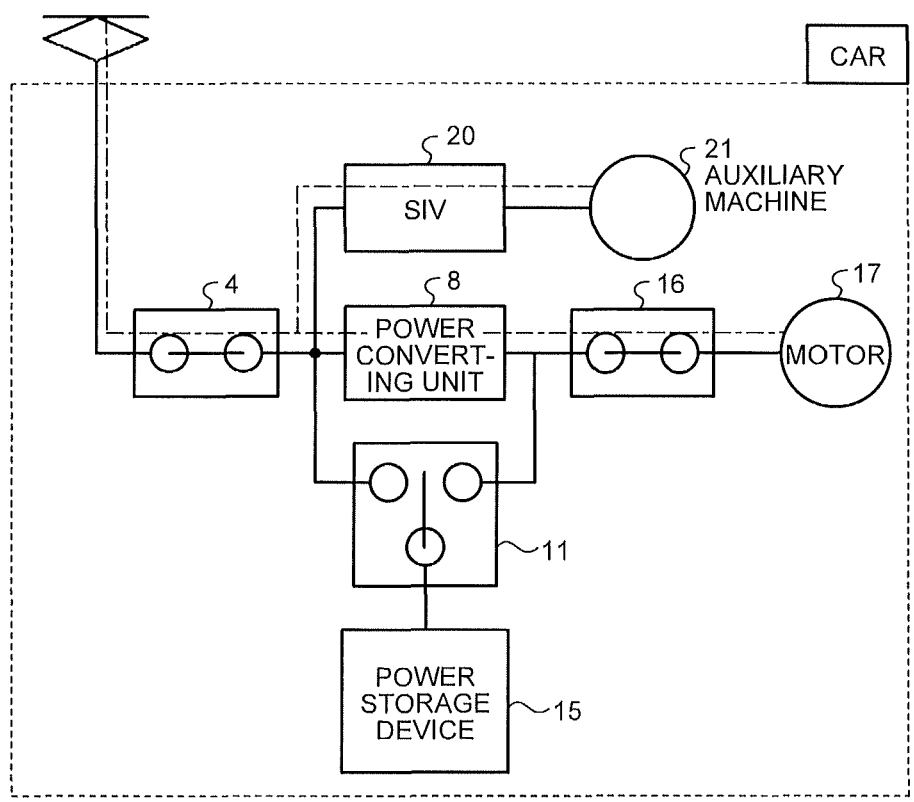
FIG. 9 is a diagram for explaining an operation example of the electric vehicle including the electric vehicle propulsion control device according to the fourth embodiment.

By adopting the configuration explained above, an operation method shown in FIGS. 7 to 9 is possible for an electric vehicle including the propulsion control device according to this embodiment. In FIGS. 7 to 9, only main units of the propulsion control device shown in FIG. 6 are shown. A flow of electric power is indicated by an alternate long and short dash line.

FIG. 7 is a diagram for explaining an operation for charging the power storage device 5. As shown in the figure, when the power storage device 15 is charged, the switch 4 is set to ON (a closed state), the switch 16 is set to OFF (an open state), and the switching unit 11 is set to connect the power storage device 15 and the output side of the power converting unit 8. The switch 5 not shown in the figure is also set to ON. In such a setting state, the SIV 20 converts a direct-current voltage supplied from the overhead wire into a three-phase alternating-current voltage for driving the auxiliary machine 21 and supplies the three-phase alternating-current voltage to the auxiliary machine 21. The power converting unit 8 operates as a DC/DC converter to convert a direct-current voltage supplied from the overhead wire into a charging voltage for the power storage device 15 and supplies the charging voltage to the power storage device 15 via the switching unit 11. As in the propulsion control device explained in the first embodiment, the operation (the operation for charging the power storage device 15) shown in FIG. 7 is carried out in a state in which an electric vehicle is standing in a rail yard or a station or a state in which the electric vehicle is performing coasting operation in an electrified section.

FIG. 8 is a diagram for explaining an operation that can be carried out even in a state in which the electric vehicle is traveling in a non-electrified section. As shown in the figure, for example, when the electric vehicle travels in the non-electrified section, the switch 4 is set to OFF (the open state), the switch 16 is set to ON (the closed state), and the switching unit 11 is set to connect the power storage device 15 and the input side of the power converting unit 8. The switch 5 not shown in the figure is also set to OFF. In such a setting state, the SIV 20 converts a direct-current voltage supplied from the power storage device 15 into a three-phase alternating-current voltage for driving the auxiliary machine 21 and supplies the three-phase alternating-current voltage to the auxiliary machine 21. The power converting unit 8 operates as an inverter to convert a direct-current voltage supplied from the power storage device 15 into a three-phase alternating-current voltage for driving the motor 17 and supplies the three-phase alternating-current voltage to the motor 17 via the switch 16.

FIG. 9 is a diagram for explaining an operation that can be carried out in a state in which the electric vehicle is traveling in the electrified section. As shown in the figure, when the electric vehicle travels in the electrified section, the switch 4 and the switch 16 are set to ON (the closed state) and the switching unit 11 is set not to connect the power storage device 15 to both the input side and the output side of the power converting unit 8. The switch 5 not shown in the figure is also set to ON. In such a setting state, the SIV 20 converts a direct-current voltage supplied from the overhead wire into a three-phase alternating-current voltage for driving the auxiliary machine 21 and supplies the three-phase alternating-current voltage to the auxiliary machine 21. The power converting unit 8 operates as an inverter to convert a direct-current voltage supplied from the overhead wire into a three-phase alternating-current voltage for driving the motor 17 and supplies the three-phase alternating-current voltage to the motor 17 via the switch 16.

As explained above, the propulsion control device according to this embodiment adopts a configuration in which the SIV 20 is connected to the input side of the power converting unit 8 in parallel. In the propulsion control device, the power converting unit 8 performs an operation (an operation of the DC/DC converter) for converting an overhead wire voltage (the direct-current voltage supplied from the overhead wire) into a charging voltage for the power storage device 15 and an operation (an operation of the inverter) for converting the overhead wire voltage or a power storage device voltage (the direct-current voltage supplied from the power storage device 15) into a driving voltage for the motor 17. The SIV 20 performs an operation for converting the overhead wire voltage or the power storage device voltage into a driving voltage for the auxiliary machine 21. Consequently, it is unnecessary to drive the motor 17 using the power storage device 15 during the traveling in the electrified section. It is possible to realize energy saving. Further, because the number of times of charging and discharging decreases, it is possible to realize the extension of the life of the power storage device 15.

Fifth Embodiment

In the first to fourth embodiments, the propulsion control device is explained that converts, in the electric vehicle that receives the supply of the direct-current voltage from the overhead wire (the electric vehicle adapted to a direct-current electrification system), the direct-current voltage into the three-phase alternating-current voltage for driving the motor 17 and the direct-current voltage for charging the power storage device 15. On the other hand, in a fifth embodiment, a propulsion control device of an electric vehicle is explained that receives the supply of an alternating-current voltage from the overhead wire (an electric vehicle of an alternating-current electrification system). Specifically, a propulsion control device is explained that performs, with one power converting unit, generation of a three-phase alternating-current voltage for driving a motor and generation of a direct-current voltage for charging a power storage device.

Figure 10:
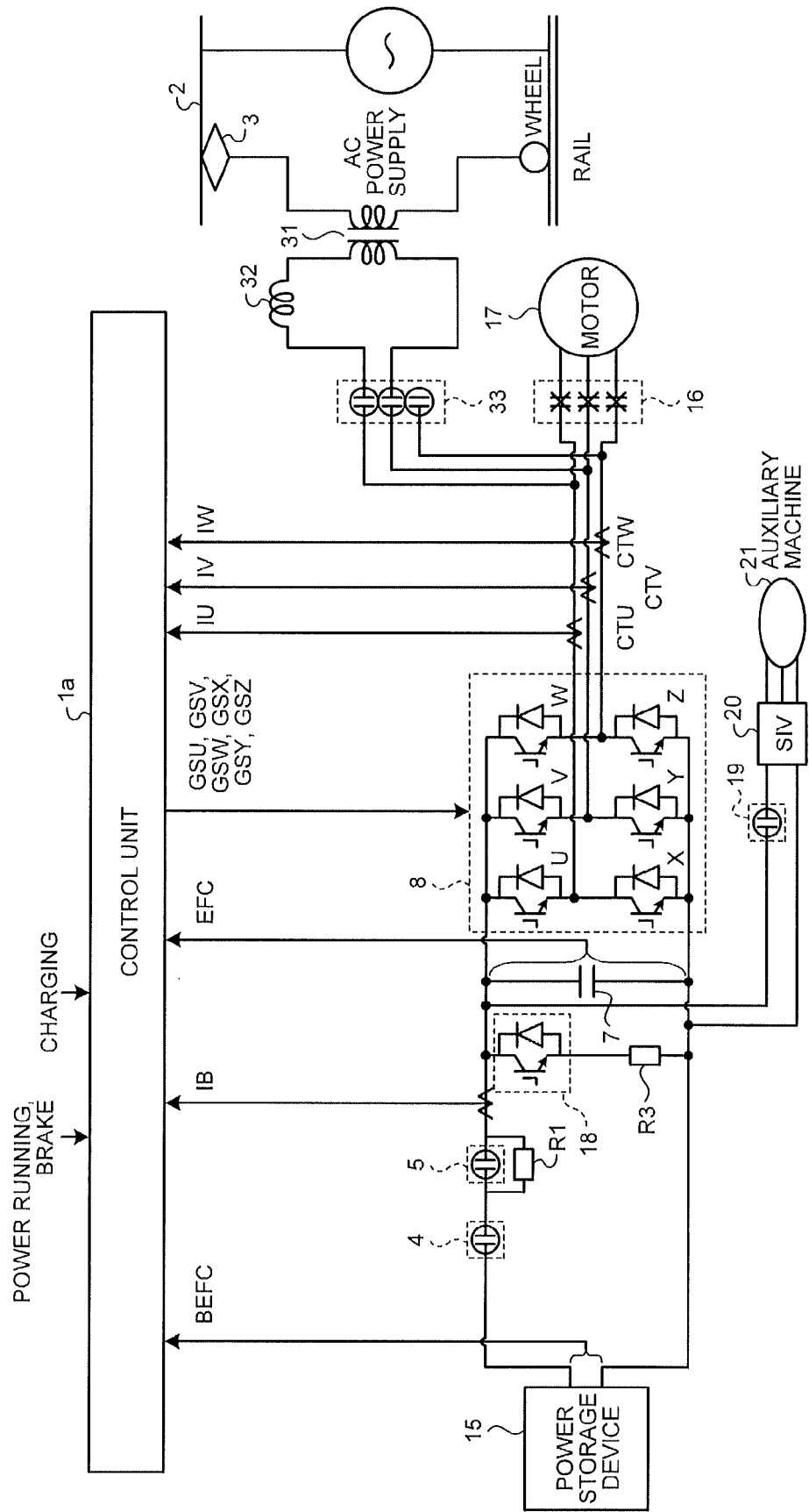
FIG. 10 is a diagram for explaining a configuration example and an operation of an electric vehicle propulsion control device according to a fifth embodiment.
Figure 11:
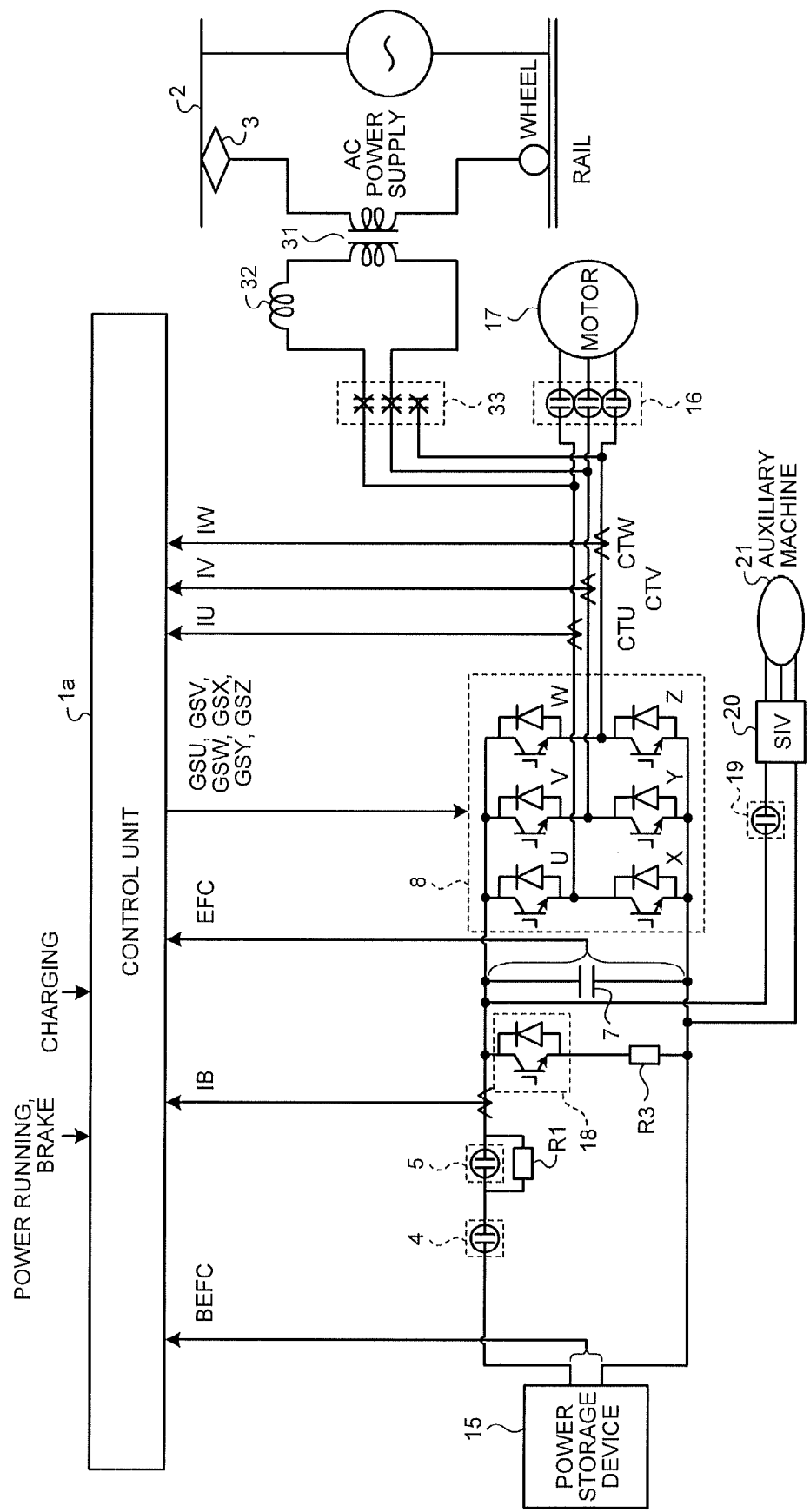
FIG. 11 is a diagram for explaining a configuration example and an operation of the electric vehicle propulsion control device according to the fifth embodiment.

FIGS. 10 and 11 are diagrams for explaining configurations and operations of the propulsion control device according to the fifth embodiment. In the figures, components same as the components of the propulsion control device explained in the first embodiment are denoted by the same reference numerals and signs. In FIG. 10, an operation for charging the power storage device 15 is shown. In FIG. 11, an operation for driving the motor 17 is shown.

When the power storage device 15 is charged in the propulsion control device according to this embodiment, as shown in FIG. 10, the power collecting device 3 collects alternating-current power from the overhead wire 2. The alternating-current power collected by the power collecting device 3 is converted into a predetermined voltage by a transformer 31 and supplied to the power converting unit 8 via a reactor 32 and a switch 33. The power converting unit 8 is controlled by a control unit 1a to operate as a converter and convert an alternating-current voltage supplied through the switch 33 into a direct-current voltage for charging the power storage device 15. The switch 5 is set in a closed state. The switch 16 is opened to disconnect the motor 17 from the power converting unit 8.

The control unit 1a is the same as the control unit 1 explained in the first embodiment except that a part of a control operation for the power converting unit 8 is different, i.e., the switching elements of the power converting unit 8 are controlled such that the power converting unit 8 operates as a converter when the power storage device 15 is charged. A control method for casing the power converting unit 8 having the configuration shown in the figure to operate as a converter is already well known. Therefore, explanation of the control method is omitted. The control unit 1a performs opening and closing control for the switch 3 as well.

As in the first embodiment, a charging operation is performed when charging start operation is executed in a state in which no problem occurs even if the power converting unit 8 and the motor 7 are disconnected (a state that is neither a power running state nor a regenerative operation state) such as a state in which the electric vehicle is standing or a coasting state and it is determined that charging is necessary because the voltage of the power storage device 15 is low. The alternating-current voltage supplied from the overhead wire 2 can be either a single-phase voltage or a three-phase voltage.

When driving the motor 17 in the propulsion control device according to this embodiment, as shown in FIG. 11, the control unit 1a opens the switch 33 and cuts off the supply of the alternating-current voltage from the overhead wire 2 to the power converting unit 8. The control unit 1a closes the switch 16 to connect the motor 17. In this state, the control unit 1a causes the power converting unit 8 to operate as an inverter and converts the direct-current voltage supplied from the power storage device 15 into a three-phase alternating-current voltage for driving the motor 17. When the control unit 1a causes the power converting unit 8 to operate as an inverter, a control procedure is as explained in the first embodiment.

As explained above, when it is unnecessary to connect the power converting unit 8 and the motor 17, the propulsion control device according to this embodiment causes the power converting unit to operate as a converter to thereby convert the alternating-current voltage supplied from the overhead wire into a desired direct-current voltage and charge the power storage device. Consequently, in the electric vehicle adapted to the alternating-current electrification system, as in the first embodiment, it is possible to realize a reduction in size and weight and a reduction in costs of the propulsion control device.

When a formation in which a plurality of cars including the propulsion control devices according to this embodiment are coupled is operated, as in the second embodiment, it is also possible to cause at least one of the propulsion control devices included in one formation to operate as a converter and cause at least one of the propulsion control devices to operate as an inverter. In this case, the car can travel without consuming electric power of the power storage device in an alternating-current electrified section under the overhead wire. It is possible to realize energy saving. Further, because the number of times of charging and discharging decreases, it is possible to realize the extension of the life of the power storage device 15.

In a state in which the electric vehicle is standing in a rail yard or a station, an alternating-current power supply can be received from another power system rather than from the overhead wire. Consequently, even in a place where there is no overhead wire, it is possible to charge the power storage device 15. Further, a charging facility including an overhead wire is unnecessary in the rail yard or the station. It is possible to charge the power storage device 15 at lower costs if the power storage device 15 is charged in a period of time when electricity charges are low such as at night.

Sixth Embodiment

Figure 12:
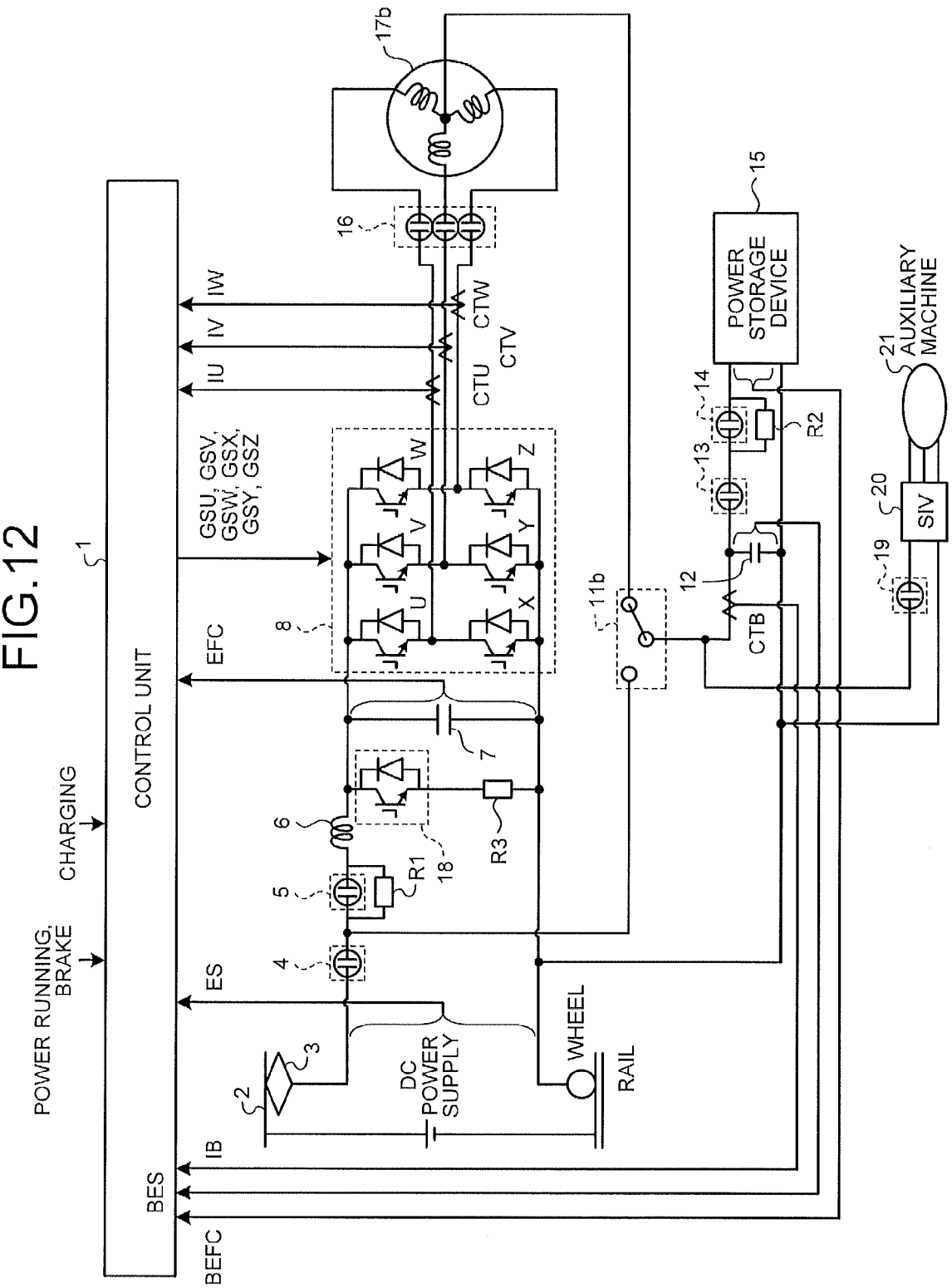
FIG. 12 is a diagram for explaining a configuration example and an operation of an electric vehicle propulsion control device according to a sixth embodiment.
Figure 13:
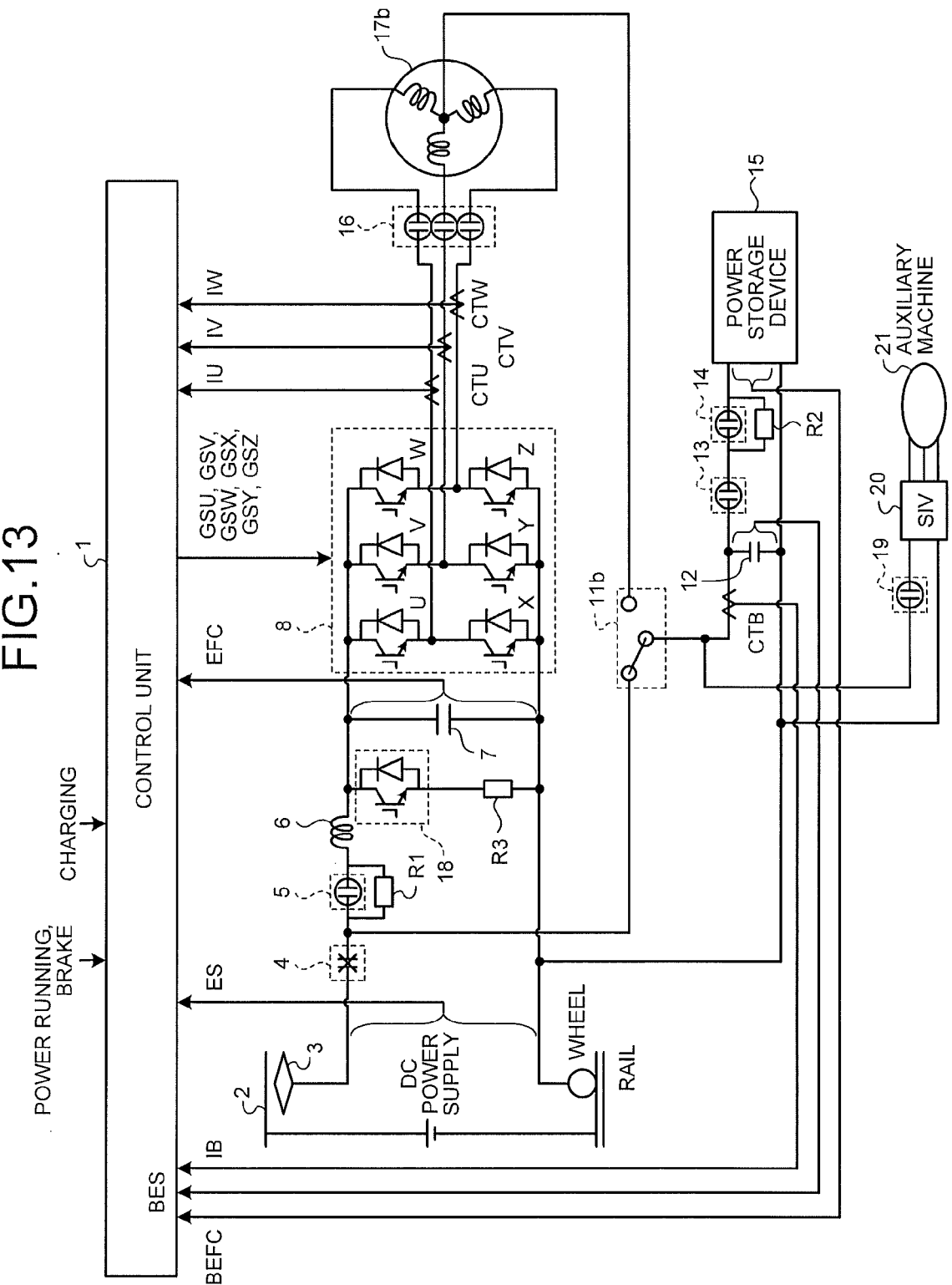
FIG. 13 is a diagram for explaining a configuration example and an operation of the electric vehicle propulsion control device according to the sixth embodiment.

In a sixth embodiment, a modification of the propulsion control device explained in the first embodiment is explained. FIGS. 12 and 13 are diagrams for explaining configuration examples and operations of a propulsion control device according to the sixth embodiment. In the figures, components same as the components of the propulsion control device explained in the first embodiment are denoted by the same reference numerals and signs. In FIG. 12, an operation for charging the power storage device 15 is shown. In FIG. 13, an operation for driving the motor 17 is shown.

As shown in the figures, in the propulsion control device according to this embodiment, the switch 9 and the battery reactor 10 of the propulsion control device according to the first embodiment (see FIG. 1) are omitted and the switching unit 11 and the motor 17 are replaced with a switching unit 11b and a motor 17b.

In other words, in the propulsion control device according to this embodiment, a three-phase connection of the motor 17b is a star connection and a neutral point of the motor 17b is connected to the switching unit 11b.

When this configuration is adopted, a coil of the motor 17b can be used instead of the battery reactor 10 required in the first embodiment.

In the propulsion control device according to this embodiment, when charging the power storage device 15, i.e., when causing the power converting unit 8 to operate as a DC/DC converter, the control unit 1 controls the switches 4, 5, 13, and 14 according to a procedure same as the procedure in the first embodiment. The control unit 1 switches the switching unit 11b to the motor 17b side (the output side of the power converting unit 8). At this point, the control unit 1 closes the switch 16 (see FIG. 12). The control unit 1 controls the power converting unit 8 to operate as the DC/DC converter.

When a charging operation for the power storage device 15 is executed, as in the first embodiment, the control unit 1 checks a state of an electric vehicle (power running, standing, braking) and a voltage (a charged state) of the power storage device 15 and determines whether the operation is started.

When driving the motor 17b using the power storage device 15, i.e., when causing the power converting unit 8 to operate as an inverter, the control unit 1 controls the switches 4 and 16 and the discharge switch 18 according to a procedure same as the procedure in the first embodiment. The control unit 1 switches the switching unit 11b to the input side of the power converting unit 8 (see FIG. 13). The control unit 1 controls the power converting unit 8 to operate as an inverter.

As explained above, in this embodiment, the motor 17b in which the three-phase connection is the star connection is adopted. When the power converting unit is caused to operate as the DC/DC converter, a power converting unit output is smoothed using the coil of the motor 17b. Consequently, it is possible omit a dedicated reactor for smoothing a DC/DC converter output (equivalent to the battery reactor 10 shown in FIG. 1).

Seventh Embodiment

In the example explained in the first to sixth embodiments, in the propulsion control device that receives the supply of electric power from the overhead wire 2, the power converting unit is used as the DC/DC converter and the inverter or used as the converter and the inverter. On the other hand, in the following explanation of a seventh embodiment, in a car configured to perform power generation in the car and drive a motor with obtained electric power, a power converting unit is used for two uses (a converter and an inverter).

Figure 14:
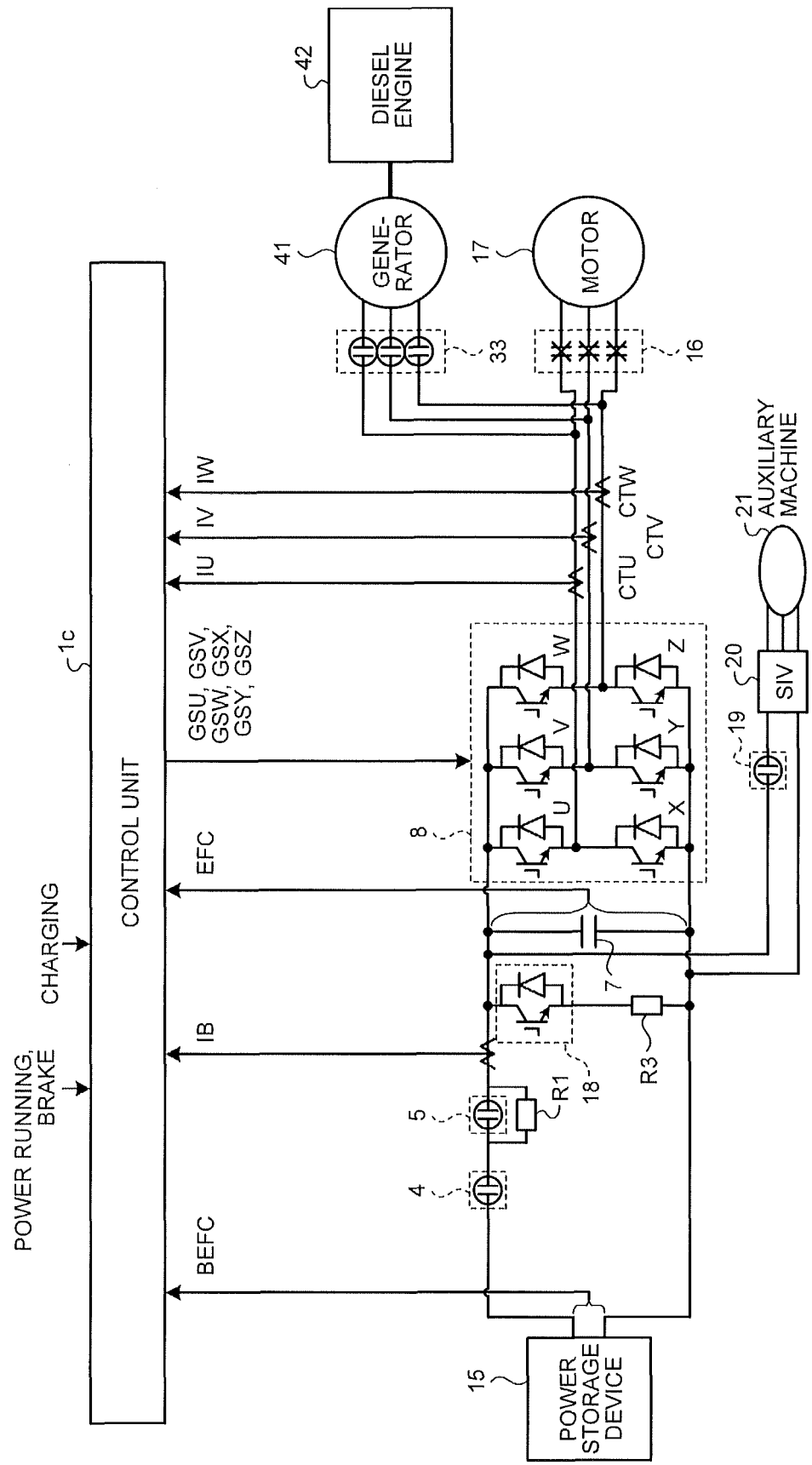
FIG. 14 is a diagram for explaining a configuration example and an operation of an electric vehicle propulsion control device according to a seventh embodiment.
Figure 15:
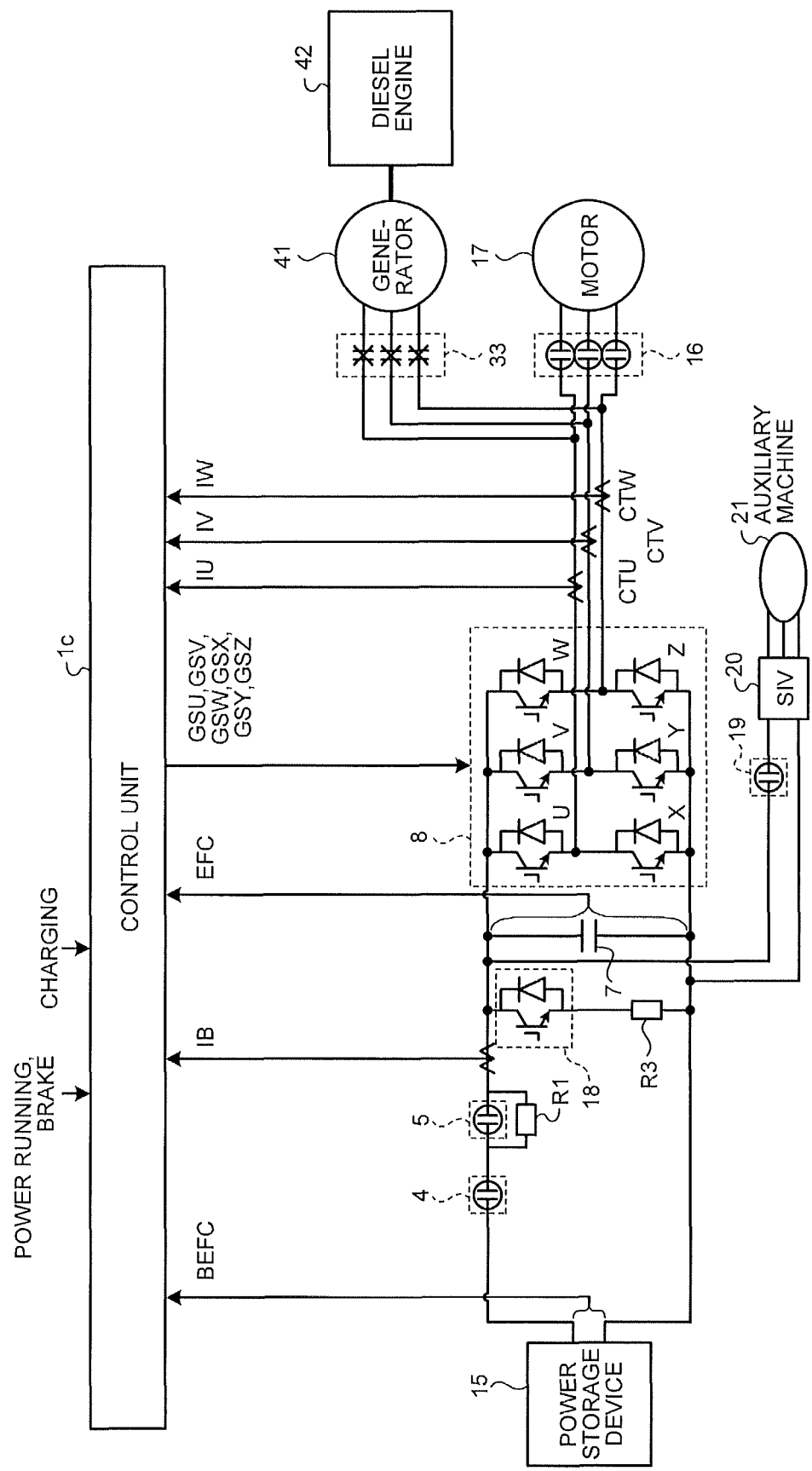
FIG. 15 is a diagram for explaining a configuration example and an operation of the electric vehicle propulsion control device according to the seventh embodiment.

FIGS. 14 and 15 are diagrams for explaining configuration examples and operations of the propulsion control device according to the seventh embodiment. In the figures, components same as the components of the propulsion control device explained in the preceding embodiments are denoted by the same reference numerals and signs. In FIG. 14, an operation for charging the power storage device 15 is shown. In FIG. 15, an operation for driving the motor 17 is shown.

In FIGS. 14 and 15, the power collecting device 3, the transformer 31, and the reactor 32 (a block for receiving alternating-current power from the overhead wire 2) of the propulsion control device (see FIGS. 10 and 11) according to the fifth embodiment are replaced with a generator 41 and a diesel engine 42. The generator 41 is driven by power output from the diesel engine 42 to perform power generation and generate three-phase alternating-current power. The three-phase alternating-current power is input to an alternating-current terminal side of the power converting unit 8 if the switch 33 is closed. The control unit 1c performs an operation same as the operation of the control unit 1a explained in the fifth embodiment. However, to distinguish both the control units, the former is referred to as control unit 1c.

In charging the power storage device 15 in the propulsion control device according to this embodiment, as shown in FIG. 14, the control unit 1c closes the switch 33 and opens the switch 16. In driving the motor 17, as shown in FIG. 15, the control unit 1c opens the switch 33 and closes the switch 16. In other words, the control unit 1c switches a connection destination of the alternating-current terminal of the power converting unit 8 according to whether the power storage device 15 is charged or the motor 17 is driven. The propulsion control device according to the seventh embodiment is the same as the propulsion control device according to the fifth embodiment except this control operation.

When a formation in which a plurality of cars including the propulsion control devices according to this embodiment are coupled is operated, as in the second embodiment, it is also possible to cause at least one of the propulsion control devices included in one formation to operate as a converter and cause at least one of the propulsion control devices to operate as an inverter.

As explained above, in the car including the generator, it is possible to cause the power converting unit to operate as the converter and the inverter.

In the above explanation, the propulsion control device of the railway car is explained as an example. However, in the embodiments such as the first embodiment in which the car does not need to cooperate with other cars, the propulsion control device can be connected to other direct-current power supply to be applied to the fields of hybrid mobile bodies (an automobile, a motorcycle, etc.), hybrid construction machines (a dump truck, a bulldozer, a digger, etc.), and ships mounted with power storage devices (a lithium ion battery, a nickel-metal hydride battery, an electric double layer capacitor, a lithium ion capacitor, a flywheel, etc.).

Eighth Embodiment

Figure 16:
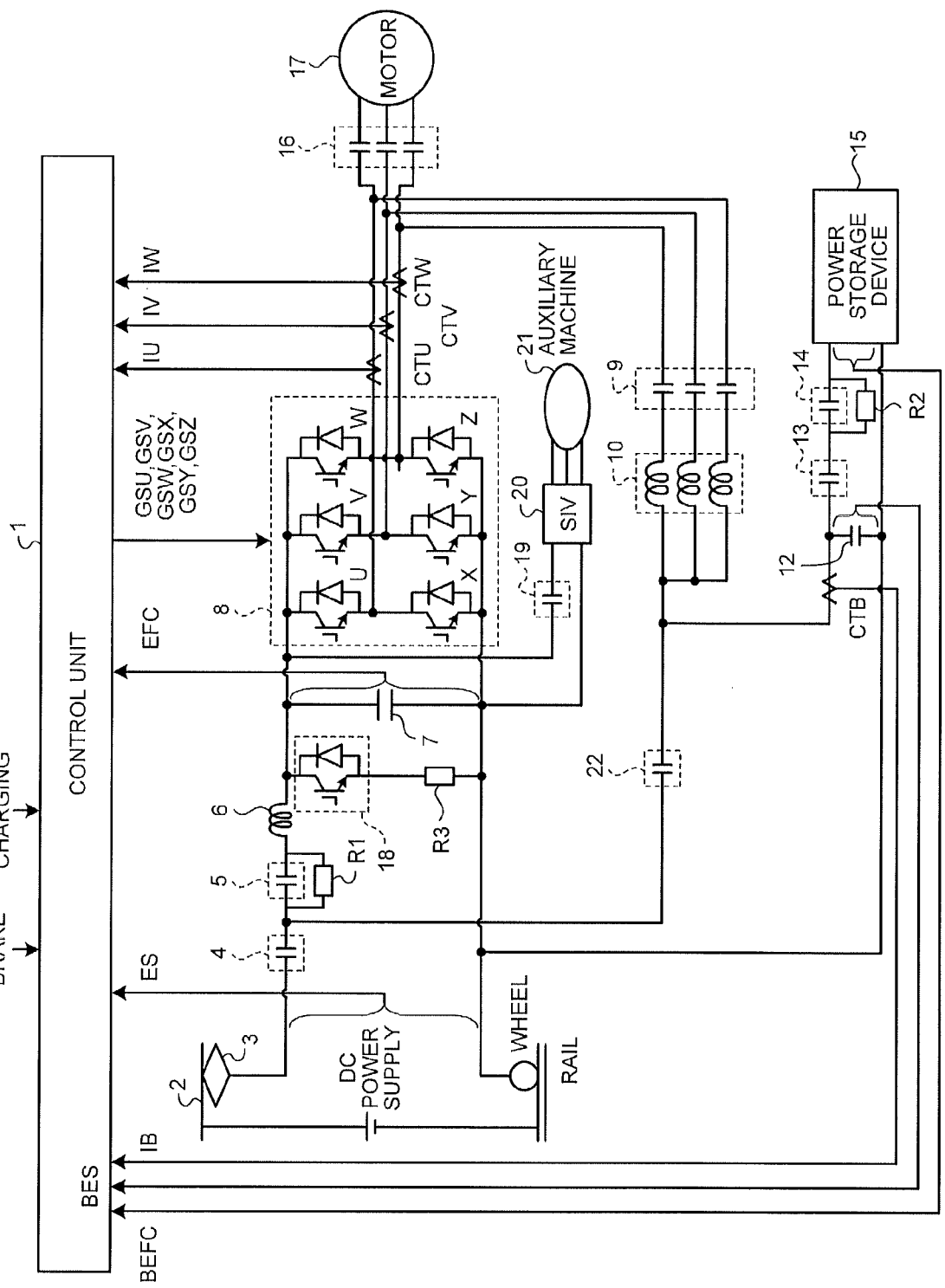
FIG. 16 is a diagram for explaining a configuration example and an operation of an electric vehicle propulsion control device according to an eighth embodiment.

FIG. 16 is a diagram of a configuration example of a propulsion control device according to an eighth embodiment. As shown in the figure, like the propulsion control device according to the fourth embodiment shown in FIG. 6, the propulsion control device according to this embodiment obtains, from both the ends of the filter capacitor 7, electric power supplied to the auxiliary machine 21. On the other hand, the connection configuration of the power storage device 15 is changed. In FIG. 6, the switching unit 11 is used for the connection of a first terminal side (the input side in the above explanation, specifically, a direct-current bus between the switches 4 and 5) and a second terminal side (the output side in the above explanation, specifically, the battery reactor 10) in the power converting unit 8. However, in FIG. 16, the power storage device 15 is directly connected to the battery reactor 10 and is connected to the direct-current bus between the switches 4 and 5 via a switch 22. In FIG. 16, components same as or equivalent to the components of the propulsion control device shown in FIG. 6 are denoted by the same reference numerals and signs and redundant explanation of the components is omitted.

By adopting the configuration explained above, an operation method shown in FIGS. 17 to 27 is possible for an electric vehicle including the propulsion control device according to this embodiment. In FIGS. 17 to 27, only main units of the propulsion control device shown in FIG. 16 are shown. As in the above explanation, a flow of electric power is indicated by an alternate long and short dash line.

Figure 17:
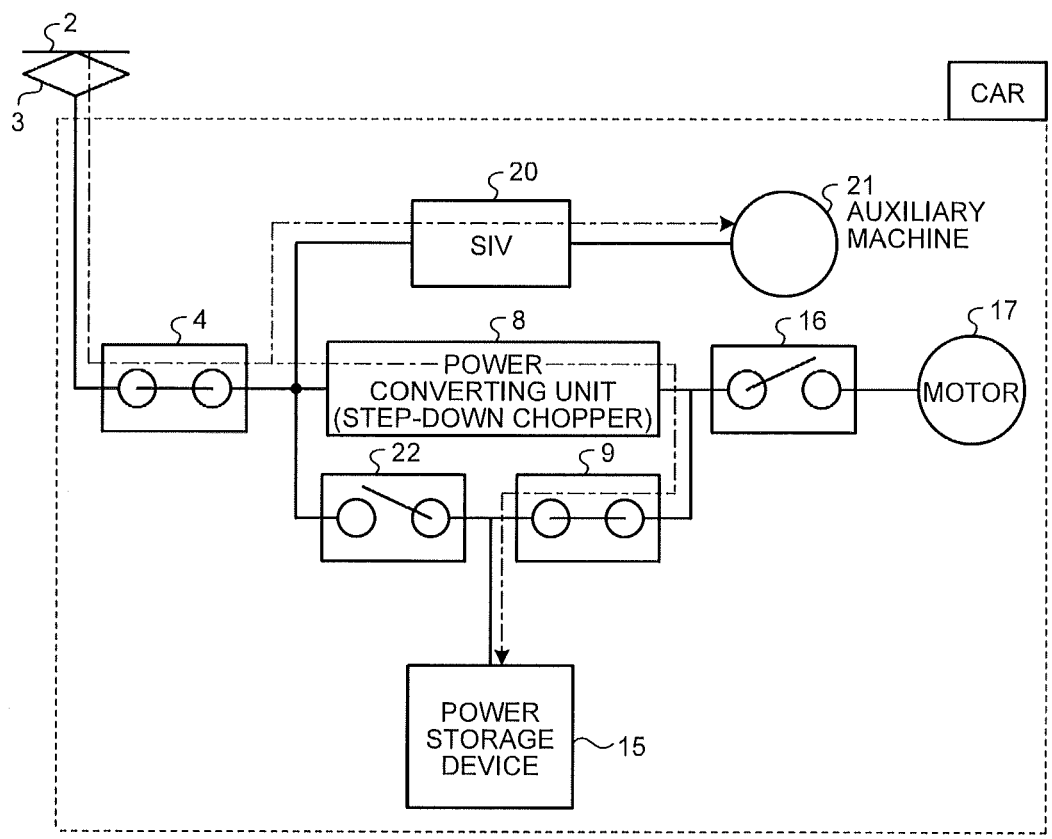
FIG. 17 is a diagram for explaining an operation for charging a power storage device.

FIG. 17 is a diagram for explaining an operation for charging the power storage device 15. As shown in FIG. 15, when the power storage device 15 is charged, the switch 4 is set to ON (a closed state), the switch 16 is set to OFF (in an open state), the switch 9 is set to ON (the closed state), the switch 16 is set to OFF (the open state), the switch 9 is set to ON (the closed state), and the switch 22 is set to OFF (the open state). Although not shown in the figure, the switch 5 is set to ON (in the following explanation, it is assumed that the switch 5 is set to ON unless specifically noted otherwise).

In such a setting state, the SIV 20 converts a direct-current voltage supplied from the overhead wire 2 into a three-phase alternating-current voltage for driving the auxiliary machine 21 and supplies the three-phase alternating-current voltage to the auxiliary machine 21. The power converting unit 8 operates as a step-down chopper to charge the power storage device 15. As in the propulsion control device explained in the first embodiment, the operation shown in FIG. 17 (the charging operation for the power storage device 15) is carried out in a state in which an electric vehicle is standing in a rail yard or a station or a state in which the electric vehicle is performing a coasting operation in an electrified section.

A switching sequence for switching a power supply source from the overhead wire 2 to the power storage device 15 and a switching sequence for switching the power supply source from the power storage device 15 to the overhead wire 2 are explained with reference to the drawings of FIGS. 18 to 28.

Figure 18:
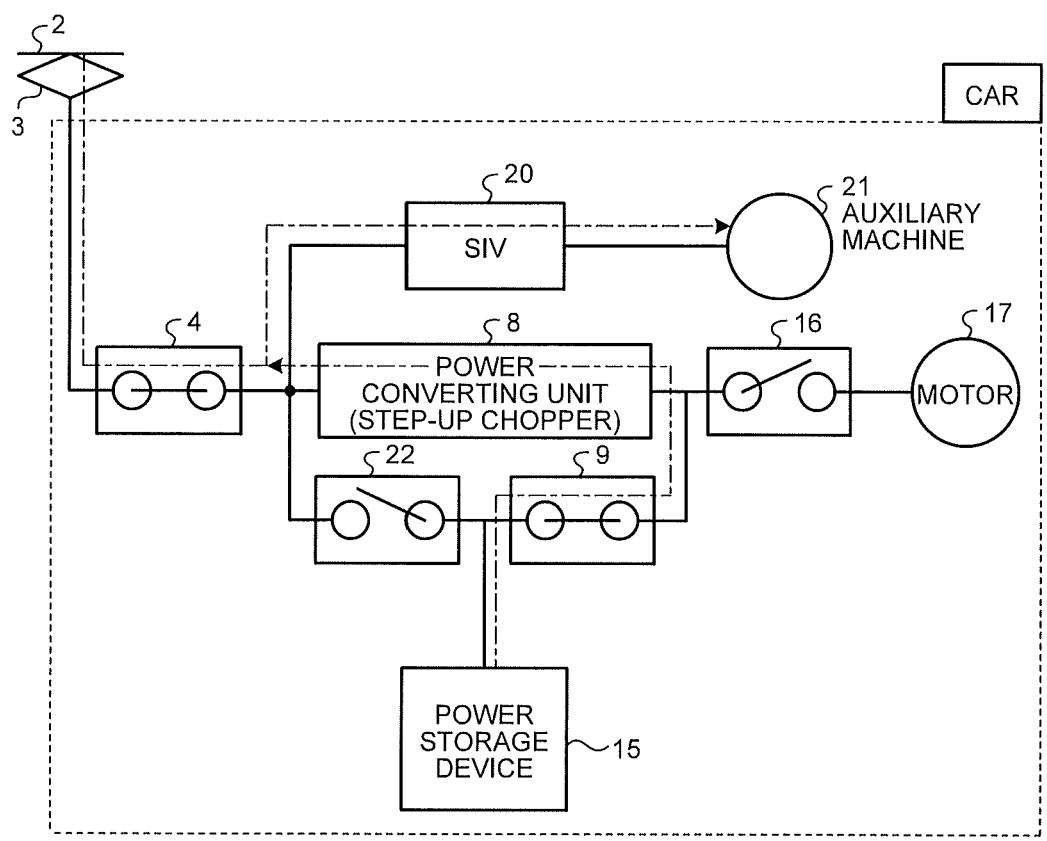
FIG. 18 is a diagram for explaining a switching sequence for switching a power supply source from an overhead wire to the power storage device.

First, the switching sequence for switching the power supply source from the overhead wire 2 to the power storage device 15 is explained. FIGS. 18 to 22 are figures for explaining the switching sequence for switching the power supply source from the overhead wire 2 to the power storage device 15. In FIG. 18, when the power supply source is switched from the overhead wire 2 to the power storage device 15, while the switches are maintained in the state shown in FIG. 17, the power converting unit 8 is caused to operate as a step-up chopper to step up an output voltage of the power storage device 15 such that an input voltage of the SIV 20 (=an input voltage of the power converting unit 8) is substantially equal to an overhead wire voltage.

Figure 19:
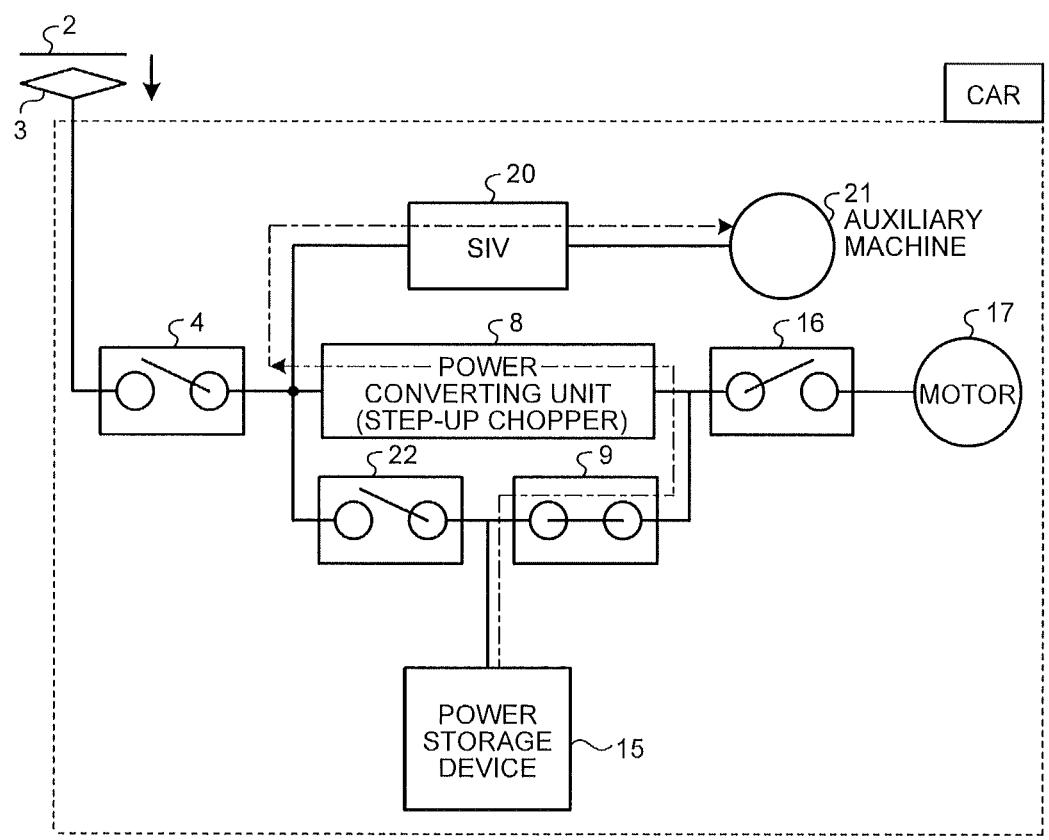
FIG. 19 is a diagram for explaining the switching sequence for switching the power supply source from the overhead wire to the power storage device.
Figure 20:
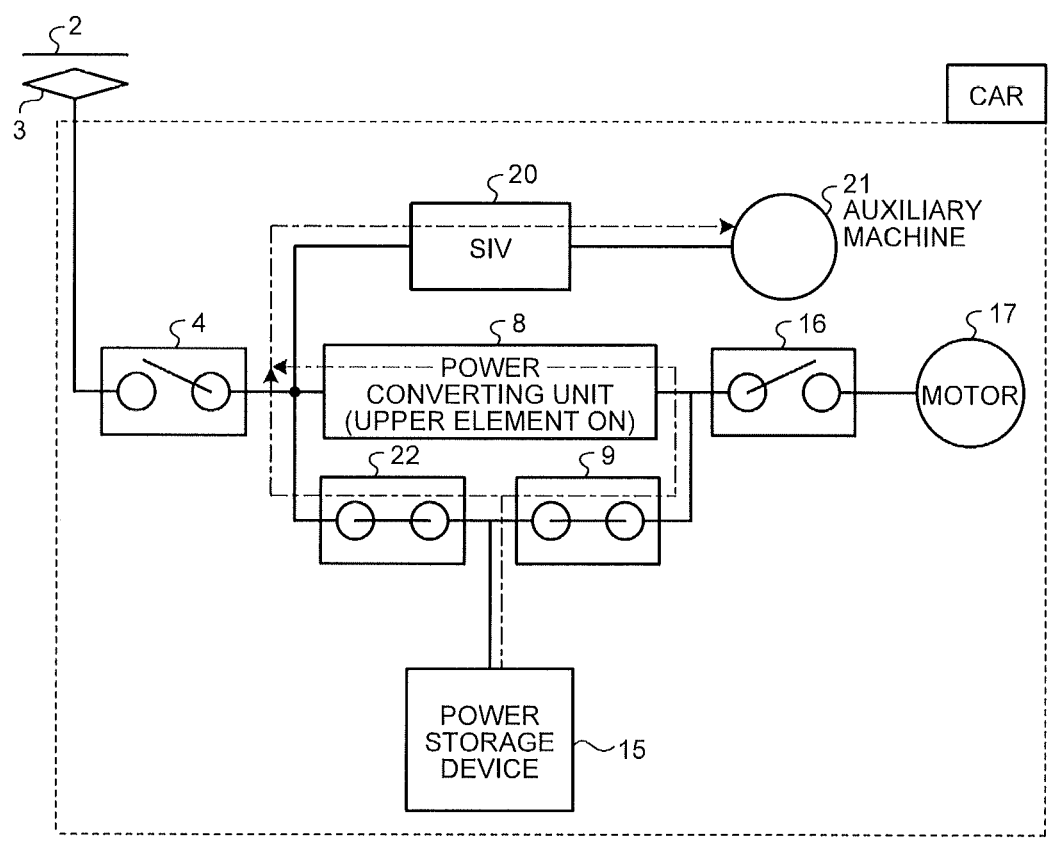
FIG. 20 is a diagram for explaining the switching sequence for switching the power supply source from the overhead wire to the power storage device.
Figure 21:
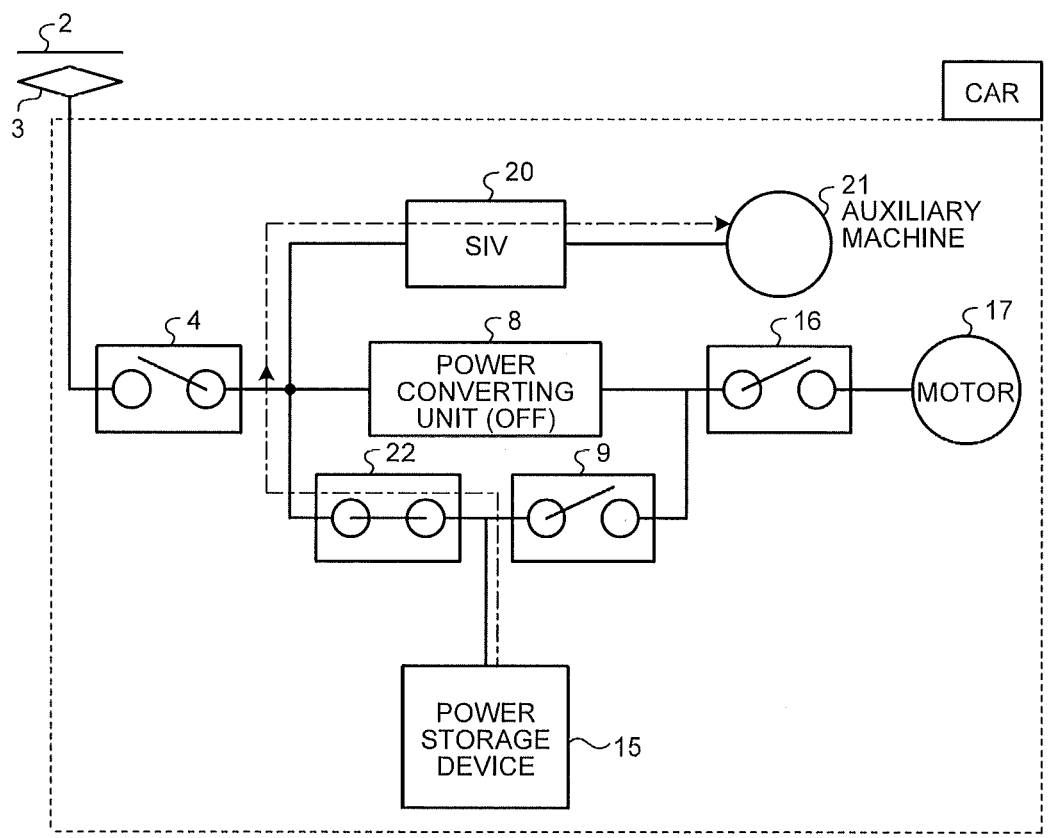
FIG. 21 is a diagram for explaining the switching sequence for switching the power supply source from the overhead wire to the power storage device.

As shown in FIG. 19, the switch 4 is controlled to be changed from ON to OFF and the pantograph 3 is lowered. Further, a step-up ratio (a voltage on the first terminal side/a voltage of the power storage device 15) of the power converting unit 8 is reduced to drop the voltage on the first terminal side in the power converting unit 8 (=the input voltage of the SIV 20) to near the output voltage of the power storage device 15. When the voltage on the first terminal side drops to near the output voltage of the power storage device 15, as shown in FIG. 20, the switch 22 is controlled to be changed from OFF to ON and a not-shown upper element (an upper arm element) in the power converting unit 8 is controlled to be ON to short-circuit (conduct) the first terminal side and the second terminal side of the power converting unit 8. A state shown in FIG. 20 is a state in which the first terminal side and the second terminal side of the power converting unit 8 are electrically connected by two paths, i.e., a path extending via the switch 22 and a path extending via the switch 9 and the upper arm element of the power converting unit 8. Therefore, even if one of the paths is disconnected, the electrical connection between the SIV 20 and the power storage device 15 is maintained. Therefore, from this state, as shown in FIG. 21, the switch 9 is controlled to be changed from ON to OFF and all upper and lower elements are set to OFF as switch control for the power converting unit 8.

In states shown in FIGS. 18 and 19, an output of the power storage device 15 is supplied to the SIV 20 via the power converting unit 8. However, in a state shown in FIG. 21, an output of the power storage device 15 is directly supplied to the SIV 20 not via the power converting unit 8. Consequently, when the power supply source to the SIV 20 is switched from the overhead wire 2 to the power storage device 15, the input voltage of the SIV 20 is not interrupted. Therefore, it is possible to prevent a short break involved in the switching of the power supply source and continue the power supply to the auxiliary machine 21.

Figure 22:
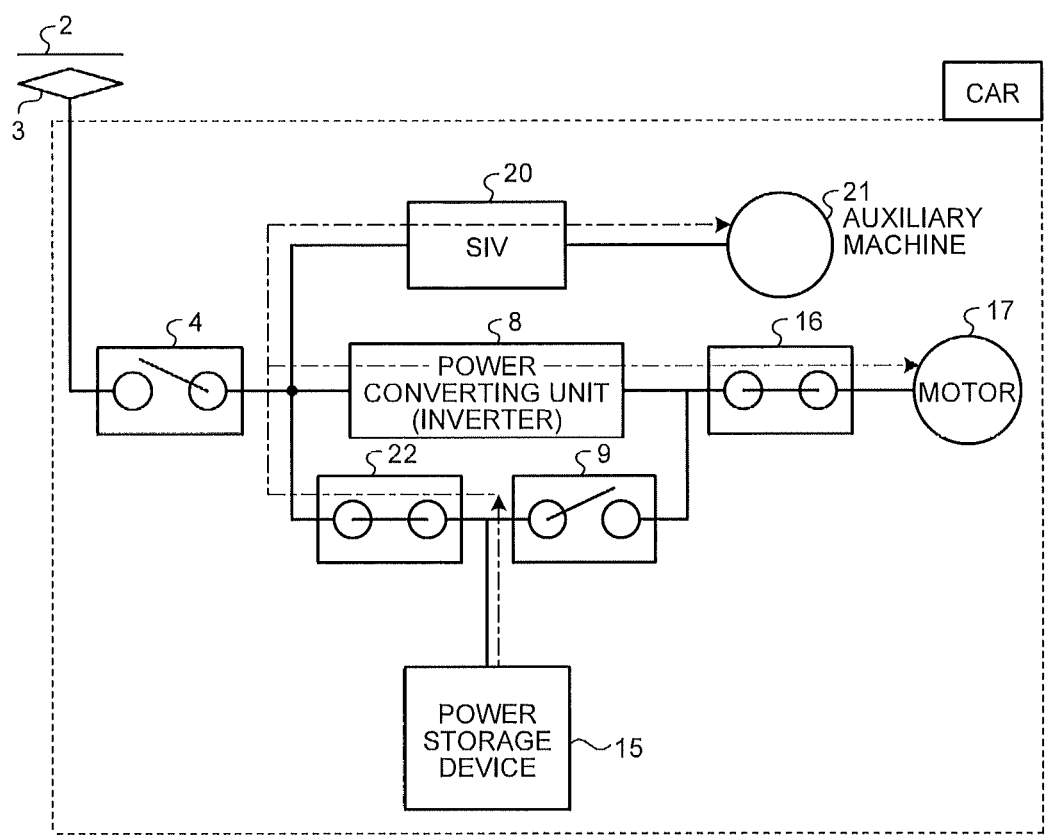
FIG. 22 is a diagram for explaining the switching sequence for switching the power supply source from the overhead wire to the power storage device.

As in the embodiments explained above, the charging of the power storage device 15 is executed when the electric vehicle is coasting or standing. When the electric vehicle transitions from a coasting or standing state to power running, as shown in FIG. 22, the switch 16 is set to ON to cause the power converting unit 8 to operate as an inverter. In this case, the electric power of the power storage device 15 is used as operation power for the auxiliary machine 21 and electric power for driving the motor.

FIGS. 23 to 27 are figures for explaining the sequence for switching the power supply source from the power storage device 15 to the overhead wire 2. The sequence is opposite to the sequence shown in FIGS. 17 to 22.

Figure 23:
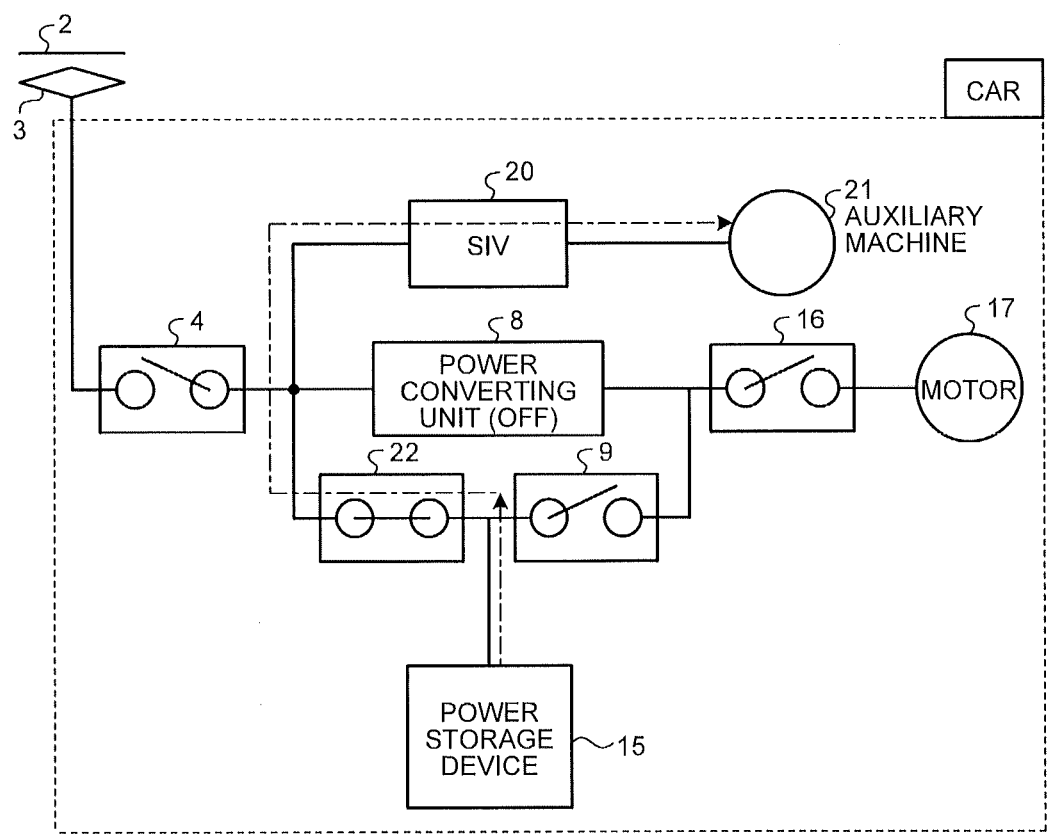
FIG. 23 is a diagram for explaining a switching sequence for switching the power supply source from the power storage device to the overhead wire.
Figure 24:
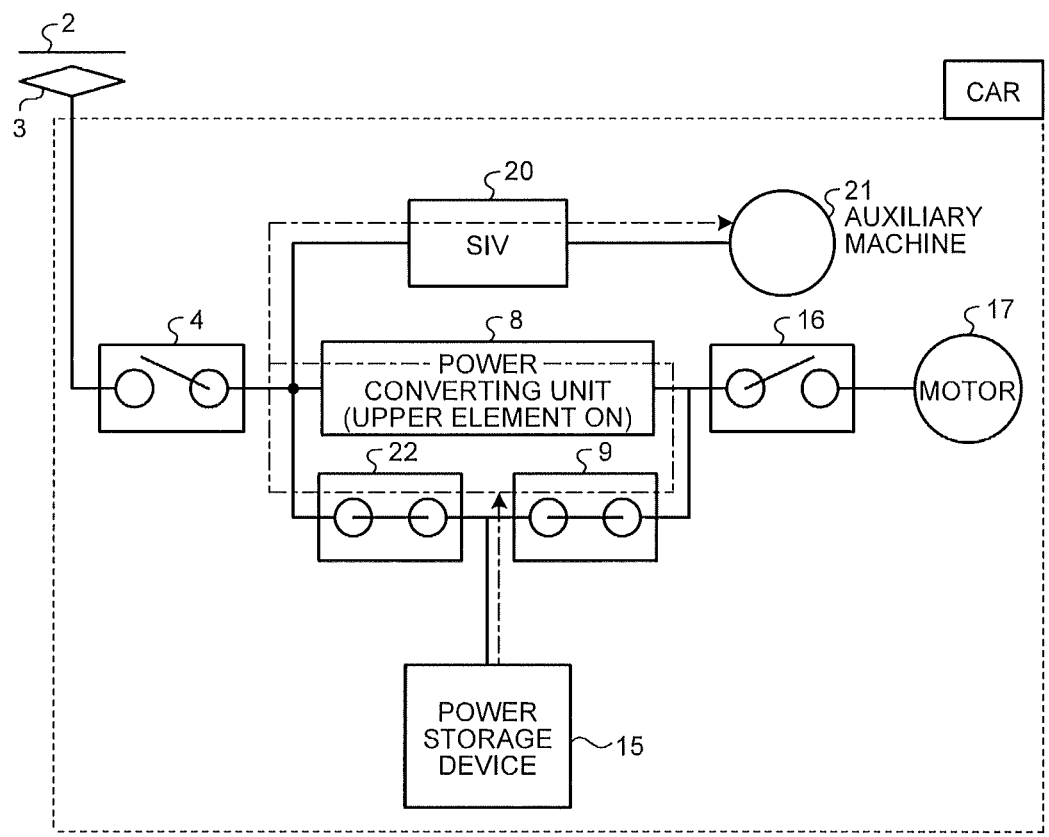
FIG. 24 is a diagram for explaining the switching sequence for switching the power supply source from the power storage device to the overhead wire.
Figure 25:
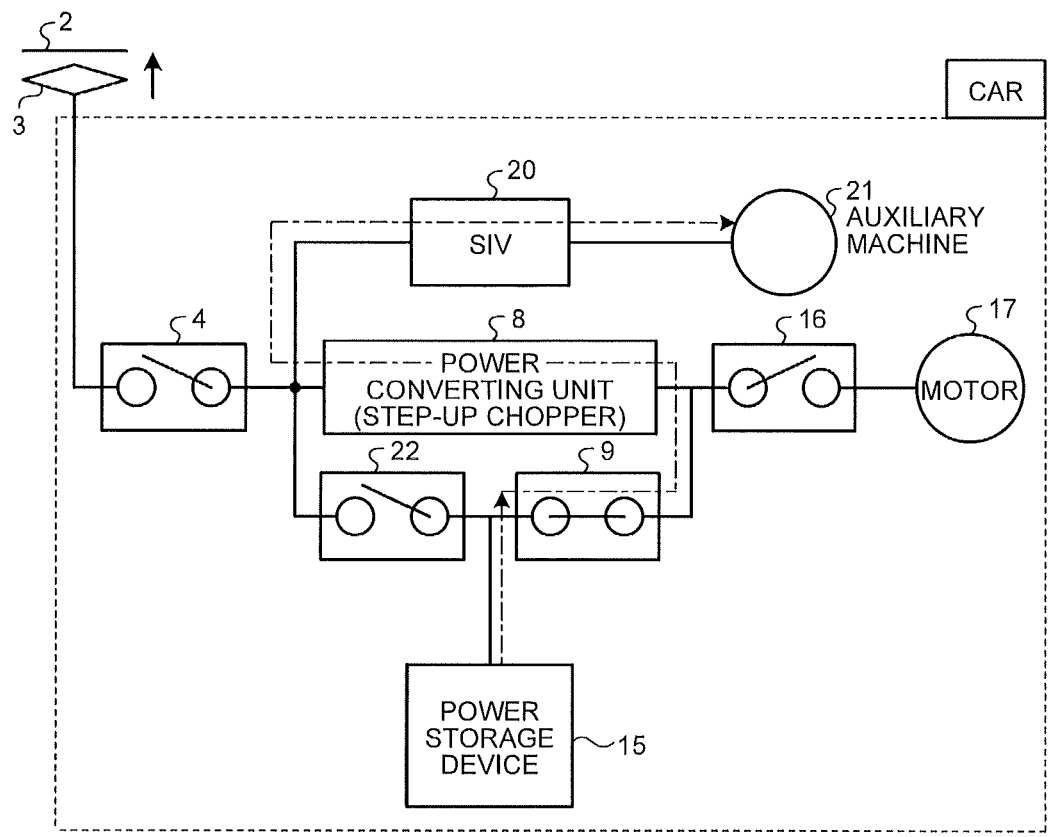
FIG. 25 is a diagram for explaining the switching sequence for switching the power supply source from the power storage device to the overhead wire.
Figure 26:
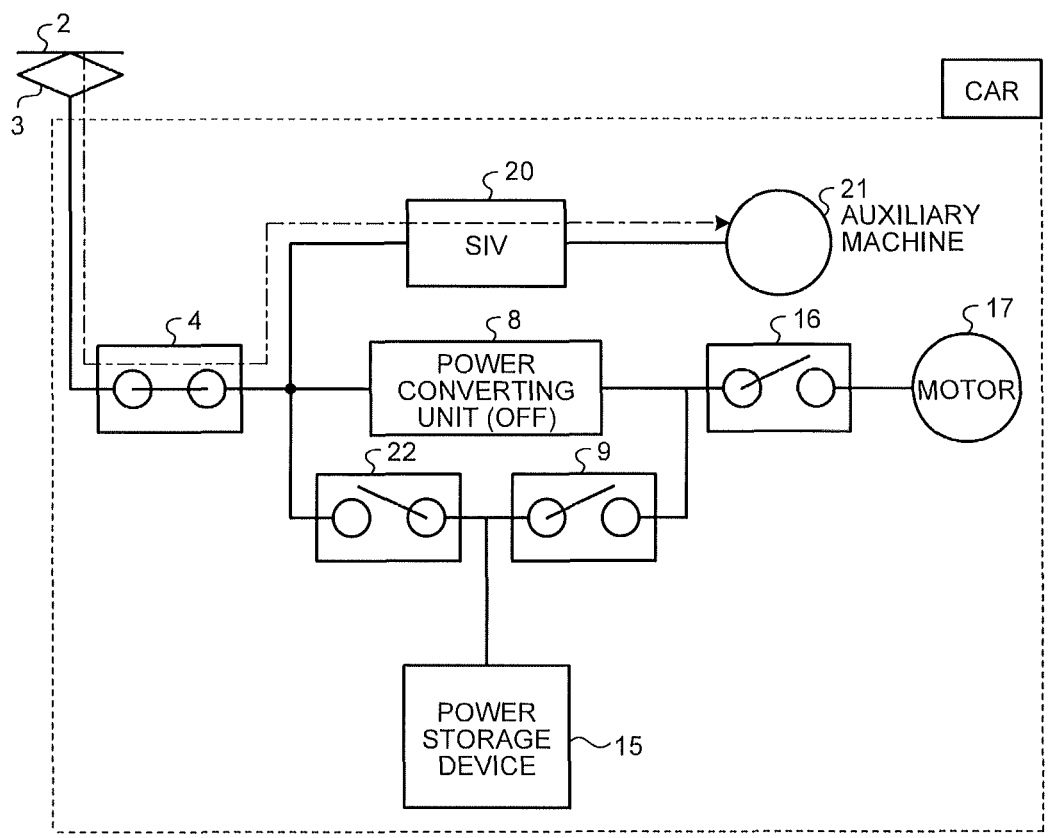
FIG. 26 is a diagram for explaining the switching sequence for switching the power supply source from the power storage device to the overhead wire.

When the power supply source is switched from the power storage device 15 to the overhead wire 2, as shown in FIG. 23, the switch 16 is controlled to be OFF. Subsequently, as shown in FIG. 24, the switch 9 is controlled to be ON and the not-shown upper element is controlled to be ON to short-circuit (conduct) the first terminal side and the second terminal side of the power converting unit 8. Further, as shown in FIG. 25, the switch 22 is controlled to be OFF. According to this control, although a path for direct power supply from the power storage device 15 to the SIV 20 is disconnected, a path for power supply through the inside of the power converting unit 8 is maintained. In this state, the pantograph is lifted to detect an overhead wire voltage. When the overhead wire voltage is detected, the power converting unit 8 is caused to operate as a step-up chopper and controlled such that the input voltage of the SIV 20 is substantially equal to the overhead wire voltage. When the input voltage of the SIV 20 is substantially equal to the overhead wire voltage, as shown in FIG. 26, the switch 4 is set to ON to apply the overhead wire voltage. Thereafter, the switch 9 is controlled to be OFF.

Consequently, when the power supply source to the SIV 20 is switched from the power storage device 15 to the overhead wire 2, the input voltage of the SIV 20 is not interrupted. Therefore, it is possible to prevent a short break involved in the switching of the power supply source and continue the power supply to the auxiliary machine 21.

Figure 27:
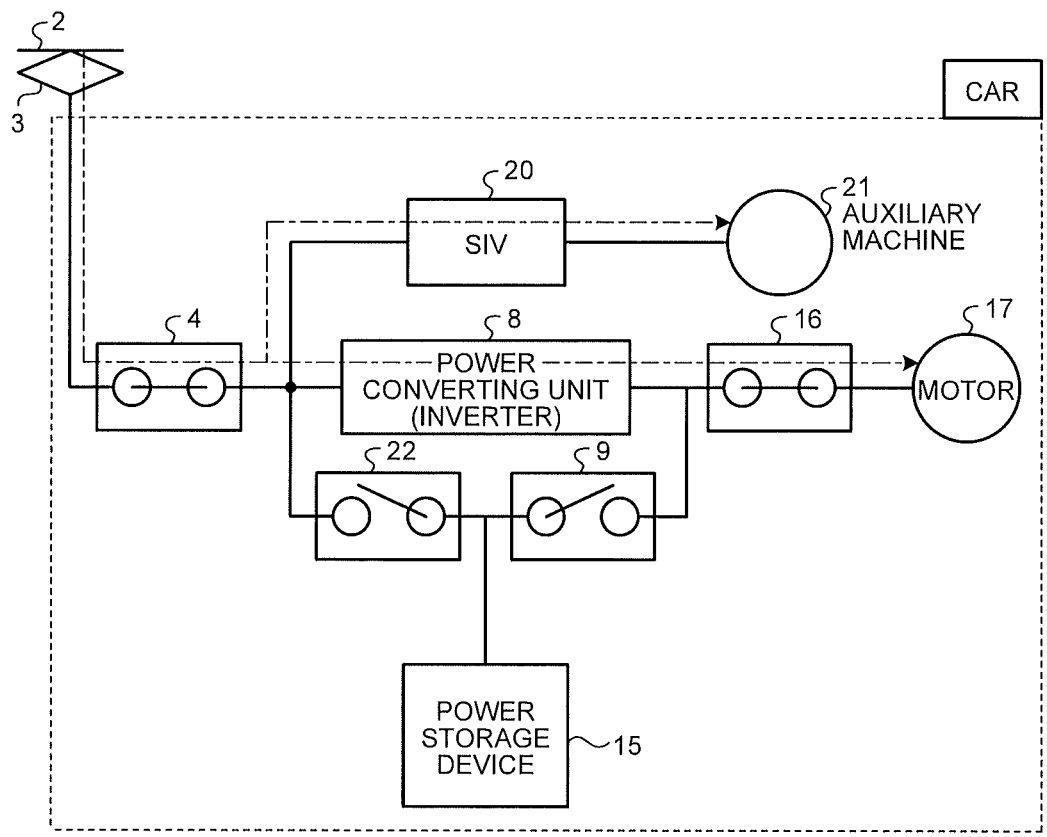
FIG. 27 is a diagram for explaining the switching sequence for switching the power supply source from the power storage device to the overhead wire.

As in the embodiments explained above, the switching of the power supply source from the power storage device 15 to the overhead wire 2 is performed, for example, when the electric vehicle enters an electrified section from a non-electrified section or when a discharge ability of the power storage device 15 falls. In these cases, as shown in FIG. 27, it is possible to use electric power from the overhead wire as electric power for driving the motor by setting the switch 16 to ON and causing the power converting unit 8 to operate as an inverter.

Figure 28:
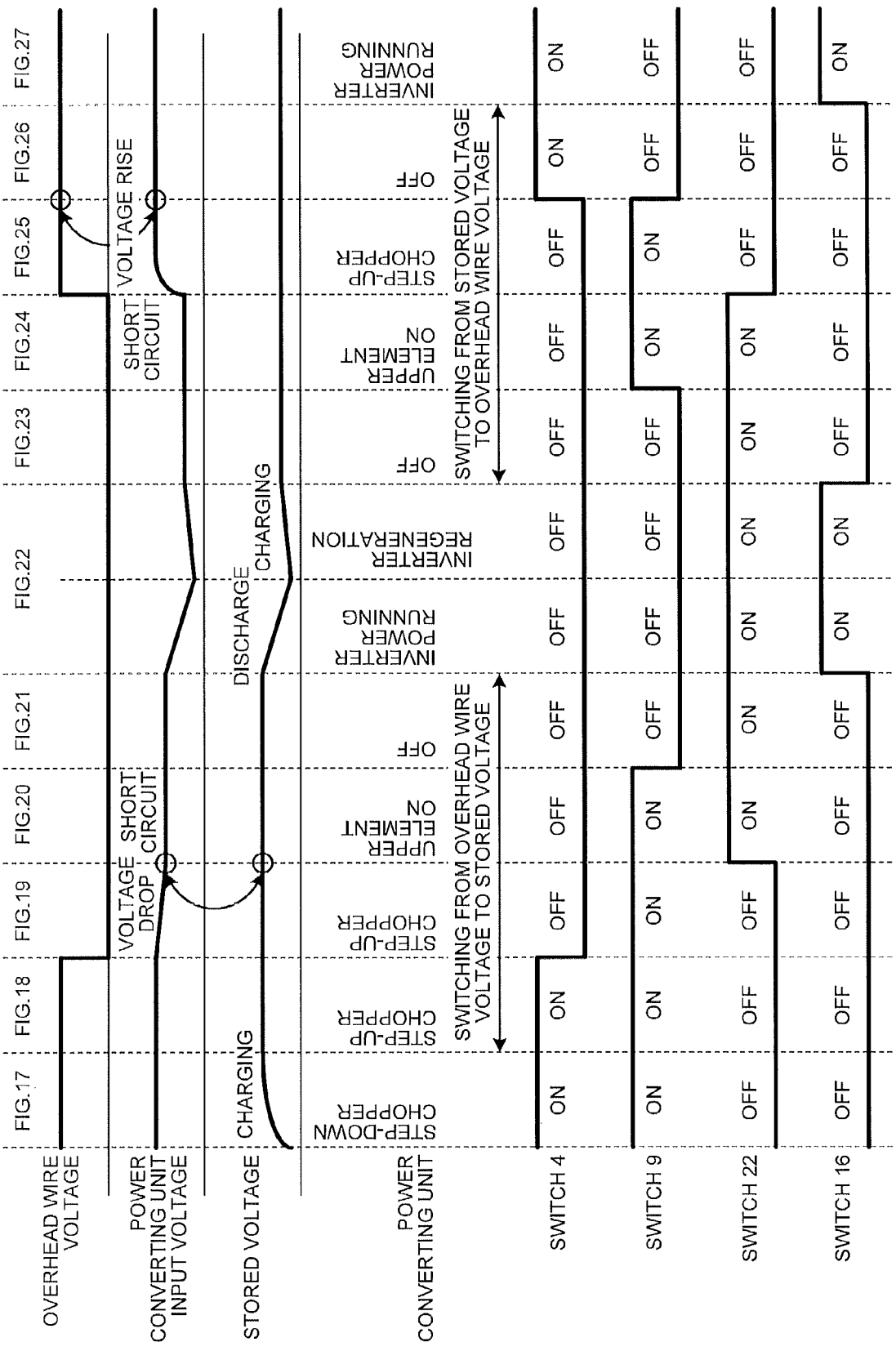
FIG. 28 is a diagram in which a series of sequences shown in FIGS. 17 to 27 are shown as a time chart.

FIG. 28 is a diagram in which a series of sequences shown in FIGS. 17 to 27 are shown as a time chart. From the top, an overhead wire voltage, a power converting unit input voltage, a stored voltage, which is an output voltage of the power storage device 15, an operation state of the power converting unit, and states of switches 4, 9, 22, and 16 are shown. The time chart shown in FIG. 28 is supplemented in several points as explained below.

The control of the switch 4 from ON to OFF is explained with reference to FIG. 19. However, even if the switch 4 is controlled to be OFF, the power converting unit input voltage does not drop to zero. A voltage of the filter capacitor 7 appears as the power converting unit input voltage. Because the SIV 20 uses the voltage of the filter capacitor 7, the power converting unit input voltage gradually drops. However, while the power converting unit input voltage drops, because the power converting unit 8 operates as the step-up chopper, the drop of the power converting unit input voltage stops at the stored voltage.

The operation during power running in which the electric power of the power storage device 15 is used is explained with reference to FIG. 22. However, when a regenerative brake is used, the power converting unit 8 performs a regenerative operation to charge the power storage device 15.

As explained above, when the power supply to the SIV is switched from the direct-current power supply source to the power storage device and when the power supply to the SIV is switched from the power storage device to the direct-current power supply source, the propulsion control device according to this embodiment controls the step-up ratio of the power converting unit to perform the switching of the power supply source while securing conduction on the inside and the outside of the power converting unit between the input side terminal (the first terminal) of the power converting unit and the output side terminal (the second terminal) of the power converting unit. Therefore, the power supply to the SIV is not interrupted. It is possible to prevent a short break involved in the switching of the power supply source and continue the power supply to the auxiliary machine.

Ninth Embodiment

In the preceding first to eighth embodiments, the propulsion control device is explained that includes, as the power supply source other than the power storage device 15, any one of the direct-current overhead wire, the alternating-current overhead wire, and the power generating device in the car (the direct-current overhead wire (first to fourth, sixth, and eighth embodiments), the alternating-current overhead wire (fifth embodiment), and the power generating device in the car (seventh embodiment)). On the other hand, in a ninth embodiment, a propulsion control device is explained that further includes a power generating device outside a car in addition to these power supply sources and obtains a driving force using electric power from all of these power supply sources. The propulsion control device does not need to include all of the direct-current overhead wire, the alternating-current overhead wire, the power generating device in the car, and the power generating device outside the car. A configuration including at least two of the power supply sources is also included in the gist of the present invention. A configuration including, as the power supply sources, the direct-current overhead wire and the power generating device that generates direct-current power among the various power supply sources is also included in the gist of the present invention. Further, a fuel battery explained below is an example of the power generating device that generates a direct-current power and can be other power generating devices (e.g., a solar battery).

Figure 29:
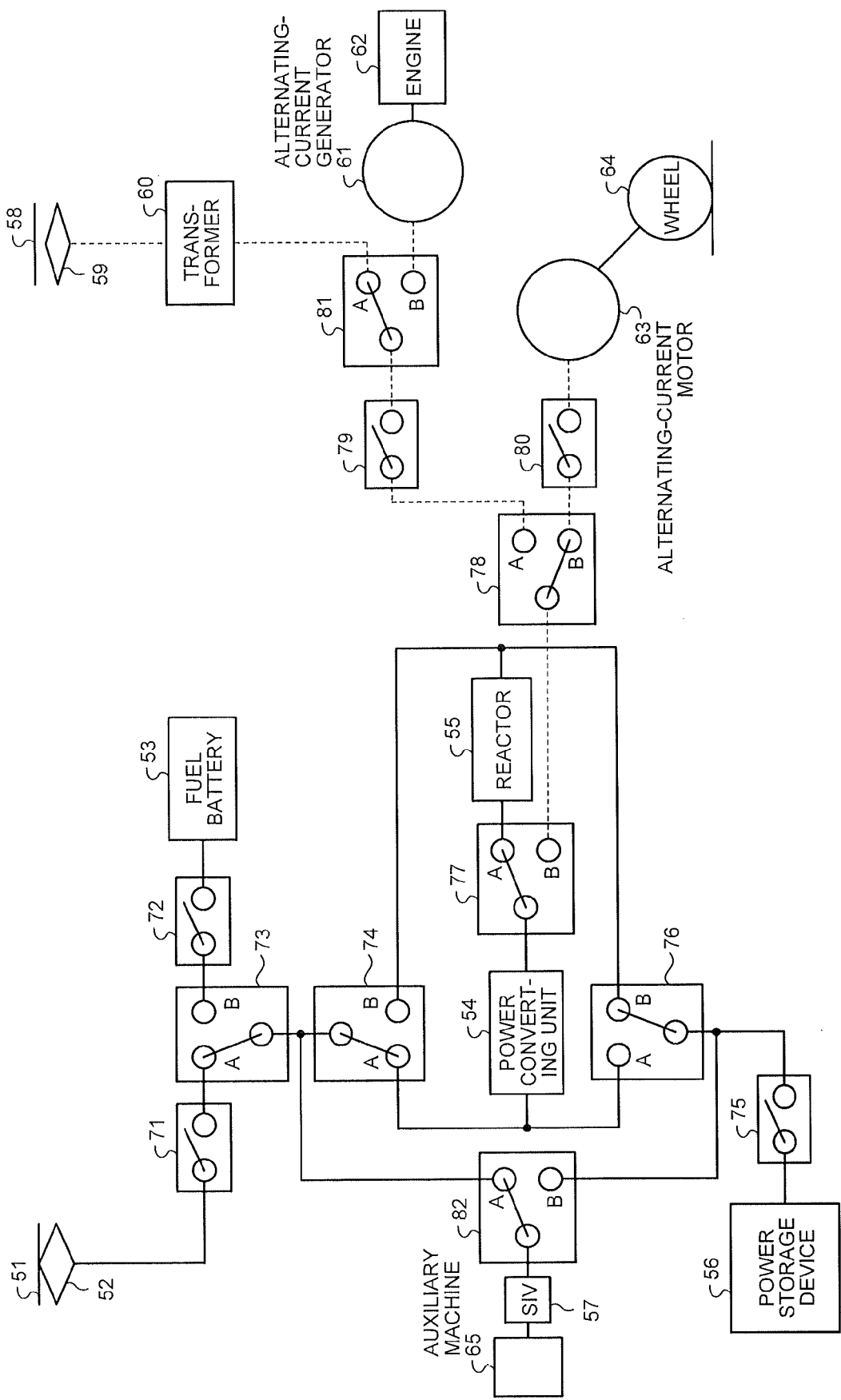
FIG. 29 is a diagram of a configuration example of an electric vehicle propulsion control device according to a ninth embodiment.

FIG. 29 is a diagram of a configuration example of the propulsion control device according to the ninth embodiment. In FIG. 29, as in FIGS. 7 to 9 and FIGS. 17 to 28, the configuration of only main units is shown. However, it goes without saying that the propulsion control device includes a control unit. Units having functions same as or equivalent to the units of the propulsion control device shown in FIG. 1, FIG. 4, FIG. 5, or FIGS. 10 to 16 includes components same as or equivalent to the components of the units.

The configuration of the propulsion control device according to the ninth embodiment is explained. The propulsion control device according to this embodiment includes, as shown in FIG. 29, a power storage device 56, a direct-current overhead wire 51 and a fuel cell 53 functioning as a direct-current power supply source excluding the power storage device 56, an alternating-current overhead wire 58 and an alternating-current generator 61 functioning as an alternating-current power supply source, a power collecting device 52 configured to collect electric power from the direct-current overhead wire 51, a power collecting device 59 configured to collect electric power from the alternating-current overhead wire 58, a transformer 60 configured to transform an alternating-current voltage received from the power collecting device 59, an engine 62, which is a power source of the alternating-current generator 61, a power converting unit 54 having a power converting function for enabling bidirectional power flow control and configured to operate as any one of a step-up chopper, a step-down chopper, an inverter, and a converter according to a connection form, an alternating-current motor 63 driven by the power converting unit 54 and configured to rotate a wheel 64, switches 71, 72, 75, 79, and 80 for opening and closing a circuit that forms a power supply path, an auxiliary power supply device (SIV) 57 configured to convert a direct-current voltage supplied from the power storage device 56, the direct-current overhead wire 51, or the fuel battery 53 into a three-phase alternating-current voltage, an auxiliary machine 65 configured to receive power supply from the SIV 20 and operate, switching devices 73, 74, 76, 77, 78, 81, and 82 configured to switch a connection destination to connect at least one of the power storage device 56, the direct-current overhead wire 51, the fuel battery 53, the alternating-current overhead wire 58, and the alternating-current generator 61 to a first terminal side of the power converting unit 54 and connect at least one of the power storage device 56, the direct-current overhead wire 51, and the SIV 57 to a second terminal side of the power converting unit 54, and a reactor 55 required when the power converting unit 54 operates as the step-up chopper or the step-down chopper and inserted on the circuit by the switching devices 74, 76, and 78. As it is evident when referring to, for example, FIG. 16 in the eighth embodiment, the configuration in the eighth embodiment corresponds to a configuration in which the switching device 82 is set on an A side. In other words, the configuration of the eighth embodiment forms a part of the configuration of the ninth embodiment.

Because the configuration explained above is adopted, an operation method shown in FIGS. 30 to 43 is possible for an electric vehicle including the propulsion control device according to this embodiment. In FIGS. 30 to 43, as in the above explanation, a flow of electric power is indicated by an alternate long and short dash line.

Power Storage Device Charging: First Charging Operation

Figure 30:
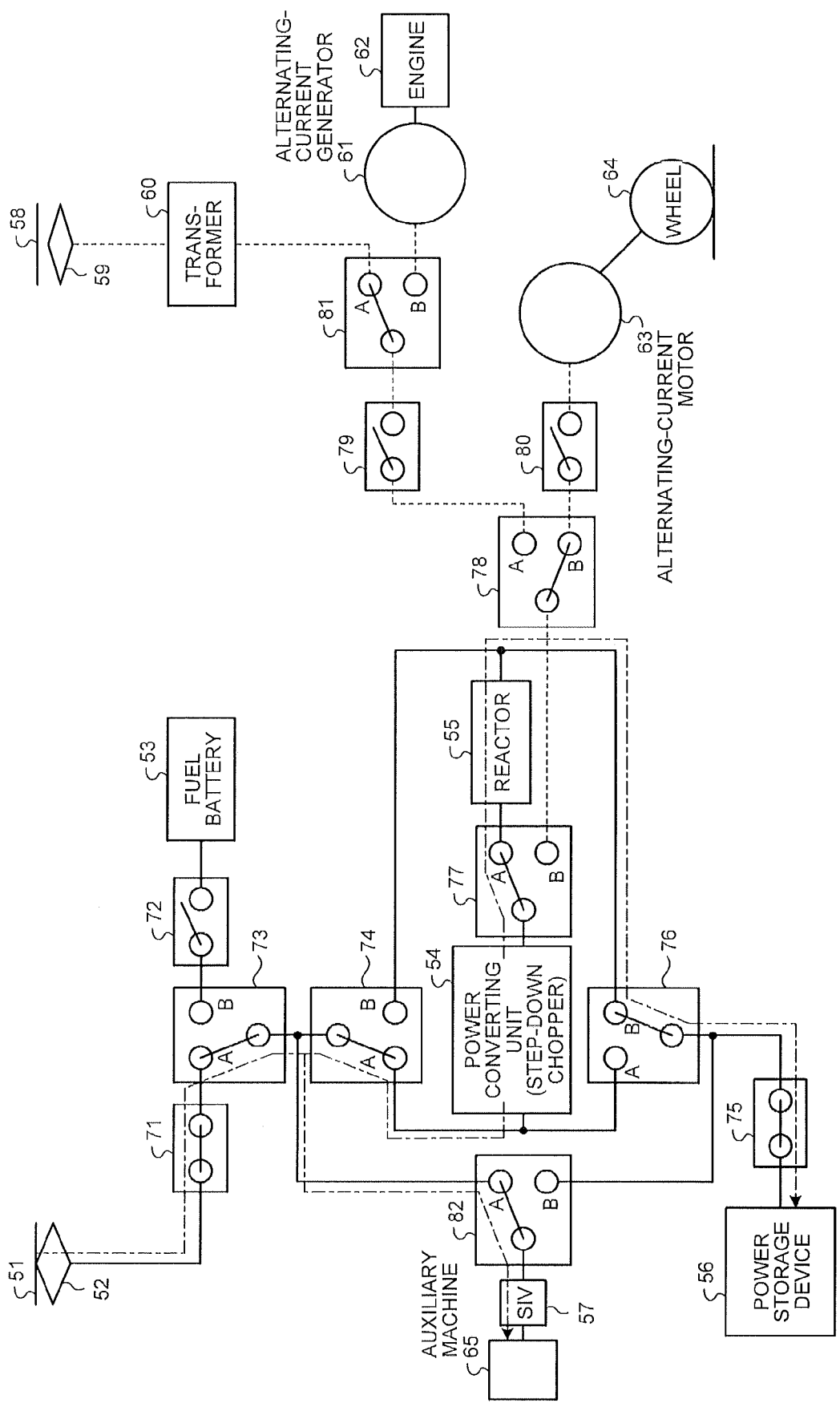
FIG. 30 is a diagram for explaining a first charging operation for charging a power storage device.

FIG. 30 is a diagram for explaining an operation (a first charging operation) for charging the power storage device 56. The first charging operation is an operation executed when a rated voltage of the direct-current overhead wire 51 is higher than a full-charge voltage of the power storage device 56. As shown in the figure, when the power storage device 56 is charged, the switch 71 is set to ON (a closed state), the switch 72 is set to OFF (an open state), the switching device 73 is set to the A side, the switching device 74 is set to the A side, the switch 75 is set to ON (the closed state), the switching device 76 is set to a B side, the switching device 77 is set to the A side, the switching device 78 is set to the B side, the switch 79 is set to OFF (the open state), the switch 80 is set to OFF (the open state), the switching device 81 set arbitrarily (which means that the switching device 81 can be set to either the A side or the B side, the same applies in the following explanation), and the switching device 82 is set to the A side.

In such a setting state, the SIV 57 converts a direct-current voltage supplied from the direct-current overhead wire 51 into a three-phase alternating-current voltage and supplies the three-phase alternating-current voltage to the auxiliary machine 65. The power converting unit 54 operates as the step-down chopper to charge the power storage device 56 using electric power supplied from the direct-current overhead wire 51. As in the propulsion control devices explained in the first embodiment and like, the operation (the charging operation for the power storage device 56) shown in FIG. 30 is executed in a state in which the electric vehicle is standing in a rail yard or a station or a state in which the electric vehicle is performing a coasting operation in an electrified section.

Power Storage Device Charging: Second Charging Operation)

Figure 31:
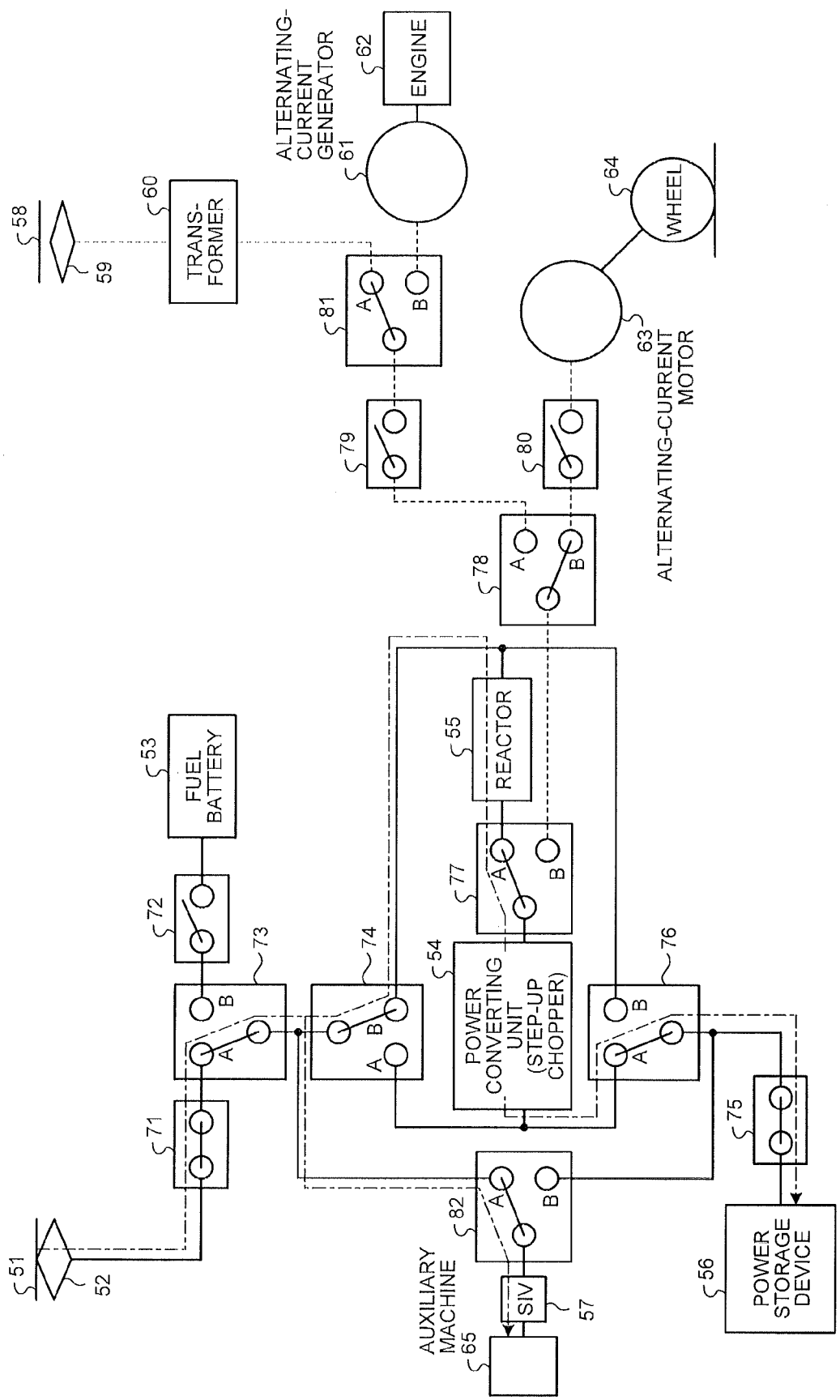
FIG. 31 is a diagram for explaining a second charging operation for charging the power storage device.

FIG. 31 is a diagram for explaining a second charging operation for charging the power storage device 56. The second charging operation is an operation executed when the rated voltage of the direct-current overhead wire 51 is lower than a voltage of the power storage device 56. As shown in the figure, when the power storage device 56 is charged, the switch 71 is set to ON, the switch 72 is set to OFF, the switching device 73 is set to the A side, the switching device 74 is set to the B side, the switch 75 is set to ON, the switching device 76 is set to the A side, the switching device 77 is set to the A side, the switching device 78 is set to the B side, the switch 79 is set to OFF, the switch 80 is set to OFF, the switching device 81 is set arbitrarily, and the switching device 82 is set to the A side.

In such a setting state, the SIV 57 converts the direct-current voltage supplied from the direct-current overhead wire 51 into a three-phase alternating-current voltage and supplies the three-phase alternating-current voltage to the auxiliary machine 65. The power converting unit 54 operates as the step-up chopper to charge the power storage device 56 using the electric power supplied from the direct-current overhead wire 51. As in the propulsion control devices explained above, the operation (the charging operation for the power storage device 56) shown in FIG. 31 is executed in the state in which the electric vehicle is standing in a rail yard or a station or a state in which the electric vehicle is performing the coasting operation in an electrified section.

Power Storage Device Charging: Third Charging Operation

Figure 32:
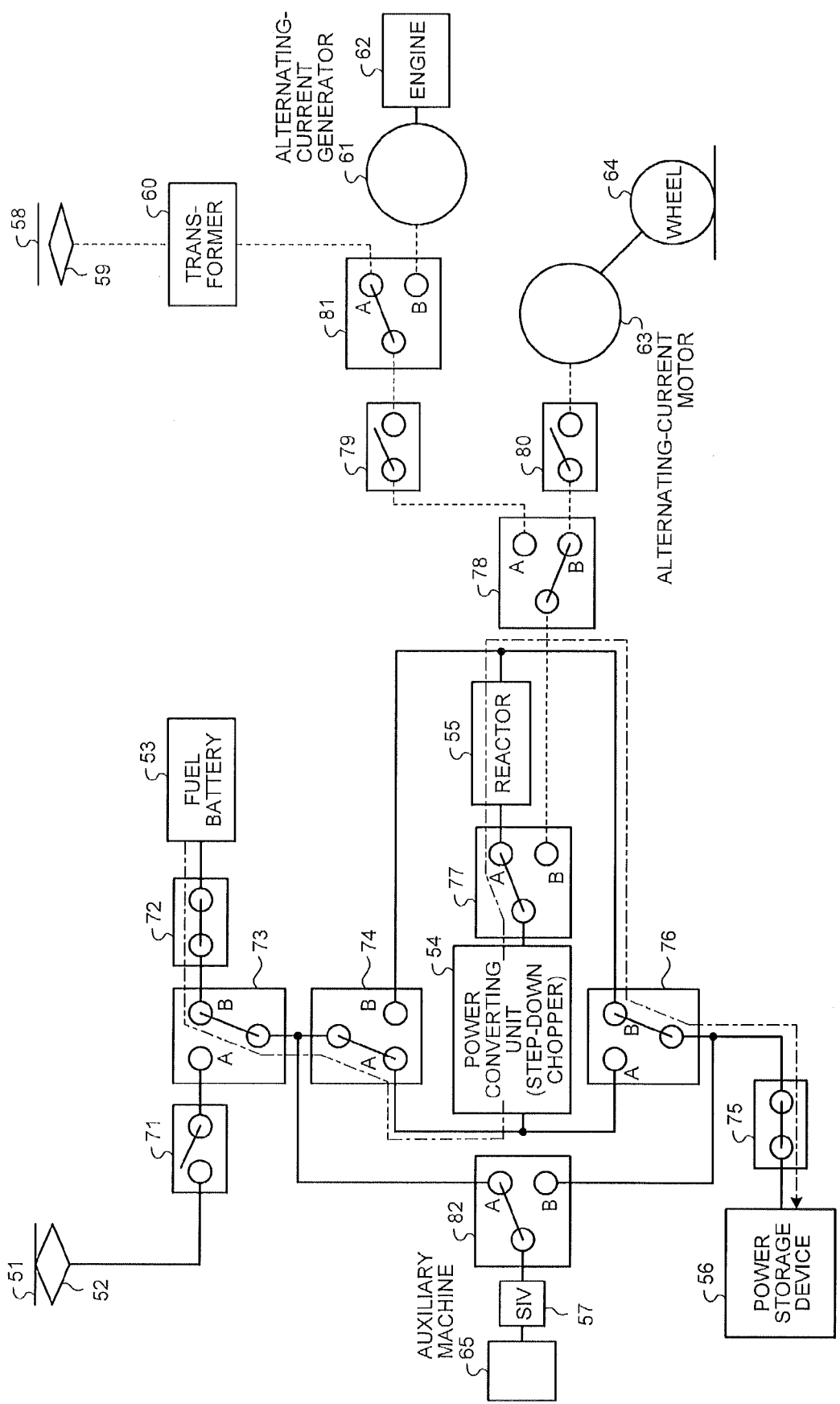
FIG. 32 is a diagram for explaining a third charging operation for charging the power storage device.

FIG. 32 is a diagram for explaining a third charging operation for charging the power storage device 56. The third charging operation is an operation executed using electric power of the fuel battery 53 and executed when an output voltage of the fuel battery 53 is higher than the full-charge voltage of the power storage device 56. As shown in the figure, when the power storage device 56 is charged, the switch 71 is set to OFF, the switch 72 is set to ON, the switching device 73 is set to the B side, the switching device 74 is set to the A side, the switch 75 is set to ON, the switching device 76 is set to the B side, the switching device 77 is set to the A side, the switching device 78 is set to the B side, the switch 79 is set to OFF, the switch 80 is set to OFF, the switching device 81 is set arbitrarily, and the switching device 82 is set to the A side.

In such a setting state, the SIV 57 converts a direct-current voltage supplied from the fuel battery 53 into a three-phase alternating-current voltage and supplies the three-phase alternating-current voltage to the auxiliary machine 65. The power converting unit 54 operates as the step-down chopper to charge the power storage device 56. As in the propulsion control devices explained above, the operation (the charging operation for the power storage device 56) shown in FIG. 32 is executed in the state in which the electric vehicle is standing in a rail yard or a station or a state in which the electric vehicle is performing the coasting operation in an electrified section.

Power Storage Device Charging: Fourth Charging Operation

Figure 33:
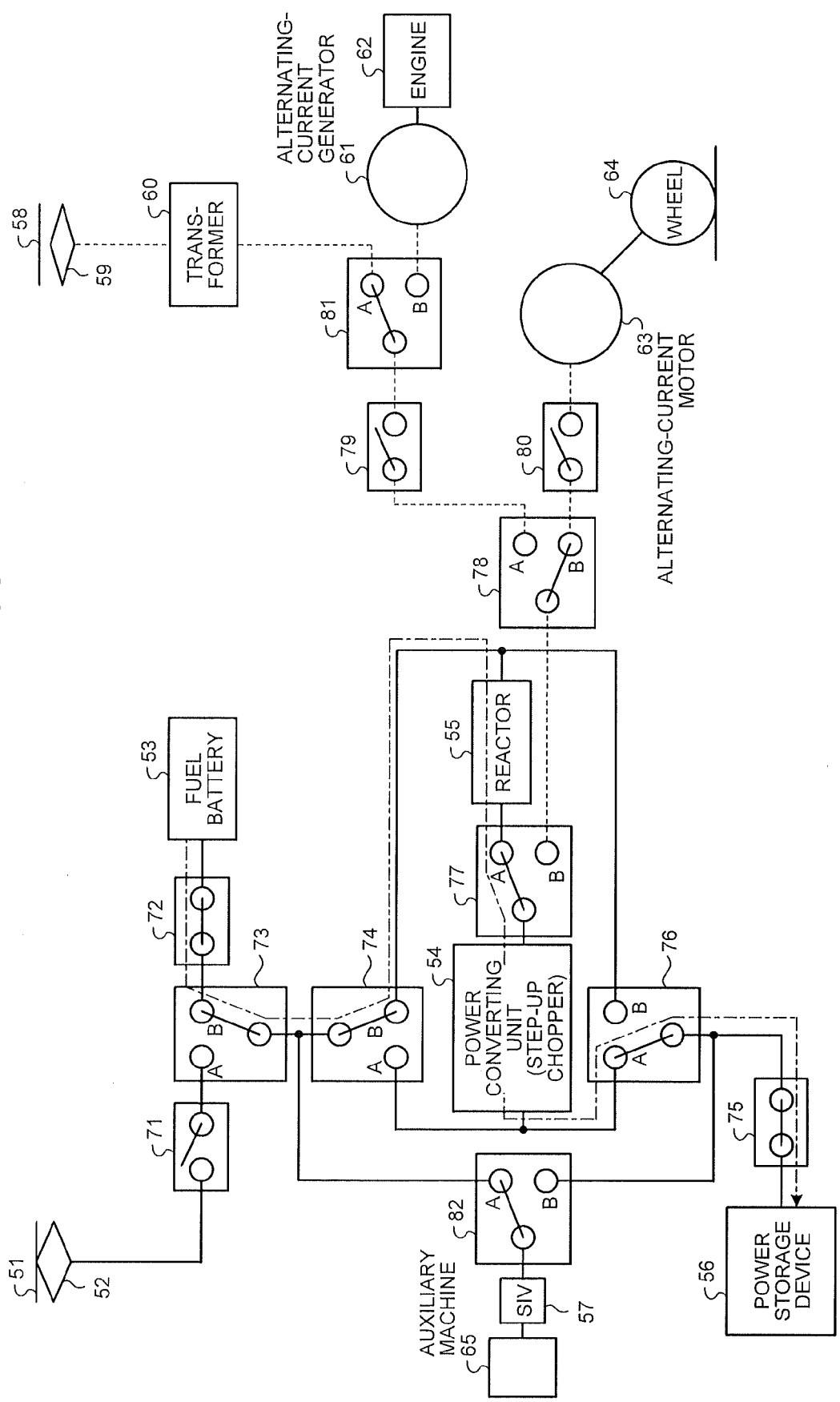
FIG. 33 is a diagram for explaining a fourth charging operation for charging the power storage device.

FIG. 33 is a diagram for explaining a fourth charging operation for charging the power storage device 56. The fourth charging operation is an operation executed when a rated voltage of the fuel battery 53 is lower than the voltage of the power storage device 56. As shown in the figure, when the power storage device 56 is charged, the switch 71 is set to OFF, the switch 72 is set to ON, the switching device 73 is set to the B side, the switching device 74 is set to the B side, the switch 75 is set to ON, the switching device 76 is set to the A side, the switching device 77 is set to the A side, the switching device 78 is set to the B side, the switch 79 is set to OFF, the switch 80 is set to OFF, the switching device 81 is set arbitrarily, and the switching device 82 is set to the A side.

In such a setting state, the SIV 57 converts the direct-current voltage supplied from the fuel battery 53 into a three-phase alternating-current voltage and supplies the three-phase alternating-current voltage to the auxiliary machine 65. The power converting unit 54 operates as the step-up chopper to charge the power storage device 56. As in the propulsion control devices explained above, the operation (the charging operation for the power storage device 56) shown in FIG. 33 is executed in the state in which the electric vehicle is standing in a rail yard or a station or a state in which the electric vehicle is performing the coasting operation in an electrified section.

Motor Driving Using Electric Power of the Power Storage Device

Figure 34:
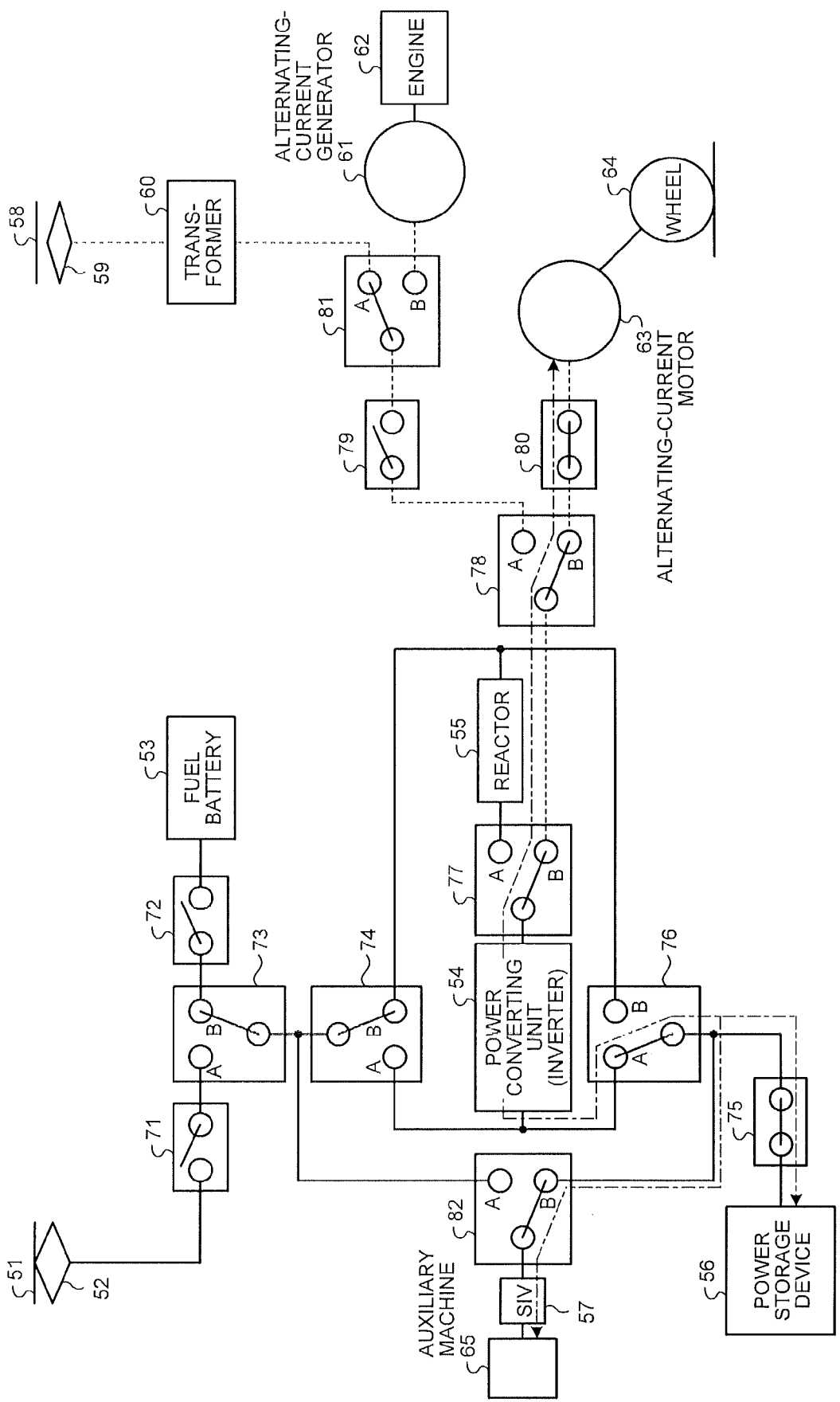
FIG. 34 is a diagram for explaining an operation for driving an alternating-current motor using electric power of the power storage device.

FIG. 34 is a diagram for explaining an operation for driving the alternating-current motor 63 using electric power of the power storage device 56. As shown in the figure, when the alternating-current motor 63 is driven using the electric power of the power storage device 56, the switch 71 is set to OFF, the switch 72 is set to OFF, the switching devices 73 and 74 are set arbitrarily, the switch 75 is set to ON, the switching device 76 is set to the A side, the switching device 77 is set to the B side, the switching device 78 is set to the B side, the switch 79 is set to OFF, the switch 80 is set to ON, the switching device 81 is set arbitrarily, and the switching device 82 is set to the B side.

In such a setting state, the SIV 57 converts the direct-current voltage supplied from the power storage device 56 into a three-phase alternating-current voltage and supplies the three-phase alternating-current voltage to the auxiliary machine 65. The power converting unit 54 operates as the inverter to convert the direct-current voltage supplied from the power storage device 56 into a three-phase alternating-current voltage and drive the alternating-current motor 63. As in the propulsion control devices explained above, the operation (the driving operation for the alternating-current motor 63) shown in FIG. 34 is executed during power running, during braking control, and the like.

Motor Driving Using Electric Power of the Direct-Current Overhead Wire

Figure 35:
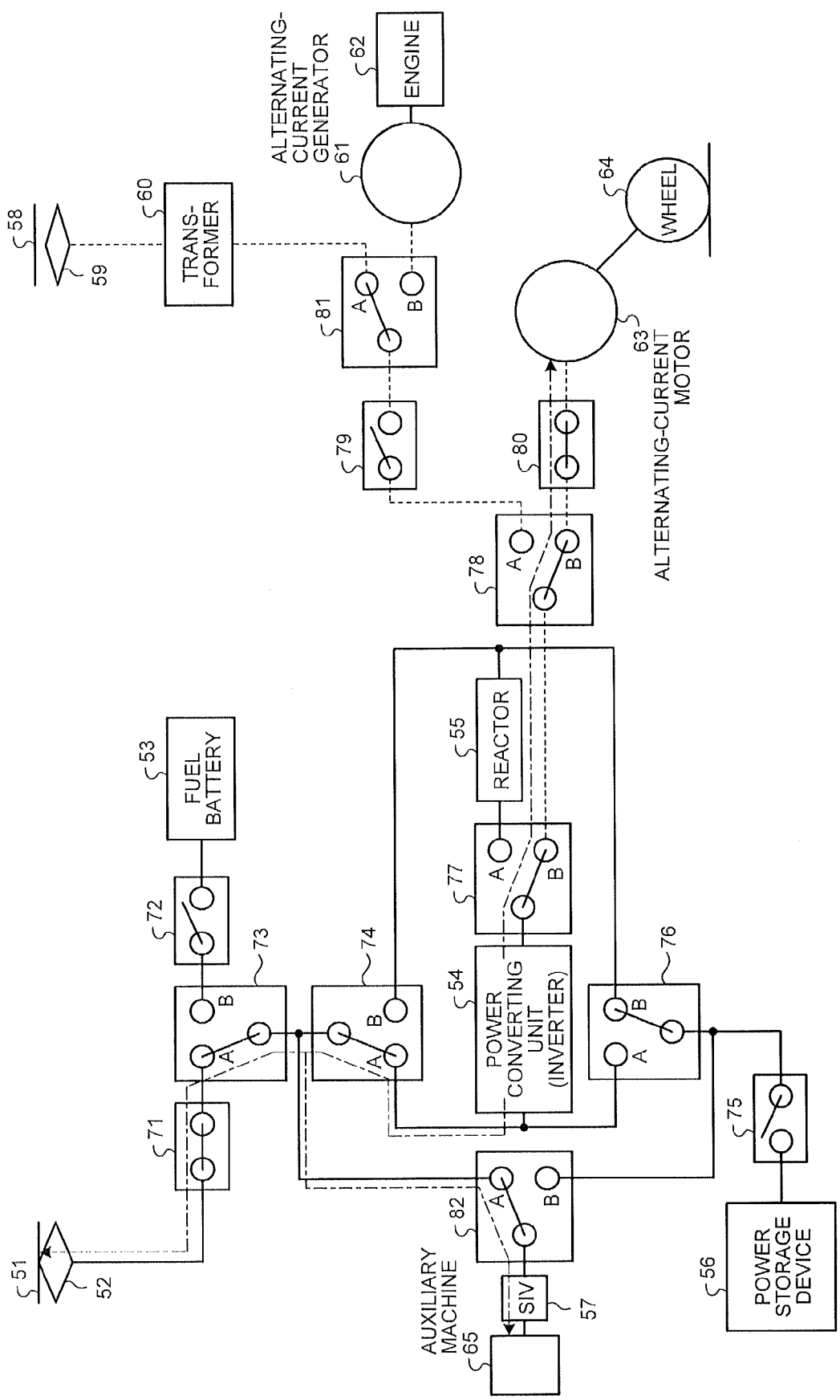
FIG. 35 is a diagram for explaining an operation for driving the alternating-current motor using electric power of a direct-current overhead wire.

FIG. 35 is a diagram for explaining an operation for driving the alternating-current motor 63 using electric power of the direct-current overhead wire 51. As shown in the figure, when the alternating-current motor 63 is driven using the electric power of the direct-current overhead wire 51, the switch 71 is set to ON, the switch 72 is set to OFF, the switching device 73 is set to the A side, the switching device 74 is set to the A side, the switch 75 is set to OFF, the switching device 76 is set arbitrarily, the switching device 77 is set to the B side, the switching device 78 is set to the B side, the switch 79 is set to OFF, the switch 80 is set to ON, the switching device 81 is set arbitrarily, and the switching device 82 is set to the A side.

In such a setting state, the SIV 57 converts the direct-current voltage supplied from the direct-current overhead wire 51 into a three-phase alternating-current voltage and supplies the three-phase alternating-current voltage to the auxiliary machine 65. The power converting unit 54 operates as the inverter to convert the direct-current voltage supplied from the alternating-current overhead wire 51 into a three-phase alternating-current voltage and drive the alternating-current motor 63. As in the propulsion control devices explained above, the operation (the driving operation for the alternating-current motor 63) shown in FIG. 35 is executed during power running, during braking control, and the like.

Motor Driving Using Electric Power of the Fuel Battery

Figure 36:
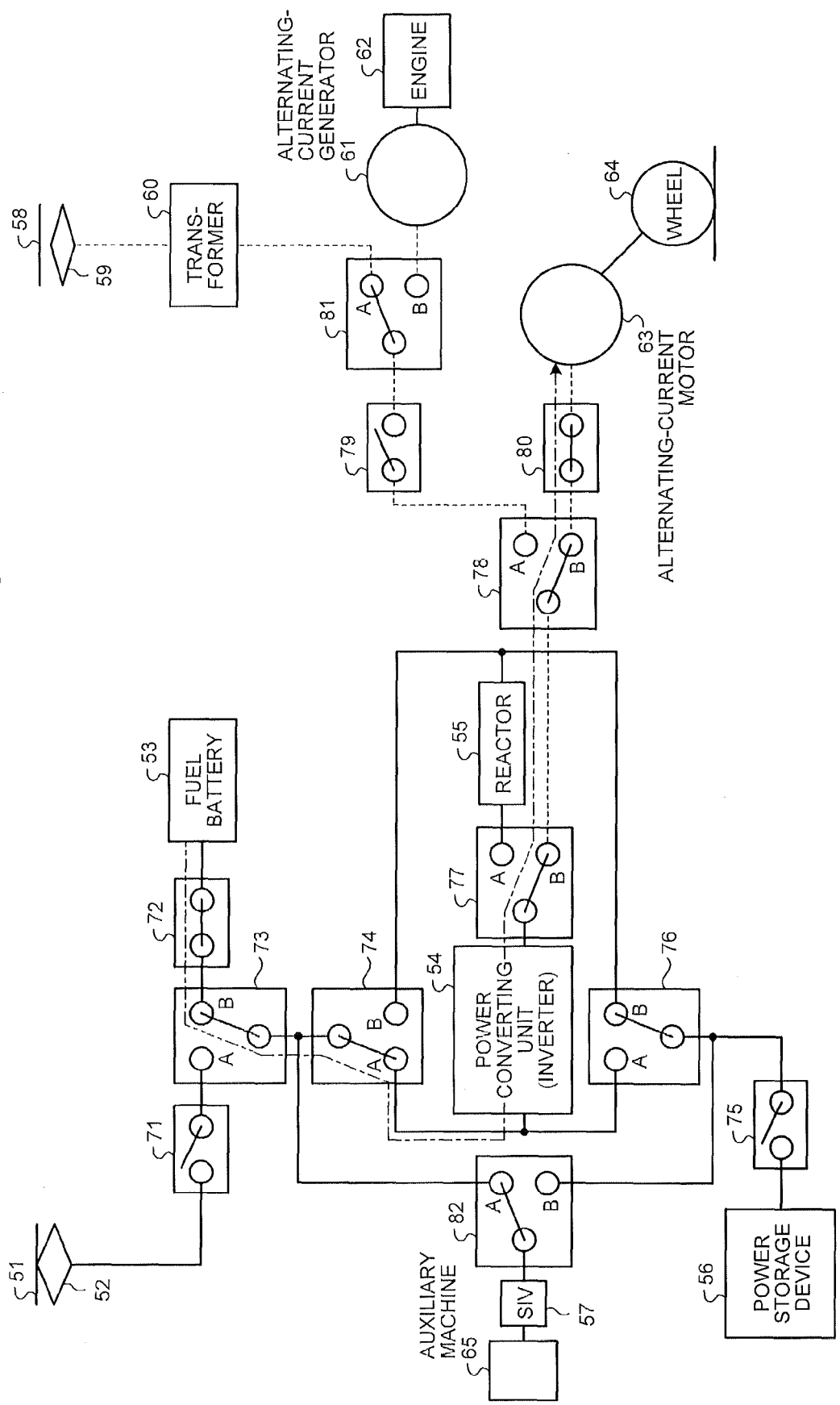
FIG. 36 is a diagram for explaining an operation for driving the alternating-current motor using electric power of a fuel battery.

FIG. 36 is a diagram for explaining an operation for driving the alternating-current motor 63 using the electric power of the fuel battery 53. As shown in the figure, when the alternating-current motor 63 is driven using the electric power of the fuel battery 53, the switch 71 is set to OFF, the switch 72 is set to ON, the switching device 73 is set to the B side, the switching device 74 is set to the A side, the switch 75 is set to OFF, the switching device 76 is set arbitrarily, the switching device 77 is set to the B side, the switching device 78 is set to the B side, the switch 79 is set to OFF, the switch 80 is set to ON, the switching device 81 is set arbitrarily, and the switching device 82 is set to the A side.

In such a setting state, the SIV 57 converts the direct-current voltage supplied from the fuel battery 53 into a three-phase alternating-current voltage and supplies the three-phase alternating-current voltage to the auxiliary machine 65. The power converting unit 54 operates as the inverter to convert the direct-current voltage supplied from the fuel battery 53 into a three-phase alternating-current voltage and drive the alternating-current motor 63. As in the propulsion control devices explained above, the operation (the driving operation for the alternating-current motor 63) shown in FIG. 36 is executed during power running, during braking control, and the like.

Figure 37:
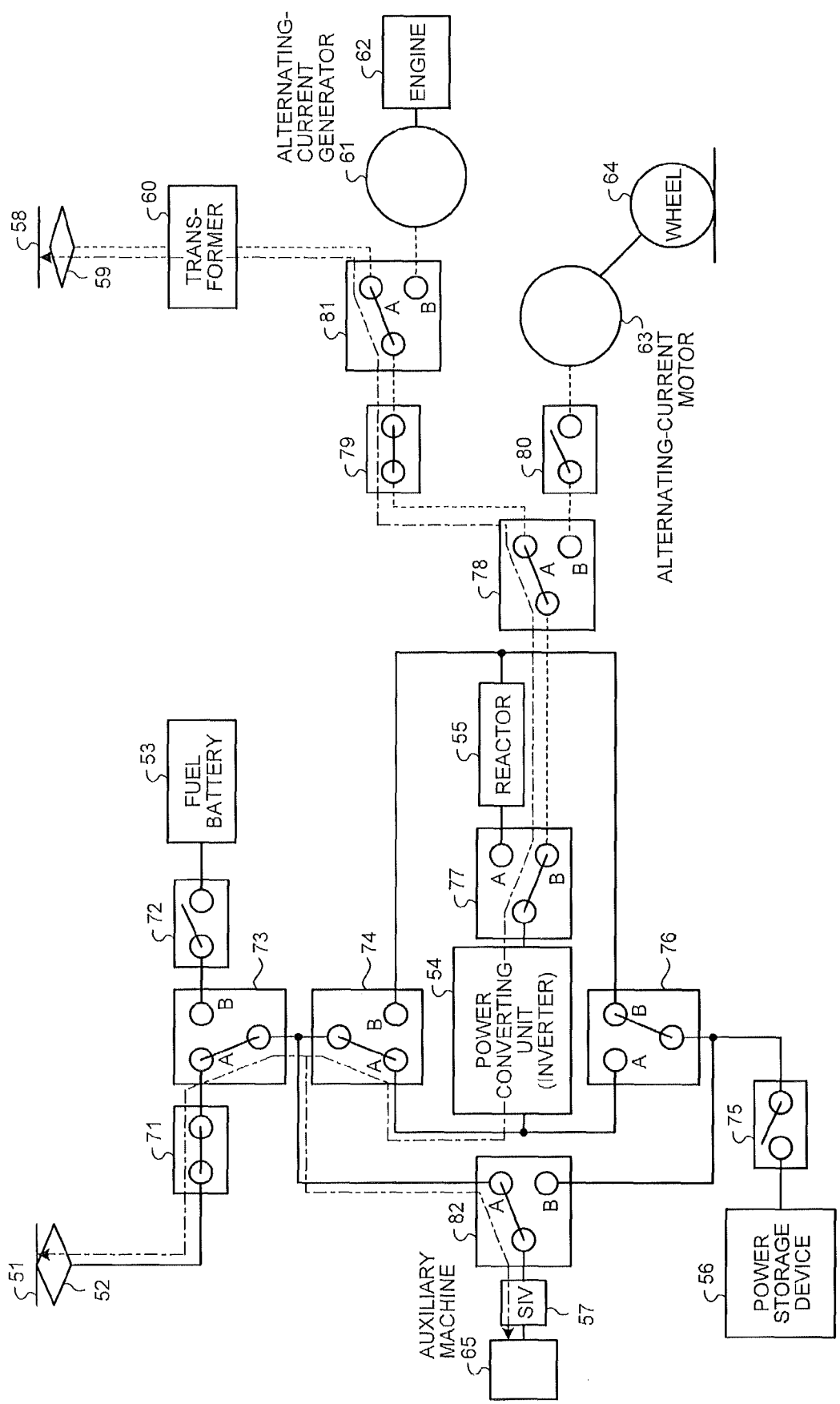
FIG. 37 is a diagram for explaining an operation for supplying the electric power of the direct-current overhead wire to an alternating-current overhead wire.

Power Supply to the Alternating-Current Overhead Wire by the Direct-Current Overhead Wire FIG. 37 is a diagram for explaining an operation for supplying the electric power of the direct-current overhead wire 51 to the alternating-current overhead wire 58. As shown in the figure, when the electric power of the direct-current overhead wire 51 is supplied to the alternating-current overhead wire 58, the switch 71 is set to ON, the switch 72 is set to OFF, the switching device 73 is set to the A side, the switching device 74 is set to the A side, the switch 75 is set to OFF, the switching device 76 is set to B side, the switching device 77 is set to the B side, the switching device 78 is set to the A side, the switch 79 is set to ON, the switch 80 is set to OFF, the switching device 81 is set to the A side, and the switching device 82 is set to the A side.

In such a setting state, the SIV 57 converts the direct-current voltage supplied from the direct-current overhead wire 51 into a three-phase alternating-current voltage and supplies the three-phase alternating-current voltage to the auxiliary machine 65. The power converting unit 54 operates as the inverter to convert the direct-current voltage supplied from the direct-current overhead wire 51 into a single-phase alternating-current voltage and apply the single-phase alternating-current voltage to the transformer 60. The transformer 60 converts the single-phase alternating-current voltage into a desired alternating-current voltage required in the alternating-current overhead wire 58 and applies the alternating-current voltage to the alternating-current overhead wire 58 via the power collecting device 59. According to this control, it is possible to perform power supply to the alternating-current overhead wire 58, which is not connected to the alternating-current power supply, by the direct-current overhead wire 51 and power supply to the alternating-current overhead wire 58, the voltage of which drops, by the direct-current overhead wire 51.

Figure 38:
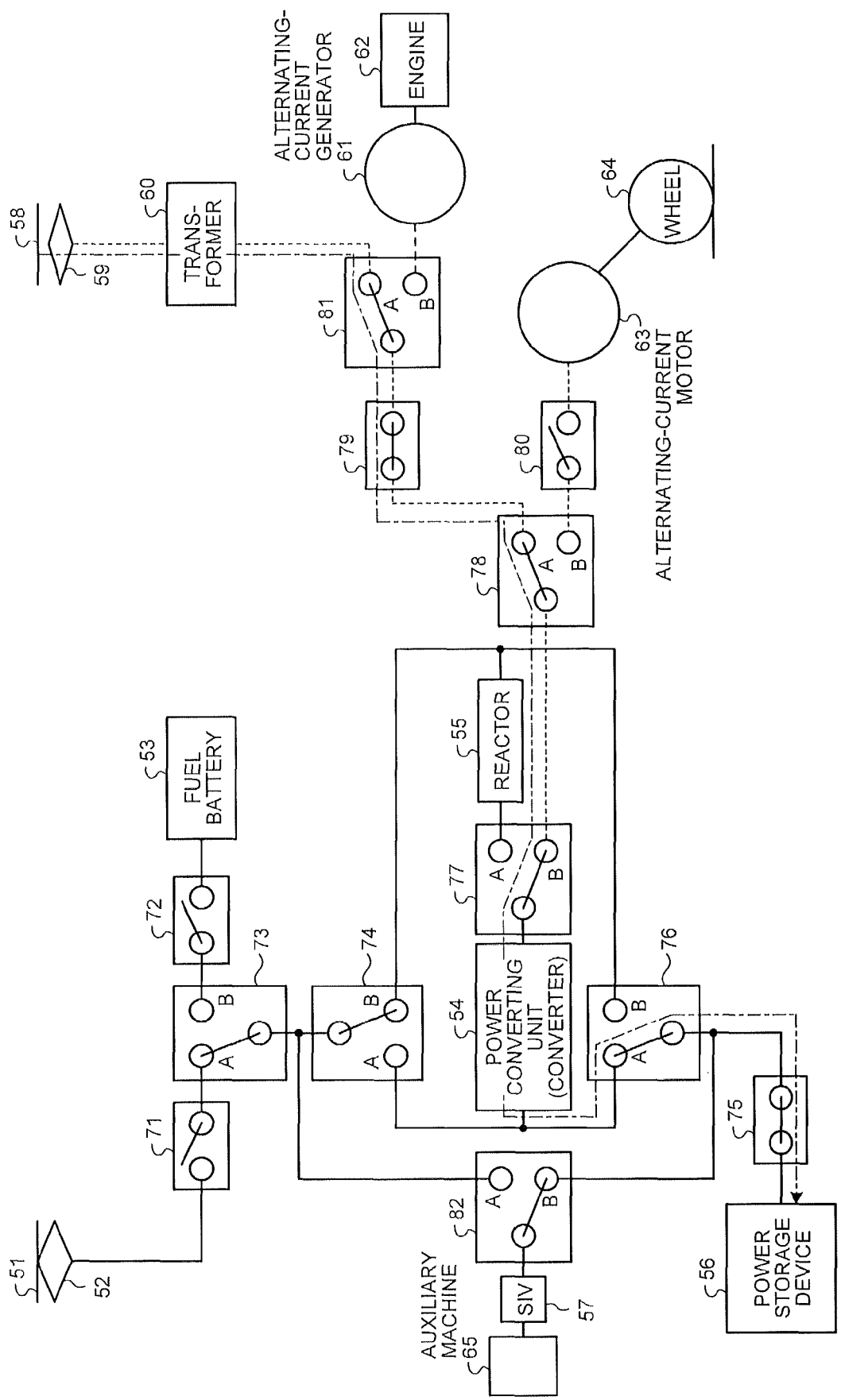
FIG. 38 is a diagram for explaining an operation for performing power conversion between the alternating-current overhead wire and the power storage device.

Power Conversion Between the Alternating-Current Overhead Wire and the Power Storage Device FIG. 38 is a diagram for explaining an operation for performing power conversion between the alternating-current overhead wire 58 and the power storage device 56. As shown in the figure, when the power conversion is performed between the alternating-current overhead wire 58 and the power storage device 56, the switch 71 is set to OFF, the switch 72 is set to OFF, the switching devices 73 and 74 are set arbitrarily, the switch 75 is set to ON, the switching device 76 is set to the A side, the switching device 77 is set to the B side, the switching device 78 is set to the A side, the switch 79 is set to ON, the switch 80 is set to OFF, the switching device 81 is set to the A side, and the switching device 82 is set to the B side.

In such a setting state, the SIV 57 converts the direct-current voltage supplied from the power storage device 56 into a three-phase alternating-current voltage and supplies the three-phase alternating-current voltage to the auxiliary machine 65. The power converting unit 54 operates as the converter to convert the direct-current voltage from the power storage device 56 into a single-phase alternating-current voltage and apply the single-phase alternating-current voltage to the transformer 60. The transformer 60 converts the single-phase alternating-current voltage into a desired alternating-current voltage required in the alternating-current overhead wire 58 and applies the alternating-current voltage to the alternating-current overhead wire 58 via the power collecting device 59. The power converting unit 54 operates as the converter to charge the power storage device 56 using electric power supplied from the alternating-current overhead wire 58. According to this control, it is possible to perform power supply to the alternating-current overhead wire 58, which is not connected to the alternating-current power supply, by the power storage device 56 and power supply to the alternating-current overhead wire 56, the voltage of which drops. Contrary to this control, it is possible to perform charging control by the alternating-current overhead wire 58 to the power storage device 56, the stored voltage of which drops.

Power Storage Device Charging: Fifth Charging Operation

Figure 39:
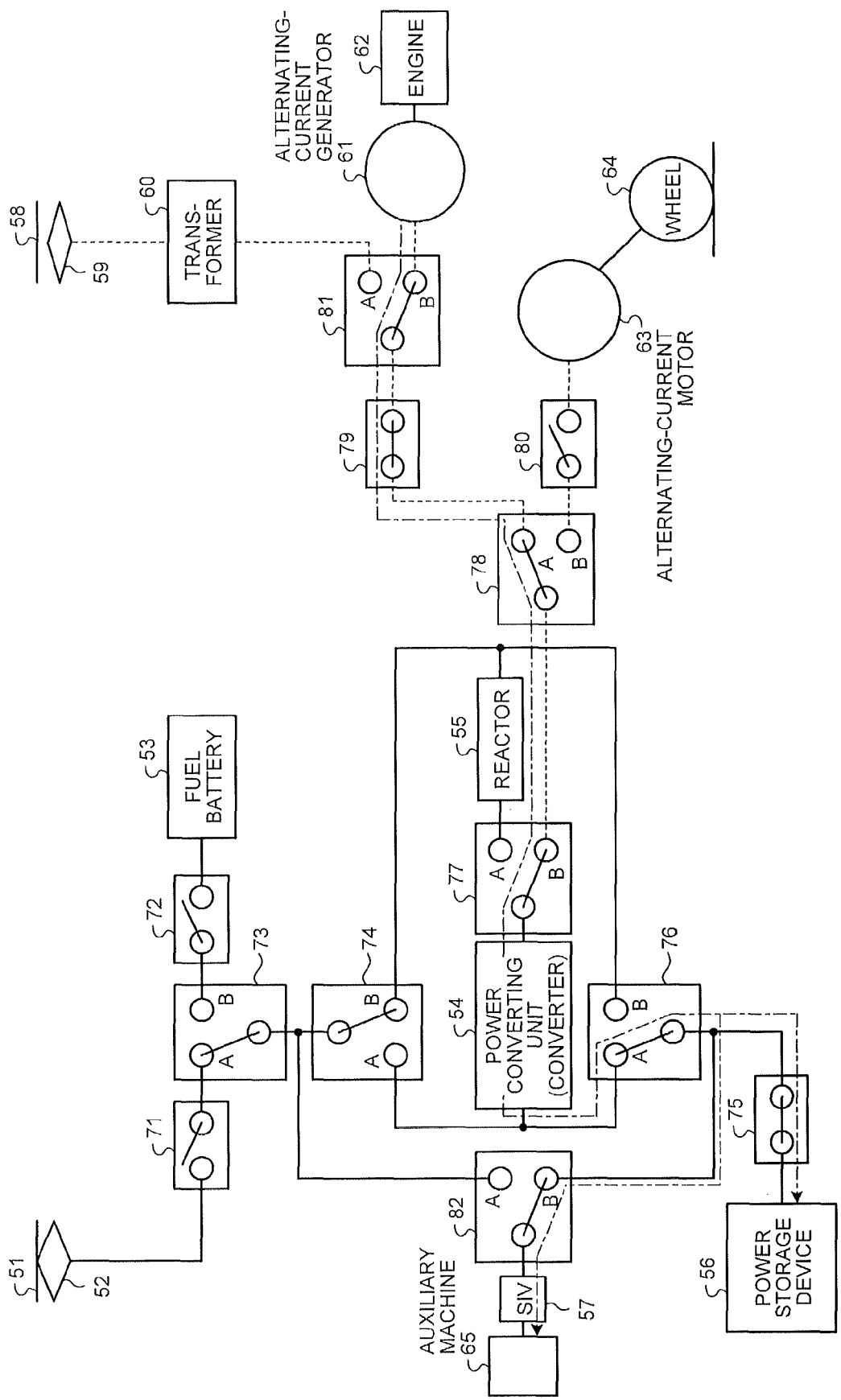
FIG. 39 is a diagram for explaining a fifth charging operation for charging the power storage device.

FIG. 39 is a diagram for explaining a charging operation (a fifth charging operation) for charging the power storage device 56. The fifth charging operation is an operation executed when the power storage device 56 is charged using generated electricity of the alternating-current generator 61. As shown in the figure, when the power storage device 56 is charged, the switch 71 is set to OFF, the switch 72 is set to OFF, the switching devices 73 and 74 are set arbitrarily, the switch 75 is set to ON, the switching device 76 is set to the A side, the switching device 77 is set to the B side, the switching device 78 is set to the A side, the switch 79 is set to ON, the switch 80 is set to OFF, the switching device 81 is set to the B side, and the switching device 82 is set to the B side.

In such a setting state, the power converting unit 54 operates as the converter to charge the power storage device 56 using electric power supplied from the alternating-current generator 61. The SIV 57 converts a direct-current voltage converted by the power converting section 54 into a three-phase alternating-current voltage and supplies the three-phase alternating-current voltage to the auxiliary machine 65. The operation (the charging operation for the power storage device 56) shown in FIG. 39 is suitable, for example, when the electric power from the fuel battery 53 or the alternating-current overhead wire 58 is not obtained and when the stored voltage of the power storage device 56 drops. Even when the electric power of at least one of these power sources is obtained, the power storage device 56 can be charged using the electric power of the alternating-current generator 61.

Engine Start from the Power Storage Device

Figure 40:
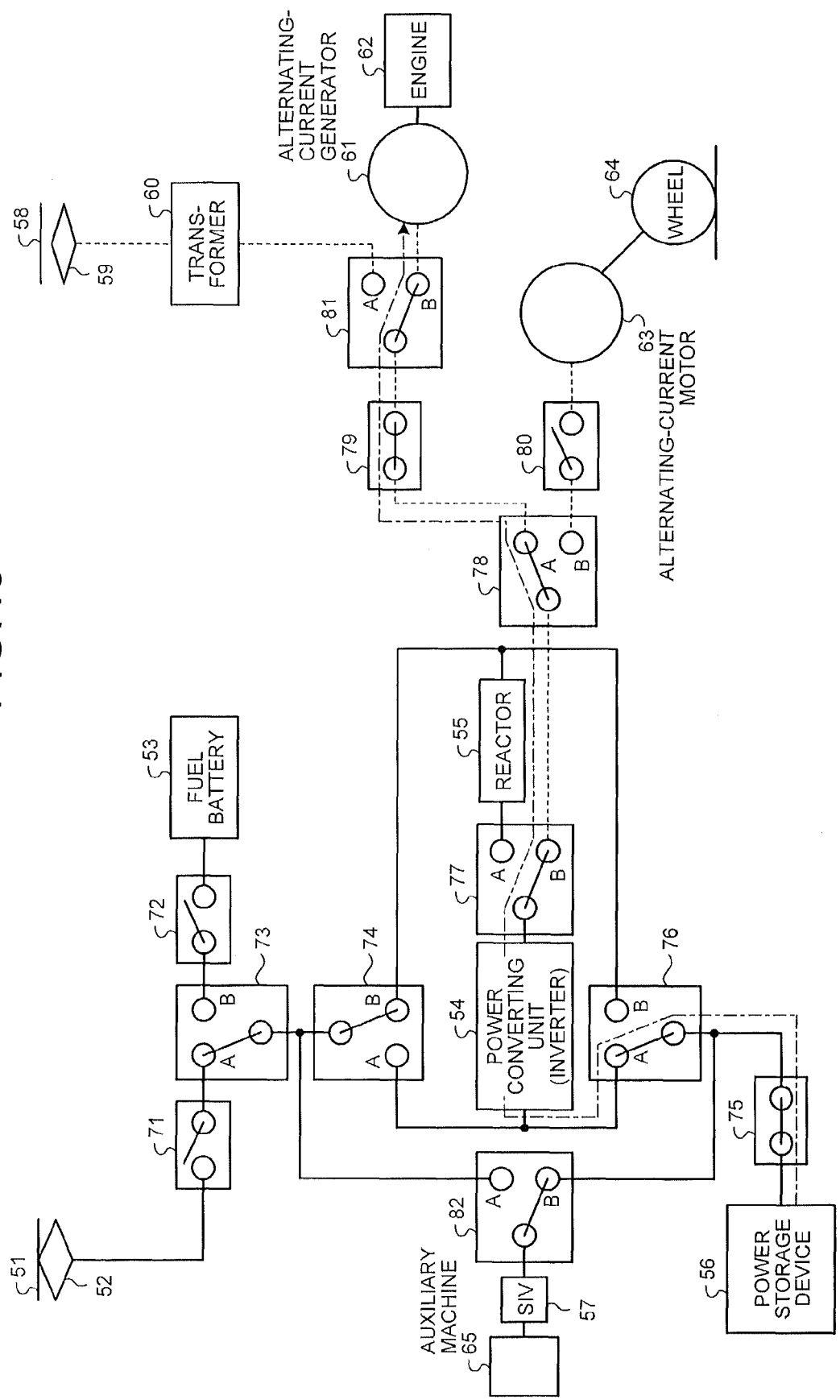
FIG. 40 is a diagram for explaining an operation for performing engine start using the electric power of the power storage device.

FIG. 40 is a diagram for explaining an operation for performing engine start using the electric power of the power storage device 56. As shown in the figure, when the engine start is performed using the electric power of the power storage device 56, the switch 71 is set to OFF, the switch 72 is set to OFF, the switching devices 73 and 74 are set arbitrarily, the switch 75 is set to ON, the switching device 76 is set to the A side, the switching device 77 is set to the B side, the switching device 78 is set to the A side, the switch 79 is set to ON, the switch 80 is set to OFF, the switching device 81 is set to the B side, and the switching device 82 is set to the B side.

In such a setting state, the SIV 57 converts the direct-current voltage supplied from the power storage device 56 into a three-phase alternating-current voltage and supplies the three-phase alternating-current voltage to the auxiliary machine 65. The power converting unit 54 operates as the inverter to convert the direct-current voltage supplied from the power storage device 56 into a three-phase alternating-current voltage, drive the alternating-current generator 61 as a motor, and start the engine 62 connected to the alternating-current generator 61.

Engine Brake from the Power Storage Device

FIG. 40 also serves as a connection configuration for applying an engine brake using the electric power of the power storage device 56. When the electric vehicle applies a brake, for example, in a state in which the power storage device 56 is fully charged, power regeneration cannot be performed. Therefore, the electric vehicle needs to stop the electric vehicle using an air brake. As a result, brake pads wear fast. On the other hand, in the case of the configuration shown in FIG. 40, for example, when the electric vehicle is standing in a station or during coasting, it is possible to consume the electric power of the power storage device 56 by driving the alternating-current generator 61 as a motor using the electric power of the power storage device 56 and causing the engine 62 to operate as an engine brake. According to this control, the voltage of the power storage device 56 drops. Therefore, it is possible to receive, in the power storage device 56, regenerative power generated when the electric vehicle uses the regenerative brake and suppress the wear of the brake pads while realizing effective use of electric power.

Engine Start from the Fuel Battery

Figure 41:
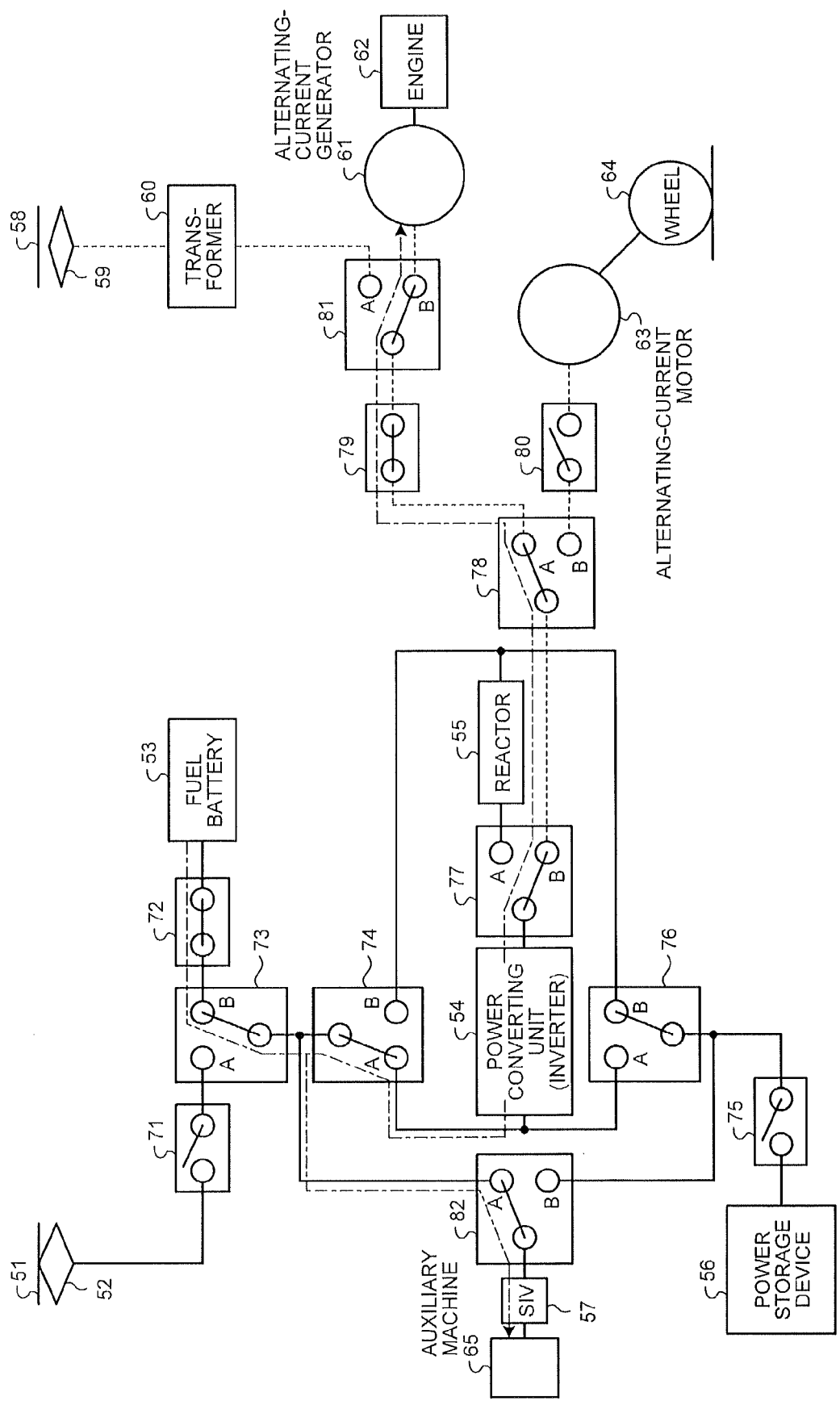
FIG. 41 is a diagram for explaining an operation for performing the engine start using the electric power of the fuel battery.

FIG. 41 is a diagram for explaining an operation for performing engine start using the electric power of the fuel battery 53. As shown in the figure, when the engine start is performed using the electric power of the fuel battery 53, the switch 71 is set to OFF, the switch 72 is set to ON, the switching device 73 is set to the B side, the switching device 74 is set to the A side, the switch 75 is set to OFF, the switching device 76 is set to the B side, the switching device 77 is set to the B side, the switching device 78 is set to the A side, the switch 79 is set to ON, the switch 80 is set to OFF, the switching device 81 is set to the B side, and the switching device 82 is set to the A side.

In such a setting state, the SIV 57 converts the direct-current voltage supplied from the fuel battery 53 into a three-phase alternating-current voltage and supplies the three-phase alternating-current voltage to the auxiliary machine 65. The power converting unit 54 operates as the inverter to convert the direct-current voltage supplied from the fuel battery 53 into a three-phase alternating-current voltage, drives the alternating-current generator 61 as a motor, and start the engine 62 connected to the alternating-current generator 61.

Engine Brake from the Fuel Battery

FIG. 41 also serves as a connection configuration for applying an engine brake using the electric power of the fuel battery 53. For example, when the power storage device 56 is in a full-charge state and the auxiliary machine 65 is in a no-load state, generated power of the fuel battery 53 cannot be sufficiently utilized. On the other hand, in the case of the configuration shown in FIG. 41, it is possible to consume the electric power of the fuel battery 53 by driving the alternating-current generator 61 as a motor using the electric power of the fuel battery 53 and causing the engine 62 to operate as an engine brake. According to this control, it is possible to consume electric power even when the fuel battery 53 has to be operated at minimum power. Therefore, it is possible to safely and stably operate the fuel battery 53.

Engine Start from the Direct-Current Overhead Wire

Figure 42:
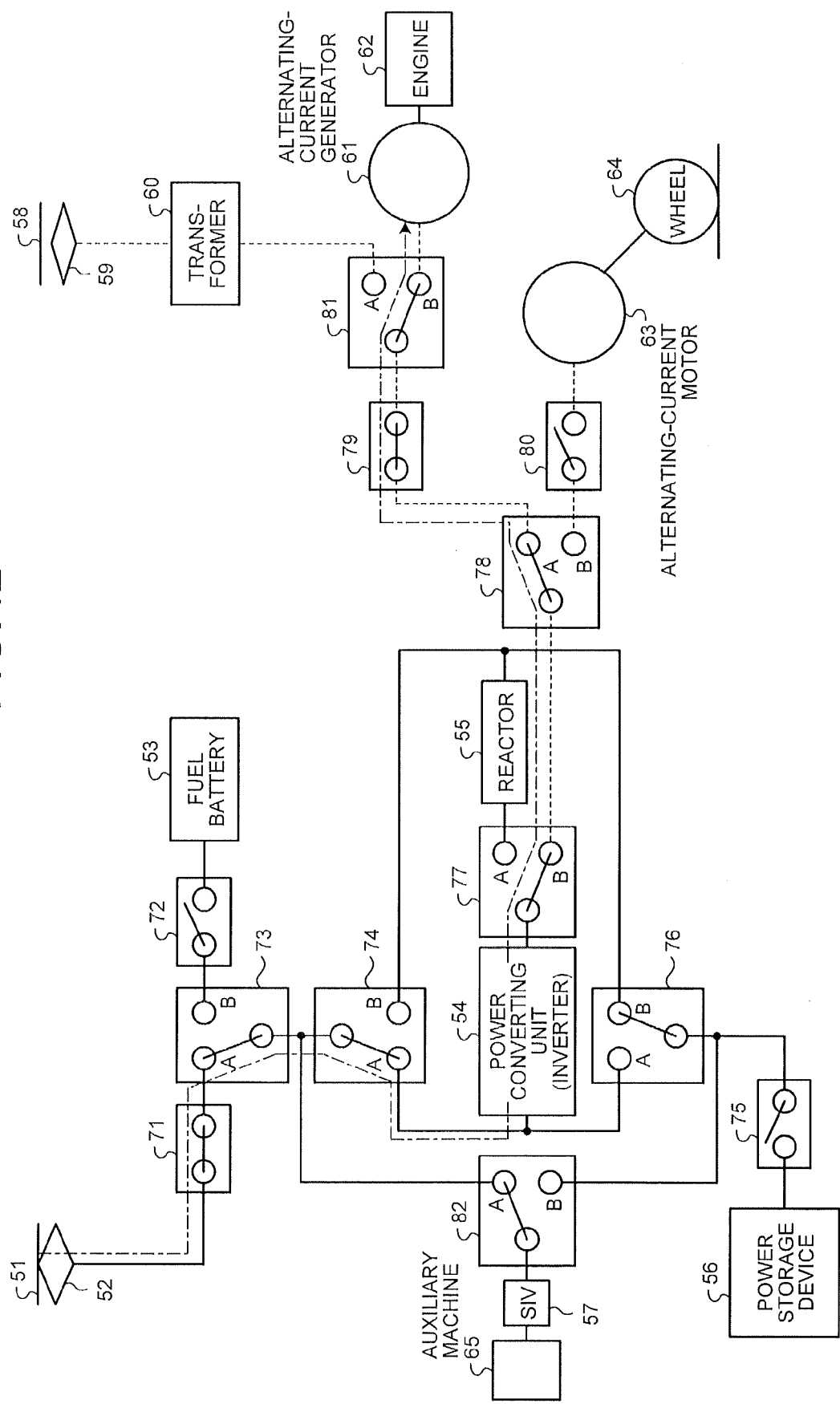
FIG. 42 is a diagram for explaining an operation for performing the engine start using the electric power of the direct-current overhead wire.

FIG. 42 is a diagram for explaining an operation for performing engine start using the electric power of the direct-current overhead wire 51. As shown in the figure, when the engine start is performed using the electric power of the direct-current overhead wire 51, the switch 71 is set to ON, the switch 72 is set to OFF, the switching device 73 is set to the A side, the switching device 74 is set to the A side, the switch 75 is set to OFF, the switching device 76 is set to the B side, the switching device 77 is set to the B side, the switching device 78 is set to the A side, the switch 79 is set to ON, the switch 80 is set to OFF, the switching device 81 is set to the B side, and the switching device 82 is set to the A side.

In such a setting state, the SIV 57 converts the direct-current voltage supplied from the direct-current overhead wire 51 into a three-phase alternating-current voltage and supplies the three-phase alternating-current voltage to the auxiliary machine 65. The power converting unit 54 operates as the inverter to convert the direct-current voltage supplied from the direct-current overhead wire 51 into a three-phase alternating-current voltage, drives the alternating-current generator 61 as a motor, and start the engine 62 connected to the alternating-current generator 61.

Engine Brake from the Direct-Current Overhead Wire

FIG. 42 also serves as a connection configuration for applying an engine brake using the electric power of the direct-current overhead wire 51, more specifically, applying the engine brake using regenerative power of another electric vehicles under the direct-current overhead wire 51. For example, when the other electric vehicle applies a brake, in a state in which the power storage device 56 is fully charged, the power storage device 56 cannot be charged using the regenerative power of the other electric vehicle. On the other hand, in the case of the configuration shown in FIG. 42, for example, when the electric vehicle is standing in a station or during coasting, it is possible to consume the regenerative power of the other electric vehicle by driving the alternating-current generator 61 as a motor using the regenerative power of the other electric vehicle and causing the engine 62 to operate as an engine brake. According to this control, the other electric vehicle can stably perform power regeneration under the direct-current overhead wire 51. Therefore, it is possible to suppress wear of brake pads of the other electric vehicle.

Power Supply to the Alternating-Current Overhead Wire by the Fuel Battery

Figure 43:
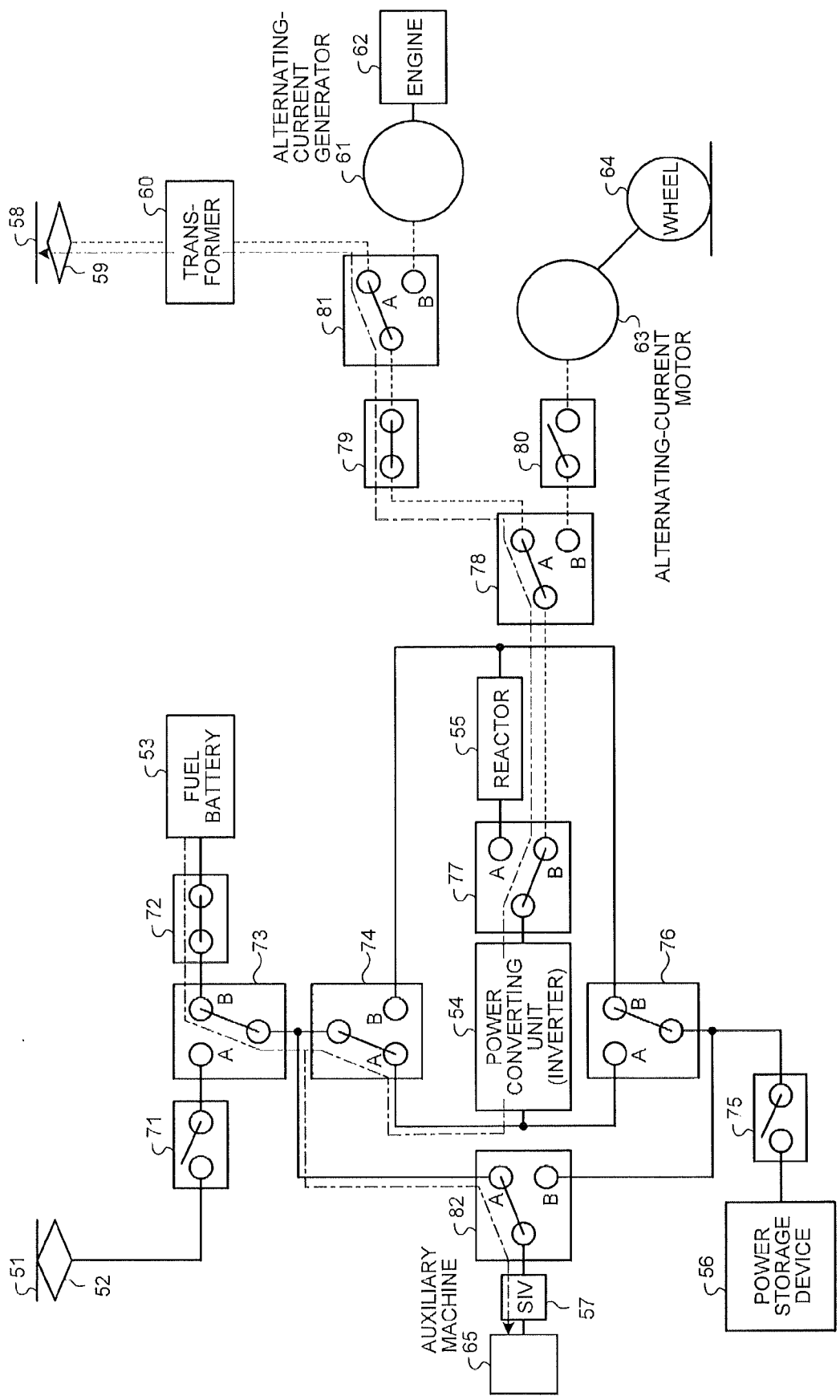
FIG. 43 is a diagram for explaining an operation for supplying the electric power of the fuel battery to the alternating-current overhead wire.

FIG. 43 is a diagram for explaining an operation for supplying the electric power of the fuel battery 53 to the alternating-current overhead wire 58. As shown in the figure, when the electric power of the fuel battery 53 is supplied to the alternating-current overhead wire 58, the switch 71 is set to OFF, the switch 72 is set to ON, the switching device 73 is set to the B side, the switching device 74 is set to the A side, the switch 75 is set to OFF, the switching device 76 is set to the B side, the switching device 77 is set to the B side, the switching device 78 is set to the A side, the switch 79 is set to ON, the switch 80 is set to OFF, the switching device 81 is set to the A side, and the switching device 82 is set to the A side.

In such a setting state, the SIV 57 converts the direct-current voltage supplied from the fuel battery 53 into a three-phase alternating-current voltage and supplies the three-phase alternating-current voltage to the auxiliary machine 65. The power converting unit 54 operates as the inverter to convert the direct-current voltage supplied from the fuel battery 53 into a single-phase alternating-current voltage and apply the single-phase alternating-current voltage to the transformer 60. The transformer 60 converts the single-phase alternating-current voltage into a desired alternating-current voltage required in the alternating-current overhead wire 58 and applies the alternating-current voltage to the alternating-current overhead wire 58 via the power collecting device 59. According to this control, it is possible to perform power supply to the alternating-current overhead wire 58, which is not connected to the alternating-current power supply, by the fuel battery 53 and power supply to the alternating-current overhead wire 58, the voltage of which drops, by the fuel battery 53.

FIG. 44 is a diagram in which the operations shown in FIGS. 30 to 43 are shown as a list in a table format. For example, a correspondence relation among operation states of the power converting unit 54, setting states of the switches 71, 72, 75, 79, and 80 and the switching devices 73, 74, 76, 77, 78, 81, and 82, and the drawings referred to above is shown. Contents shown in the figure are as explained above. Detailed explanation of the contents is omitted. "Battery" in the remarks column means "power storage device 56".

As explained above, when the direct-current power from the power storage device is input from the first terminal side, the propulsion control device according to this embodiment causes the power converting unit to act as the inverter to convert the direct-current power into desired alternating-current power and output the alternating-current power from the second terminal side. When the direct-current power from the direct-current power supply source excluding the power storage device is input from the first terminal side, the propulsion control device causes the power converting unit to operate as the inverter to convert the direct-current power into desired direct-current power or alternating-current power and output the direct-current power or the alternating-current power from the second terminal side. When the direct-current power from the direct-current power supply source excluding the power storage device is input from the first terminal side, the propulsion control device causes the power converting unit to operate as the step-down chopper to convert the direct-current power into desired direct-current power and output the direct-current power from the second terminal side. When the direct-current power from the direct-current power supply source excluding the power storage device is input from the second terminal side, the propulsion control device causes the power converting unit to operate as the step-up chopper to convert the direct-current power to desired direct-current power and output the direct-current power from the first terminal side. Therefore, it is possible to freely and efficiently control, with one power converting unit, the power supply sources such as the power storage device, a plurality of direct-current power supply sources (the direct-current overhead wire, the fuel battery, the solar battery, etc.), and a plurality of alternating-current power supply sources (the alternating-current overhead wire and the alternating-current generator). Further, it is possible to reduce a device size and suppress device costs.

In FIGS. 29 to 43, the configuration is disclosed in which, when the power converting unit 54 performs the operations of the step-down chopper, the step-up chopper, the inverter, and the converter, one reactor 55 is used for all the operations. However, separate reactors can be provided for the respective operations. By providing the separate reactors, it is possible to perform an operation for selecting the reactors suitable for the operations of the step-down chopper, the step-up chopper, the inverter, and the converter.

INDUSTRIAL APPLICABILITY

As explained above, the present invention is useful as an electric vehicle propulsion control device including a power storage device.

REFERENCE SIGNS LIST 1, 1a, 1c control units
2 overhead wire
3 power collecting device
4, 4A, 4V, 5, 9, 13, 14, 16, 16A, 16B, 18, 19, 22, 33, 71, 72, 75, 79, 80 switches
6 filter reactor
7 filter capacitor
8, 8A, 8B power converting units
10 battery reactor
11, 11A, 11B, 11b switching units
12 battery filter capacitor
15, 15A, 15B, 101 power storage devices
17, 17A, 17B, 17b motors
20, 57 auxiliary power supply devices (SIVs)
31 transformer
32, 55 reactors
41 generator
42 diesel engine
51 direct-current overhead wire
52, 59 power collecting devices
53 fuel battery
54 power converting unit
56 power storage device
58 alternating-current overhead wire
60 transformer
61 alternating-current generator
62 engine
63 alternating-current motor
64 wheel
65 auxiliary machine
73, 74, 76, 77, 78, 81, 82 switching devices
100 interface (connecting unit)
R1, R2 charging resistors
R3 discharge resistors
CTU, CTV, CTW, CTB current detectors

The invention claimed is:

1. An electric vehicle propulsion control device including a power storage device, the electric vehicle propulsion control device comprising:
a power converting unit capable of performing bidirectional power flow control and configured to convert, when direct-current power from the power storage device is input from a first terminal side, the direct-current power into desired alternating-current power and output the alternating-current power from a second terminal side, convert, when direct-current power from a direct-current power supply source excluding the power storage device is input from the first terminal side, the direct-current power into desired direct-current power or alternating-current power and output the direct-current power or the alternating-current power from the second terminal side, and convert, when the direct-current power from the direct-current power supply source is input from the second terminal side, the direct-current power into desired direct-current power and output the direct-current power from the first terminal side; and
a control unit configured to control an operation of the power converting unit, wherein
when converting the direct-current power from the power storage device input from the first terminal side into desired alternating-current power and outputting the alternating-current power from the second terminal side, the control unit causes the power converting unit to operate as an inverter,
when converting the direct-current power from the direct-current power supply source input from the first terminal side into desired direct-current power and outputting the direct-current power from the second terminal side, the control unit causes the power converting unit to operate as a step-down chopper,
when converting the direct-current power from the direct-current power supply source input from the first terminal side into desired alternating-current power and outputting the alternating-current power from the second terminal side, the control unit causes the power converting unit to operate as the inverter, and
when converting the direct-current power from the direct-current power supply source input from the second terminal side into desired direct-current power and outputting the direct-current power from the first terminal side, the control unit causes the power converting unit to operate as a step-up chopper.

2. The electric vehicle propulsion control device according to claim 1, wherein
a reactor is provided on the second terminal side of the power converting unit,
when a voltage of the direct-current power supply source is higher than a stored voltage of the power storage device, the control unit causes the direct-current supply source to input the direct-current power of the direct-current power supply source to the power converting unit from the first terminal side, and
the power converting unit charges the power storage device using direct-current power output the second terminal side via the reactor.

3. The electric vehicle propulsion control device according to claim 1, wherein
a reactor is provided on the second terminal side of the power converting unit,
when a voltage of the direct-current power supply source is lower than the stored voltage of the power storage device, the control unit causes the direct-current supply source to input the direct-current power of the direct-current power supply source to the power converting unit from the second terminal side via the reactor, and the power converting unit charges the power storage device using direct-current power output from the first terminal side.

4. The electric vehicle propulsion control device according to claim 1, wherein when the direct-current power of the power storage device is used as power for the electric vehicle, the control unit causes the power storage device to input the direct-current power of the power storage device to the power converting unit from the first terminal side, and the power converting unit drives the electric vehicle using alternating-current power output from the second terminal side.

5. The electric vehicle propulsion control device according to claim 1, wherein when the direct-current power of the direct-current power supply source is used as power for the electric vehicle, the control unit causes the direct-current power supply source to input the direct-current power of the direct-current power supply source to the power converting unit from the first terminal side, and the power converting unit drives the electric vehicle using alternating-current power output from the second terminal side.

6. The electric vehicle propulsion control device according to claim 1, wherein when alternating-current power from an alternating-current power supply source is input from the second terminal side, the power converting unit converts the alternating-current power into direct-current power and outputs the direct-current power from the first terminal side, and when converting the alternating-current power from the alternating-current power supply source input from the second terminal side into desired direct-current power and outputting the direct-current power from the first terminal side, the control unit cause the power converting unit to operate as a converter.

7. The electric vehicle propulsion control device according to claim 6, wherein when charging the power storage device using the alternating-current power of the alternating-current power supply source, the control unit causes the alternating-current power supply source to input the alternating-current power of the alternating-current power supply source to the power converting unit from the second terminal side, and the power converting unit charges the power storage device using direct-current power output from the first terminal side.

8. The electric vehicle propulsion control device according to claim 6, wherein when the electric vehicle propulsion control device includes at least an alternating-current generator as the alternating-current power supply source, when starting an engine, which is a power source of the alternating-current generator, using the direct-current power of the power storage device, the control unit causes the power storage device to input the direct-current power of the power storage device to the power converting unit from the first terminal side and drives the alternating-current generator using alternating-current power output from the second terminal side to start the engine.

9. The electric vehicle propulsion control device according to claim 6, wherein when the electric vehicle propulsion control device includes at least an alternating-current generator as the alternating-current power supply source, when starting an engine, which is a power source of the alternating-current generator, using the direct-current power of the direct-current power supply source, the control unit causes the direct-current power supply source to input the direct-current power of the direct-current power supply source to the power converting unit from the first terminal side and drives the alternating-current generator using alternating-current power output from the second terminal side to start the engine.

10. The electric vehicle propulsion control device according to claim 6, wherein when the electric vehicle propulsion control device includes at least an alternating-current overhead wire as the alternating-current power supply source, when supplying electric power of the direct-current power supply source to the alternating-current overhead wire, the control unit causes the direct-current power supply source to input the direct-current power of the direct-current power supply source to the power converting unit from the first terminal side and supplies alternating current power output from the second terminal side to the alternating-current overhead wire.

11. The electric vehicle propulsion control device according to claim 6, wherein when the electric vehicle propulsion control device includes at least an alternating-current overhead wire as the alternating-current power supply source, when supplying electric power of the power storage device to the alternating-current overhead wire, the control unit causes the power storage device to input the direct-current power of the power storage device to the power converting unit from the first terminal side and supplies alternating current power output from the second terminal side to the alternating-current overhead wire.

12. The electric vehicle propulsion control device according to claim 7, wherein the alternating-current power supply source includes at least one of an alternating-current overhead wire or an alternating-current generator.

13. The electric vehicle propulsion control device according to claim 1, wherein the direct-current power supply source includes at least one of a direct-current overhead wire, a fuel battery, and a solar battery.

14. The electric vehicle propulsion control device according to claim 1, further comprising an auxiliary power supply device configured to convert the direct-current power output by the power storage device or the direct-current power supply source into alternating-current power and supply the alternating-current power to an auxiliary machine, wherein when power supply to the auxiliary power supply device is switched from the direct-current power supply source to the power storage device in a state in which power supply to the auxiliary power supply device is switched to the direct-current power supply source side according to control by the control unit, the control unit performs control for causing the power converting unit to operate as a step-up chopper to step up a voltage of the power storage device input from the second terminal and controlling a step-up ratio of the power converting unit such that a voltage output from the first terminal is substantially equal to an output voltage of the direct-current power supply source, disconnecting the direct-current power supply source and the power converting unit and reducing the step-up ratio of the power converting unit such that a voltage at the first terminal and a voltage at the second terminal in the power converting unit are substantially equal to each other, conducting the first terminal and the second terminal on an outside of the power converting unit to conduct the auxiliary power supply device and the power storage device and controlling an upper arm element in the power converting unit to be ON to conduct the first terminal and the second terminal to conduct on an inside of the power converting unit as well at a point when the voltage at the first terminal and the voltage at the second terminal are substantially equal to each other, and releasing the conduction between the first terminal and the second terminal on the outside of the power converting unit while maintaining the conduction of the auxiliary power supply device and the power storage device.

15. The electric vehicle propulsion control device according to claim 1, further comprising an auxiliary power supply device configured to convert the direct-current power output by the power storage device or the direct-current power supply source into alternating-current power and supply the alternating-current power to an auxiliary machine, wherein when power supply to the auxiliary power supply device is switched from the power storage device to the direct-current power supply source, in a state in which power supply to the auxiliary power supply device is connected to the power storage device side according to control by the control unit, the control unit performs control for conducting the first terminal and the second terminal on an outside of the power converting unit, controlling an upper arm element in the power converting unit to be ON to conduct the first terminal and the second terminal to conduct on an inside of the power converting unit, and then releasing the conduction between the first terminal and the second terminal on the outside of the power converting unit, causing the power converting unit to operate as a step-up chopper to step up a voltage of the power storage device input from the second terminal and controlling a step-up ratio of the power converting unit such that a voltage output from the first terminal is substantially equal to an output voltage of the direct-current power supply source, connecting the direct-current power supply source and the first terminal and disconnecting the second terminal and the power storage device at a point when a voltage output from the first terminal is substantially equal to an output voltage of the direct-current power supply source.

* * * * *